(12) United States Patent
Lanet

(10) Patent No.: US 6,408,058 B1
(45) Date of Patent: Jun. 18, 2002

(54) TELEWRITING DEVICE

(75) Inventor: Arnaud Lanet, Houlbec Cocherel (FR)

(73) Assignee: ADL Systems S.A., Saint-Marcel (FR)

( * ) Notice: Subject to any disclaimer, the term of this patent is extended or adjusted under 35 U.S.C. 154(b) by 0 days.

(21) Appl. No.: 09/123,053

(22) Filed: Jul. 27, 1998

(30) Foreign Application Priority Data

Nov. 12, 1997 (FR) .......................................... 97 14168

(51) Int. Cl.$^7$ ............................................. H04M 11/00
(52) U.S. Cl. ................................. 379/93.19; 379/93.08; 178/18.01
(58) Field of Search .......................... 379/93.01, 93.08, 379/93.17–93.21, 90.01, 110.01; 178/18.01, 18.03

(56) References Cited

U.S. PATENT DOCUMENTS

| | | | |
|---|---|---|---|
| 4,659,876 A | 4/1987 | Sullivan et al. | |
| 4,794,634 A | 12/1988 | Torihata et al. | ............... 379/96 |
| 5,508,713 A | 4/1996 | Okouchi | |
| 5,509,083 A | 4/1996 | Abtahi et al. | ............... 382/124 |
| 5,521,335 A | 5/1996 | Oka | |

FOREIGN PATENT DOCUMENTS

| | | |
|---|---|---|
| EP | 0 098 223 A2 | 1/1984 |
| EP | 0 185 609 A2 | 6/1986 |
| EP | 0 379 354 A | 1/1990 |
| EP | 0 374 943 A2 | 6/1990 |
| EP | 0 669 749 A1 | 8/1995 |
| WO | WO 89/12859 | 12/1989 |
| WO | WO 93 08522 A | 10/1992 |
| WO | WO 93/06686 * | 4/1993 ............... 379/93.08 |

OTHER PUBLICATIONS

Higaki, S., et al., "A Telewriting System on A Lan Using a Pen–Based Computer as the Terminal", Bridges Between Worlds, Amsterdam, Apr. 24–29, 1993.

* cited by examiner

*Primary Examiner*—Wing F. Chan
(74) *Attorney, Agent, or Firm*—Weingarten, Schurgin, Gagnebin & Lebovici LLP

(57) ABSTRACT

The telewriting device enables exchange of graphics and voice information in real time with another such device via an external data communication line. The device comprises means for exchanging voice data, display means having a display surface, means for active telewriting input on the display surface, and interface means assuring the exchange of data input and output over the external data communication line. The device further comprises a first control unit connected to the interface means by a first link for managing exchanges of data between the interface and peripheral data-input and data-output means and a second control unit for managing manuscript trace data and display thereof, linked to interface means via a second connection independent of the first link, for sending and receiving manuscript trace data.

27 Claims, 39 Drawing Sheets

TELEWRITING DEVICE

The present invention concerns a telewriting device enabling exchange of graphics and voice information with another such device communicating via an external data communication line, for example a telephone line.

BACKGROUND OF THE INVENTION

There already exist autonomous telewriting devices which combine in a single casing a telephone and a tablet for writing and displaying data. The tablet is in the form a flat display screen associated with an input device enabling direct writing on the screen using a stylus. The traces made by the stylus on top of the screen appear directly on the screen and are also sent to another similar device connected to the communication line where they are reproduced identically. These traces can be superimposed on another display of information from a source external to the writing tablet and present on the screen of each of the connected devices. The display of manuscript traces (telewriting data) can be a text or a drawing to be commented on, for example, the traces made by the stylus can provide a visual indication of required changes or can even effect such changes.

The display from the external source (external relative to the writing tablet) can come from various peripheral devices or from devices integrated into the telewriting device: a memory unit (diskette, hard disk, optical disk), a computer, a scanner or a keyboard. In normal use display data from the external source is loaded onto a single telewriting device either by transfer within the device or by means of a cable connecting it to a peripheral device. It is then sent to one or more other devices communicating via the external data communication line during the connection.

Telewriting devices of the above type are described in documents U.S. Pat. No. 5,521,335, U.S. Pat. No. 5,508,713 and EP-A-0 379 354, for example.

Sending of data for display from an external source is relatively time-consuming and constraining, in the case of information which is often dense, especially if it includes graphics, and is likely to be renewed during a call, for example to go from one page to another. The data can be sent in packets, however, subject to a slight increase in sending time.

In contrast, data entered in writing, consisting of fine traces that evolve progressively, can be sent relatively rapidly. However, from the point of view of user friendliness it is important for the lines to be displayed on the receiving device at virtually the same time as they are made on the sending device, i.e. in real time.

Prior art telewriting devices are not specifically designed to allow for these constraints. They are therefore limited in their capability to send simultaneously traces and graphics from external sources or incapable of real time bidirectional communication between devices.

With other types of telewriting device based on personal computers or fixed stations it is feasible to improve the flow of information by using complex data communication algorithms, but this is at the cost of the mobility and the autonomy of the equipment.

OBJECTS AND SUMMARY OF THE INVENTION

Accordingly, the invention consists in a telewriting device forming an autonomous and integral unit that overcomes the problems encountered in devices known until now by enabling two-way (real time full duplex) exchange of voice and graphics data, in particular data entered in writing, with optimal control of data from external sources.

This aim is achieved thanks to an in-depth investigation by the applicant of the sources of the limitations of the prior art techniques, which has lead to a new architecture that is specifically optimized while remaining simple to implement.

The telewriting device of the invention is of the type comprising means for exchanging voice data, display means having a display surface, means for input by writing on the display surface and interface means assuring the exchange of input and output data over an external data communication line.

The invention provides a telewriting device enabling exchange of graphics and voice information in real time with another such device communicating with it via an external data communication line, the device comprising to this end:

means for exchanging voice data, display means having a display surface, means for receiving manuscript traces for real time display of traces on the display surface, means for processing the manuscript trace (telewriting) data and other data to be exchanged, and interface means for exchanging the manuscript trace data and said other data over the external data communication line.

In the telewriting device of the invention, the data processing means comprise:

a first control unit for managing said other data, said first control unit being connected to the interface means by a first link dedicated (i.e. specific) to this first control unit for exchange of said other data over the external data communication line, and a second control unit that can operate in parallel with the first control unit for controlling the manuscript trace receiving means, said second control unit being connected to the interface means by a second link dedicated specific to this second control unit and enabling exchange of manuscript trace data over the external data communication line.

Thus, the different tasks are divided optimally between the first and second control units for parallel processing of the other data from input and output devices and the manuscript trace data. What is more, the use in accordance with the invention of separate dedicated links between the interface means and the first and second control units assures the real time flow of manuscript trace data via the second control unit whilst maintaining at all times communication with the first control unit.

This unit can therefore monitor at all times the operational status of the external line and the interface means. It is then easy to exchange data with the interface means over the first link and the second link in a shared access mode using a predetermined protocol without disturbing the flow of manuscript trace data.

Note that manuscript trace data also includes commands associated with the functions of manuscript input on the screen: selection with the stylus of parts of the display (words, blocks), deleting, moving, copying selected parts, etc., as in a word processor Note that the term "other data" can include all data, apart from that arriving in real time from the manuscript trace receiving means, to be managed by the telewriting device. This "other data" is generally graphics data. The other data may e.g. include—although not exclusively—document pages to be displayed on the screen on a device in receive mode or in send mode. These document pages can come from sources external to the telewriting device, such as storage peripheral devices, data processing equipment, etc.

It can equally come from storage units internal to the device (diskette or hard disk drive, CD-ROM etc.), depending on implementation choices.

In preferred embodiments of the invention the other data does not include telephone voice data or facsimile data. These latter types of data are advantageously managed within the interface means.

In receive mode, the other data received can be displayed on the screen either immediately or later (for example in response to a request). It can also be stored on internal or external devices or sent to other equipment connected to the device, for example a printer, a monitor, a personal computer, an electronic organizer, etc.

It is then possible to assign priority for access to the interface means to one of the control units, for example the second one, to assure that the exchange of traces input is always effected in real time, even if the device is sending or receiving other data to or from a device over the external line, for example to download a document. In this case the data entered in writing can be exchanged (sent or received) over the second link in real time and at any time. If it is necessary also to convey data managed by the first control unit, for example pages for display read out of a memory, while manuscript trace data is being exchanged, the former is sent only during gaps in the flow of manuscript trace data, in accordance with an interleaving protocol.

The effect of having two control units with separate tasks in accordance with the invention achieves very efficient exchange of data over the first and second links as the computation and management process on the upstream side of each link is active at all times.

In a preferred embodiment of the invention the device is operational when the other data constitutes a document to be displayed on a receiving device and occupies more than one display page on the screen to assure in order of increasing priority: i) sending of some of said other data constituting a display page on the screen, ii) exchange of telewriting data, and iii) sending of the remainder of said other data to enable superimposition of data entered in writing on a document page displayed as soon as it is received.

This mode of operation is useful if the data entered in writing exchanged concerns traces or other annotation to be superimposed on a document page shown on the connected devices.

In this way, the superimposition of the manuscript trace data on a document page is displayed as soon as it is received. A telewriting dialogue can therefore begin without waiting for the complete document to be loaded into the receiving device.

After the first page of the document is loaded, the remaining pages can be loaded into the receiving device during free periods in the sending of telewriting data.

To enable optimum management of this preferred embodiment of the invention the first and second links exchange data via the interface means in a shared access mode on the external data communication line in accordance with a predetermined protocol.

The device advantageously comprises means for interleaving data entered in writing and other data to assure real time sending of manuscript trace data over the external data communication line.

Note that in a combined mode of sending other data and data entered in writing this preserves the priority of sending data entered in writing, other data (for example pages of a document to be downloaded following on from the first page) being sent as a background task under the control of the first control unit.

Said other data is preferably in the form of successive data blocks. Interleaving can then be effected by inserting manuscript trace data into gaps a between blocks of said other data, the manuscript trace data comprising a single pixel, a group of several pixels or a command relating to the written input function.

In one advantageous embodiment of the invention each pixel of a series of consecutive pixels is written into a respective gap between the blocks of other data that follow on in succession in accordance with the normal bit rate of the pixels from the written input means. In the current state of the art this choice achieves an excellent compromise between the imperative of assuring sufficiently fast sending of pixels for real time full duplex display of writing on a receiving device and prompt loading of the remaining pages.

If manuscript trace data to be sent to the external data communication line appears during sending of other data to this line, interleaving is advantageously started at the first gap between two successive blocks of other data after the appearance of the manuscript trace data.

When interleaving with other data in the form of blocks, the blocks preferably occupy a time period equal to or less than the gap between consecutive manuscript trace data. The interleaving of the data then has practically no effect on the exchange of information received by users.

In the embodiment that will be described by way of example, the means for interleaving data are implemented in the first control unit, the manuscript trace data and the other data interleaved with it being sent over the first dedicated link to the interface means for sending over the external data communication line.

Note that in this context the expression "other data" covers all the interleaved data sent by the first control unit.

In this embodiment, the second control unit can exchange and process telewriting data from another device communicating via the interface means and the second dedicated link concomitantly with sending of data by the first control unit via the interface means and the first dedicated link.

The interface means can send and receive data in full duplex mode over the external data communication line, the sent data and the received data being either interleaved or not.

In the case of normal use of the device, the full duplex exchange of data is effected:

i) either by receiving and sending non-interleaved data. This is e.g. the case in particular if two (or more) devices communicating with each other simultaneously exchange manuscript trace data when no other data is being sent;

ii) or by sending interleaved data and receiving non-interleaved data. This is the case e.g. when a telewriting device sends simultaneously manuscript trace data and other data, this other data possibly relating to pages of a document beyond the first page (remaining pages). Note that the interface means of the device communicating with the device operating in the aforementioned mode will operate in the opposite mode, i.e. receiving interleaved data and sending non-interleaved data. Of course, each telewriting device will be capable of operating in either of these two opposite modes.

The present invention also makes it feasible to envisage full duplex communication between two (or more) telewriting devices by sending and receiving interleaved data.

This mode of operation could apply, for example, to an interactive document updating mode of communication. The initiating device then sends to the receiving device interleaved data representing the manuscript trace data and the other data.

The receiving device could then send in full duplex mode another document (for example for archive storage on a fixed storage unit of the initiating device) while this communication is in progress.

In this case, the communication time can be exploited to send this other document because this will be effected concomitantly with the operation of interactively updating the document of the initiating device. The user of the receiving device will then not need to wait for the end of the command for interactive updating of the document to send the document to the initiating device. This optimizes the use of communication time and therefore operating costs.

In a first embodiment of the present invention the data is interleaved in the first control unit, the manuscript trace data and said other data being sent in interleaved form over the first dedicated link to the interface means for sending over the external data communication line.

In this mode, the first control unit can also monitor the interface means and access to it via the second link.

Alternatively, in a second embodiment, the data can be interleaved at the level of the interface means, the other data and the manuscript trace data being sent to the interface means over the first link and the second link, respectively.

This variant provides all the functional possibilities mentioned above and the attendant advantages. The data received by the telewriting device can then be sent by the interface means to one or other of the first and second control units, or to both of them simultaneously.

If the received data is interleaved, comprising both other data (for example display page data) and telewriting data, the interface means divides up the interleaved data using a demultiplexer in order to send the other data over the first dedicated link and the telewriting data over the second dedicated link, respectively. In this case, the telewriting device will include means for monitoring the flow on the first and second links in order to assure bidirectional communication on them. This flow control is advantageously based on time sharing the first and/or the second link.

These control means can be in the first control unit or in the interface as means.

The interface means preferably assure the exchange of voice data by telephone microphone and earpiece means connected to it independently of the first and second links.

In this second embodiment, if said other data and the manuscript trace data are concomitant for sending over the external data communication line, access for the manuscript trace data to the interface means via the second link has a higher priority in order to assure its real time communication.

More generally, and regardless of the aforementioned embodiment, the interface means preferably send interleaved data in full duplex mode and receive data on the external data communication line.

There is advantageously also a bidirectional link between the first and second control units. This bidirectional link enables direct exchange of control data between the two control units without disturbing the flow of data exchanged with the interface means.

The bidirectional link enables exchange of data concerning the busy status of the first and second dedicated links, interrupt requests (for priority access), and control instructions or display data, for example for storage on a memory unit managed by the first control unit.

With this architecture it is possible to confer on the first control unit the task of monitoring the interface means and access to them via the second dedicated link.

Means for monitoring dialogue between the first and second control unit on the bidirectional link are preferably provided, such means comprising: a storage area specific to each of the control units for the data exchanged, each of the storage areas being read only by one of the control units and written only by the other control unit, means indicating to a destination control unit the presence of data in its storage area written by the sending control unit, and means for indicating to the sending control unit the reading of data in the storage area of the destination control unit.

The dialogue monitoring means can further comprise means for prohibiting writing of data in a storage area if it already contains data that has not been read.

Of course, the first and second control units can be used to manage additional tasks over those already mentioned. In a preferred embodiment of the invention the first control unit will be employed mainly to monitor telewriting device input and output. In this regard, it can manage at least one of the following peripheral or internal devices: removable data storage means, fixed data storage means, a printer and a serial link.

The second control unit is preferably dedicated to functions concerning the applications of the telewriting device. This naturally concerns functions associated with telewriting input and preferably functions associated with display of data whether this is manuscript trace data or pre-existing display data, together with commands relating to these functions. Depending on the possible configurations, it can also assure the management of at least of the following devices: a document scanner, a device for reading and/or writing data on a data storage card, such as a smart card, a fingerprint reader and a keyboard.

The interface means advantageously comprise their own means for routing and monitoring on the external line sending or receiving of data exchanged over the first and/or second link and sending or receiving of voice data on a time-sharing basis.

The telewriting device of the invention is designed to operate on conventional telephone lines (switched lines) or digital lines (for example ISDN Lines). In this case, the interface means will advantageously be provided with means enabling them to operate on both these types of line.

In this regard, the interface means preferably comprise means for digitizing voice data in accordance with a predefined protocol.

The present invention also concerns a method of controlling a telewriting device enabling exchange of graphics and voice information in real time with another such device communicating with it via an external data communication line, the device comprising:

means for exchanging voice data, display means having a display surface, means for receiving manuscript traces (telewriting) for real time display of traces on the display surface, means for processing manuscript trace data and other data to be exchanged, and interface means assuring exchange of manuscript trace data and said other data over the external data communication line, said method consisting in dividing the tasks of the data processing means to assure in parallel:

on the one hand management and exchange of said other data over the external data communication line by the interface means, and on the other hand management and exchange of manuscript trace data over the external data communication line via the interface means.

When the other data constitutes a document to be displayed on another such device and occupying more than one display page on the screen, said means for processing manuscript trace data and said other data are preferably controlled so as to assure in order of increasing priority: i) sending of some of said other data constituting a display page on the screen, ii) exchange of telewriting data, and iii) sending of data of the remainder of said other data, to enable superimposition of manuscript trace data on a displayed document page as soon as it is received.

In a preferred embodiment of the invention, when the other data and the manuscript trace data must be sent simultaneously, they are sent in shared access mode over the external data communication line. This sharing mode is preferably implemented by interleaving to enable real time sending of manuscript trace data over the external data communication line.

Said other data is preferably in the form of successive blocks of data. Interleaving can then be effected by inserting manuscript trace data into the gaps between blocks of said other data, the manuscript trace data comprising a single pixel, a group of pixels or a command relating to a telewriting input function.

BRIEF DESCRIPTION OF THE DRAWINGS

Other advantages and features of the invention will emerge from a reading of one preferred embodiment given by way of example only with reference to the accompanying drawings, in which.

MORE DETAILED DESCRIPTION

Figure 1:
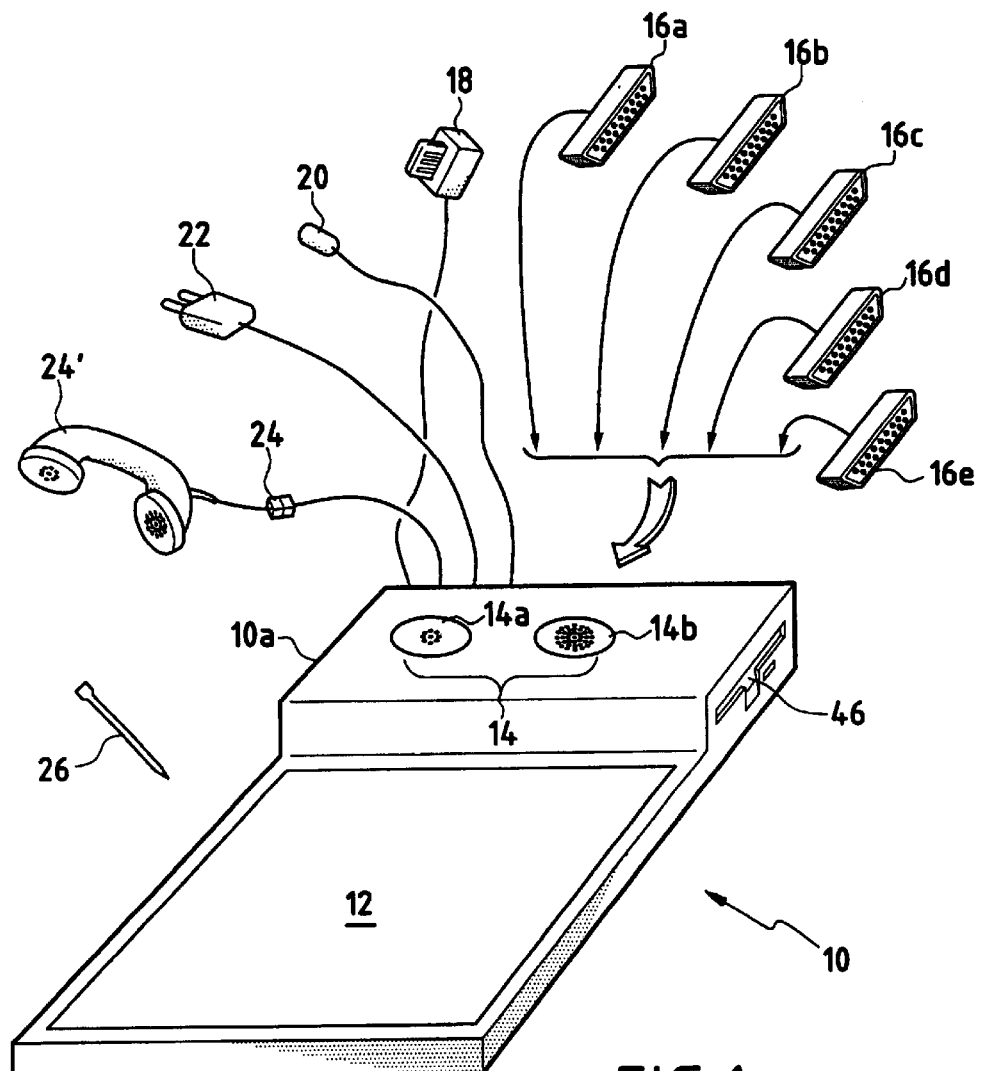
FIG. 1 is an overall view of a telewriting device constituting a first embodiment of the present invention showing various connection possibilities.

As shown in FIG. 1, the telewriting device constituting the first embodiment of the present invention is in the form of an autonomous unit 10 combining a tablet 12 for display and telewriting data input, a hands-free type telephone 14a, 14b, computer-based control electronics (not shown) and a set of connectors 16a–16e, 18–24.

The tablet 12 is a large flat liquid crystal display screen, in the A4 format, for example. Telewriting input on the screen 12 is effected by means of a stylus 26 which operates on a touch-sensitive membrane on top of the screen and connected to a detector of coordinates designated by the stylus, using a well-established technique. As a result, traces made on the tablet 12 are detected by the touchsensitive membrane and can be reproduced directly on the screen.

The hands-free telephone includes a microphone 14a and a small loudspeaker 14b incorporated into a raised part 10a of the unit 10. This raised part 10a also contains a telephone answering device, some of the control electronics and two data storage units: a fixed medium (e.g. hard disk) drive (not shown) and a removable medium (e.g. 3.5" diskette) drive. The connectors 16a–16e, 18–24 are used to connect the device to various peripheral devices (connectors 16a–16e), to a telephone line (connector 18), to a keyboard (connector 20), to a mains socket outlet (connector 22) and to a telephone handset 24' (connector 24) for private conversation.

In this example there are five computer connectors providing respective independent connections to a card reader (connector 16a), a fingerprint reader (connector 16b), a serial peripheral device (connector 16c), a scanner (connector 16d) and a printer (connector 16e).

Access to all available functions is by means of icons appearing on the interactive screen 12 so that they can be selectively designated by means of the stylus 26.

When the device is switched on the interactive screen shows the icons necessary to access the basic functions: operation in telephone, fax, telephone answering or telewriting mode, with a choice of operating modes within each of these functions. When this first selection has been done, the user is guided through subsequent selections by interactive pull-down menus offering various options that can be designated using the stylus.

Figure 2:
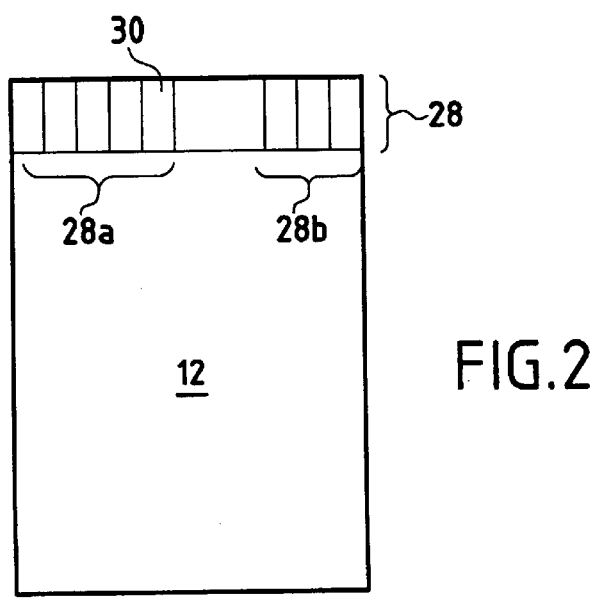
FIG. 2 is a schematic representation of writing, control and monitoring areas of the telewriting device from FIG. 1.

FIG. 2 shows the organization of these commands. An operations area 28 is defined in one margin of the screen 12 (the top margin in the example). This area 28 contains a set of pictograms (or icons) and is divided into a part 28a dedicated to icons accessible for input of commands using the stylus 26 and an operational status area 28b for displaying the activity of the various peripheral devices of the telewriting device.

The status area 28b is also active in the sense that as well as indicating the activity of the device (active functions, modes selected, etc.) it provides access to the various units controlled. Thus an icon appearing in the status area 28b can be designated by the stylus to modify the activity that it indicates. For example, an icon indicating that the telephone line is open can be designated with the stylus 26 to close the line, like a toggle-switch. Other icons in the status area 28b can be designated to open a pull-down menu for selectively modifying the indicated status.

The remainder of the screen 12 remains accessible for telewriting input.

Figure 3:
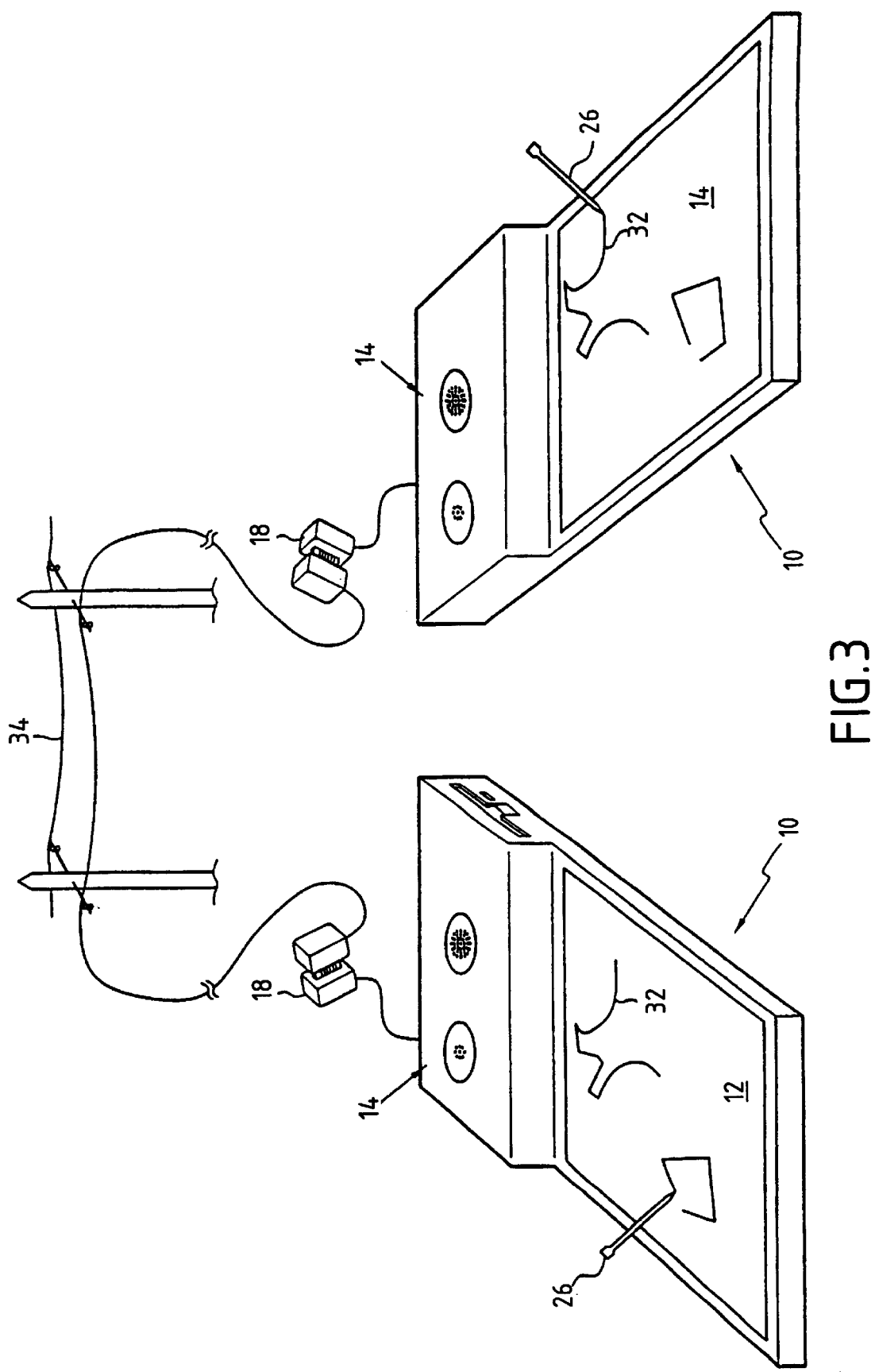
FIG. 3 is a schematic view of two telewriting devices communicating via an external telephone line.

As shown in FIG. 3, the telewriting device 10 is used for real time exchange of voice and graphics information between two or more users. Voice and graphics communications can be effected simultaneously in the send direction and in the receive direction, i.e. in "full duplex" mode.

Accordingly, a trace 32 made by the stylus 26 on the screen 12 of one of the devices is displayed on the screen and simultaneously on that of the other party, and vice versa. The data relating to the traces 32 made on one of the screens 12 is sent over the telephone line 34 in the form of signals having a predetermined format. These can be analogue or digital signals depending on the sending protocol used on the telephone line.

The screen 12 can also display data in the form of images or text from a source other than the stylus and the touch-sensitive screen. This will usually be referred to as "other data", generally being information already stored on a medium (memory, storage unit or printed medium) as compared to data formed (and generally sent) in real time during telewriting input from the stylus. This data can come from a peripheral device via one of the connectors 16a–16e or 20 (FIG. 1) or from the diskette storage unit 46.

When it is necessary to exchange this other data (images or text) at the same time as traces made by the stylus 26, the line 34 operates in a shared mode. In this case a protocol enabling these two types of data to be sent and received alternately is used.

In accordance with the present invention, the control electronics provide optimal management of exchange of data under these shared mode sending conditions.

Figure 4:
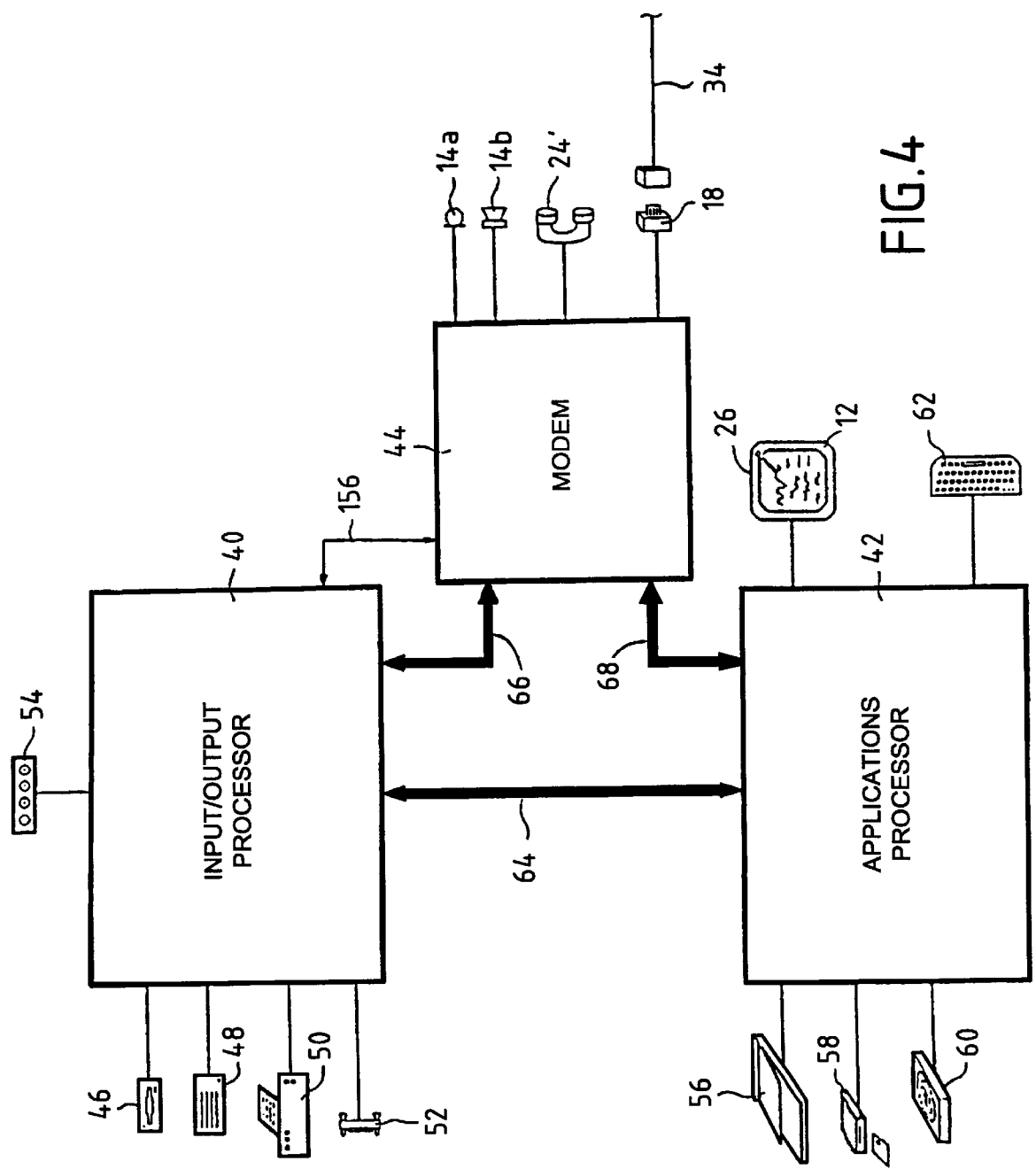
FIG. 4 is a simplified block schematic of the architecture of the telewriting device from FIG. 1.

The global architecture of the control electronics is shown in a simplified form in FIG. 4.

It comprises three main units: an input/output processor 40 (first control unit), an applications processor 42 (second control unit) and a modem 44 (interface means).

The input/output processor 40 and the applications processor 42 operate independently of each other to execute one or more specific tasks. The input/output processor 40 is more particularly dedicated to executing all tasks involved in managing other data, such as documents, or functions internal to the telewriting device. The input/output processor 40 controls in particular the diskette storage device 46 (which is internal to the telewriting device) and exchange of data with peripheral devices, in particular a hard disk storage device 48, a printer 50 and a serial link 52 used mainly for connecting to a personal computer. It also controls the basic commands of the telewriting device and the various LEDs 54 that signal its status.

As explained below, the input/output processor also monitors exchange of data between the three units and operation of the modem 44.

The applications processor 42 is more particularly dedicated to executing functional applications of the telewriting device. Accordingly, it controls all functions associated with telewriting input and with display of data on the touch-sensitive screen 12. The applications processor 42 also controls man-machine interface functions in respect of external devices that can be connected to the telewriting device. In the example these devices are a scanner 56, a bank card reader 58, a fingerprint reader 60 and a keyboard 62.

The two processors 40, 42 dialogue with each other by means of messages travelling on a bidirectional bus 64 connecting them directly.

The modem 44 connects the telewriting device to the telephone network. It also controls all telephone-related functions, in particular hands-free and confidential handset functions. In particular it handles dialling and voice transfer and exchange of data with the input/output processor 40 or the applications processor 42. It sends and receives data in various modes: facsimile, modem, interactive voice/data, etc.

The input/output processor 40 and the applications processor 42 are connected separately to the modem 44 by a respective dedicated bus 66 and 68. The input/output processor can therefore dialogue with the modem 44 via its dedicated bus 66 independently of the applications processor 42. Likewise, the applications processor 42 can dialogue with the modem 44 via its dedicated bus 68 independently of the input/output processor 40.

The telephone-related functions on the modem 44 are monitored by the input/output processor 40 via control lines 156 which are separate from its dedicated bus 66.

By virtue of this architecture, access to the modem 44 providing communication with another party is shared entirely without interference between the input/output processor 40 and the applications processor via their respective dedicated buses 66 and 68.

The applications processor 42 can transfer data over the telephone line concerning, for example, telewriting input or display on the touch-sensitive screen 12 directly via its dedicated bus 68. This connection between the modem 44 and the applications processor 42 enables full duplex communication (voice and written data), so achieving optimal interactivity.

In full duplex mode the modem 44 shares sending and receiving of voice and written data on the telephone line by means of input/output processor commands on the command line 156 and on the dedicated bus 66, respectively.

Figure 5:
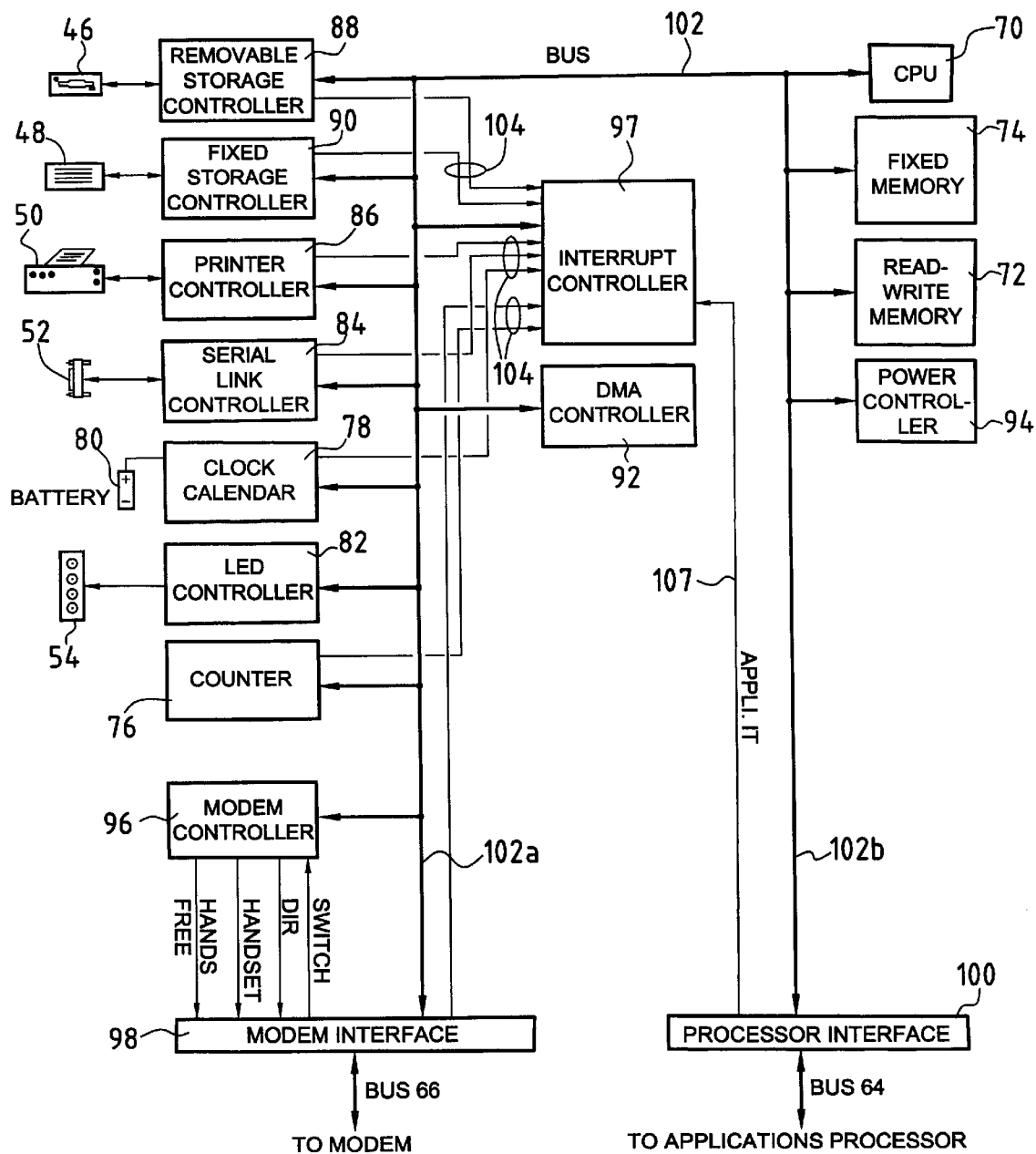
FIG. 5 is a detailed block schematic of the first control unit (input/output processor) shown in FIG. 4.

FIG. 5 represents the detailed block schematic of the input/output processor 40.

Internal control of the input/output processor 40 is the responsibility of a central processor unit (CPU) 70 which is used to control the various input and output controllers of the telewriting device and the storage units 46 and 48. The CPU 70 employs a "real time" operating system enabling it to respond to all requests from the various input and output controllers to guarantee immediate processing of exchanged data.

The real time operating system software is stored in a random access memory 72 which also provides temporary information storage areas. The operating system software is loaded into the random access memory 72 in the form of active files or modules needed for a given operating configuration.

The program for initializing the input/output processor and the low level controller control programs, which are fixed, are stored in a fixed memory 74.

A counter 76 is used to determine time periods for assuring, among others, "watchdog" functions to eliminate blockages in the exchange of data between the various components of the input/output processor.

A clock/calendar 78 computes the date and the time for use by the telewriting device. It is connected to a battery 80 so that the time and date information is retained even in the event of a power outage.

A light-emiting diode (LED) controller 82 turns on and off various diodes 54 to give a visual indication of the various operating states of the telewriting device. The diodes 54 can display the following states, for example: on/off, message received, telephone answering mode active, time-delayed call mode active.

A serial link controller 84 enables the telewriting device to exchange data with another external device using the same type of connection. This controller is used in particular for exchanging data with a personal computer, for example to transfer files.

A printer controller 86 provides the interface for connecting the telewriting device to a printer 15 for printing documents which can come either from telewriting input via the touch-sensitive screen 12 or from an external source. The printer controller is also used to print faxes.

A removable medium storage controller 88 provides the protocol for exchanging data with the diskette drive 46 for writing or reading data.

Similarly, a fixed medium storage controller 90 provides the protocol for exchanging data with the hard disk drive 48. The hard disk drive 48 contains all of the operating system, the application programs and document storage areas.

A direct memory access (DMA) controller 92 transfers data between the various controllers or the memory without using the central processor unit 70, using well-established techniques.

A power controller 94 manages and reduces the electrical power consumption of the various peripheral devices of the processor if they are not used for a specified period of time.

A modem controller 96 defines the use of the telephone handset 24' and/or the hands-free function of the telephone 14 integrated into the telewriting device, as well as connection of the modem 44 either to the input/output processor 40 (via the dedicated bus 66) or the applications processor 42 (via the dedicated bus 68) for transferring data.

An interrupt controller 97 receives interrupt signals from the various controllers and then interrupts the CPU 70, telling it which controller requires service.

A modem interface 98 connects the modem controller 96 to the dedicated bus 66 for the purpose of formatting signals exchanged on it.

The modem controller 96 operates directly on the modem interface 98 to control telephone operations either in hands-free mode or in handset mode, the "switch" signal 156a (FIG. 7) from the modem 44 indicating the on-hook or off-hook condition of the telephone handset 24'.

A processor interface 100 provides the connection to the applications processor 42 via the bidirectional bus 64 connecting the two processors.

All of the units constituting the input/output processor 40 are connected directly by a common bus 102 which has two branches 102a and 102b terminating respectively at the modem interface 98 and at the processor interface 100.

The interrupt controller 97 is also connected directly by dedicated wiring 104 to the various controllers 82 through 90 and to the counter 76, the modem interface 98 and the processor interface 100.

Figure 6:
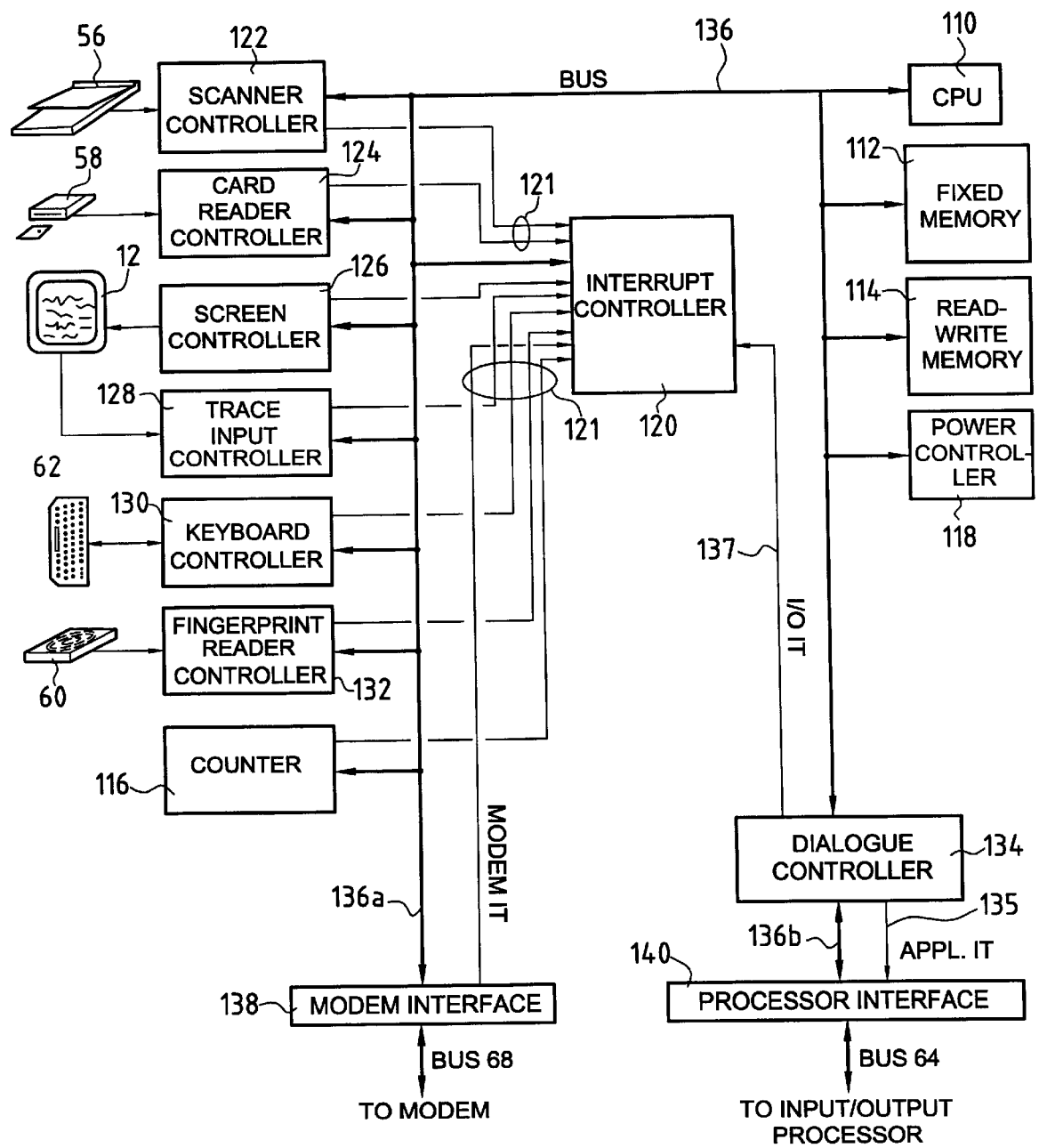
FIG. 6 is a detailed block schematic of the second control unit (applications processor) shown in FIG. 4.

FIG. 6 is a block schematic of the internal structure of the applications processor 42.

Like the input/output processor 40, the applications processor 42 includes a central processor unit (CPU) 110, a fixed memory 112, a random access memory 114, a counter 116, a power controller 118 and an interrupt controller 120.

The central processor unit 110 executes application programs of the telewriting device and controls the various controllers dedicated to the applications. In particular it controls all operations associated with operation of the touch-sensitive screen 12 and the man-machine interfaces such as the scanner 56, the card reader 58, the fingerprint reader 60 and the keyboard 62.

The fixed memory 112 contains the initialization program specific to the applications processor and the low-level control programs for the controllers controlled by the applications processor.

The random access memory 114 is used to store application programs specific to the applications processor 42 and for temporary storage of information.

The counter 116, the power controller 118 and the interrupt controller 120 have the same functions as their counterparts in the input/output processor 40. Like that of the input/output processor 40, the interrupt controller 120 of the applications processor is connected directly to its various controllers and to its counter by dedicated wiring 121.

A scanner controller 122 assures exchange of data with the scanner 56 for reading a printed document and converting it into information usable by the processor.

A card reader controller 124 provides the connection to the smart card reader 58 for reading information on the card and sending it to the CPU 110. Similarly, the CPU 110 can send information to the smart card reader 58 to write it on the card.

The touch-sensitive screen 12 is controlled by a screen controller 126 and a written input controller 128, the latter controlling the touch-sensitive membrane on top of the screen. The screen controller 126 provides the connection to the screen 12 for sending display information. In particular the controller 126 sends pictograms and control messages providing the man-machine interface via the touch-sensitive screen 12 and pixels to be displayed whose coordinates are obtained from the written input controller 128.

The written input controller 128 sends the coordinates of the position of the stylus 26 on the touch-sensitive screen 12 for tracking written traces.

A keyboard controller 130 provides the connection to the alphanumeric keyboard 62. The controller 130 sends the codes corresponding to the pressed keys to the CPU 110.

A fingerprint controller 132 provides the connection to the fingerprint reader 60. The reader 60 reads a fingerprint, converts the information and sends it to the CPU 110 via the controller 132.

The applications processor 42 also incorporates a dialogue controller 134 which transfers messages or data directly between the processor 42 and the input/output processor 40 by means of the bidirectional bus 64. The dialogue controller 134 is accessible directly by both processors 40, 42. It signals the presence of a message from a sending processor 42 or 40 by sending an interrupt signal APPLI IT or I/O IT to the interrupt controller 97 or 120 of the receiving processor 40 or 42.

In the case of a request to interrupt the input/output processor 40 at the initiative of the applications processor 42, the controller 134 sends the interrupt instruction APPLI IT to its processor interface 140 via direct wiring 135. The processor interface 140 sends the interrupt instruction APPLI IT over the bidirectional bus 64 to the processor interface 100 of the input/output processor, from where it is sent to its interrupt controller 97 via direct wiring 107.

In the case of a request to interrupt applications processor 42 at the initiative of the input/output processor, the request is sent to the dialogue controller via the bidirectional bus 64 and the terminating section 136b of the internal bus 136 of the applications processor 42. The dialogue controller 134 responds by forwarding the interrupt instruction I/O IT to the interrupt controller 120 via direct wiring 137.

Each processor 40, 42 has a reserved storage area in the dialogue controller 134.

The two processors can write in their storage area simultaneously and also read simultaneously the information contained in the storage area of the other processor within the dialogue controller 134.

All units controlled by the applications processor are connected by a common bus 136 having respective terminations 136a, 136b at the modem interface 138 and at the processor interface 140. The termination 136b at the processor interface 140 is under the control of the dialogue controller 134.

The modem interface 138 provides the connection to the modem 44 via the dedicated bus 68.

The processor interface 140 provides the connection to the input/output processor via the bidirectional bus 64 for connecting the interfaces 100, 140 of the two processors 40, 42.

Figure 7:
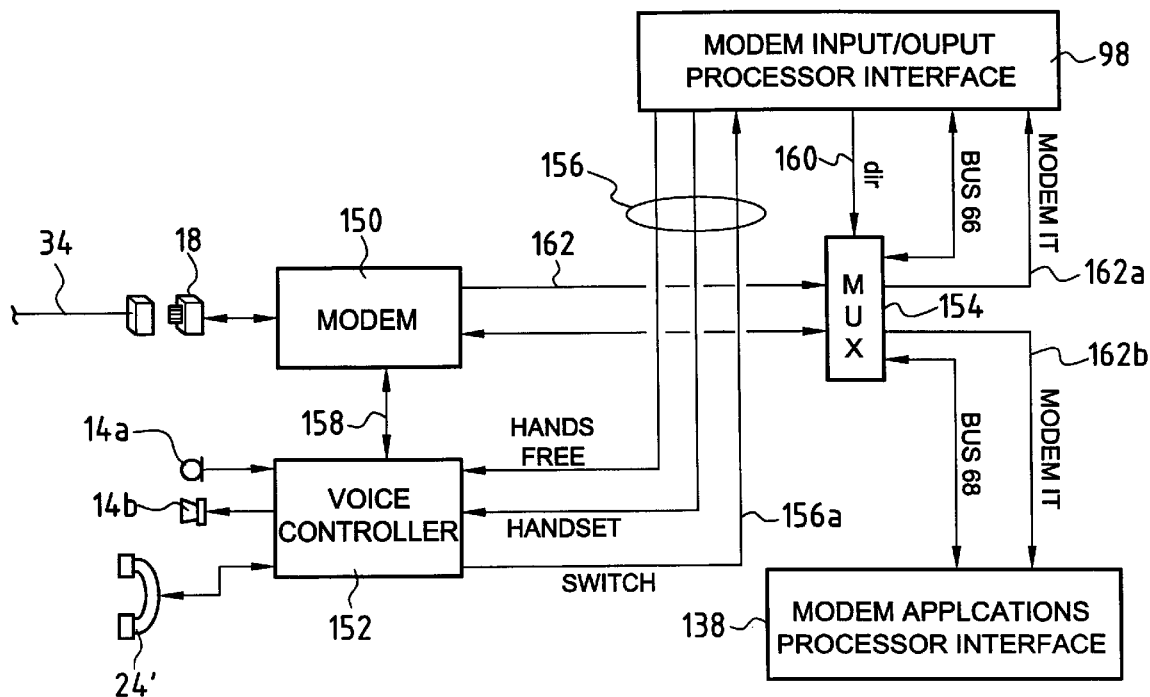
FIG. 7 is a detailed block schematic of the interface means (modem) shown in FIG. 4.

FIG. 7 represents the internal structure of the modem 44.

The modem 44 comprises a base modem circuit 150, a voice controller 152 and a data transfer multiplexer 154.

The base modem circuit 150 provides the connection to the telephone network via the telephone jack 18 to connect all the different possible information with the telewriting device, namely: voice only, data only, either in fax mode or in telewriting mode, or voice and telewriting data simultaneously.

The voice controller 152 is connected directly to the base modem circuit 150 by a dedicated transfer line 158. It handles the exchange of voice data from the telephone part of the telewriting device, in particular enabling operation using only the hands-free function, using only the confidential handset 24 or using the hands-free function and the confidential handset simultaneously. These telephone usage modes are realized by the voice controller 152 using commands sent over dedicated wiring 156 from the modem controller 96 in the input/output processor 40 via its modem interface 98.

The voice controller 152 sends to the modem interface 98 of the input/output processor 40 via a line 156a of the wiring 156 a signal ("switch") indicating to the modem controller 96 of the input/output processor the status of the confidential handset 24': either on-hook or off-hook.

The data transferred over the telephone line 34 can be directed either to the input/output processor 40 via the bus 66 or to the applications processor 42 via the bus 68. A signal "dir" from the modem controller 96 of the input/output processor to the multiplexer 154 via dedicated wiring 160 directs the connection of the base modem circuit 150 relative to the two processors via the multiplexer 154.

Transfer requests from the modem 44 are also directed by means of a MODEM IT signal to the processor concerned. The base modem circuit 150 sends the transfer request via a signal line 162 to the multiplexer 154 which sends it to the modem interface 98 or 138 via dedicated wiring 162a and 162b connecting the multiplexer 154 to the modem interface 98 of the input/output processor and to the modem interface 138 of the applications processor, respectively.

Operating Modes

The various operating modes of the embodiment of a telewriting device described with reference to FIGS. 1 through 7 will now be explained. These operating modes employ various communication protocols either for internal transfer of data between the input/output processor 40 and applications processor 42 or between either of them and the modem 44 via the corresponding dedicated bus 66 or 68.

Transfer Between Processors

Figure 8A:
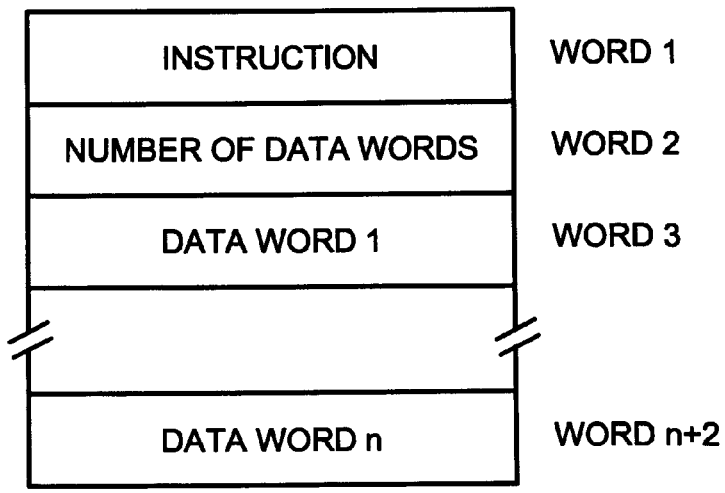
FIG. 8A shows the structure of a message between the input/output processor and the applications processor or between two telewriting devices when it is made up of a variable number of words.

The dialogue controller 134 incorporated in the applications processor 42 transfers information between the input/output processor 40 and the applications processor 42. Information is transferred between these processors by means of messages having a predetermined structure. The structure of one such message is represented schematically in FIG. 8A.

A message is made up of one or more words (word 1–word n+2), the first word (word 1) always representing an instruction indicating the operation to be effected.

The message can incorporate one or more data words (word 2–word n+2). If the message includes a data word, the word (word 2) following the instruction (word 1) represents the number of data words contained in the message. The most significant bit of the instruction word indicates if the message contains data to read.

Figure 9:
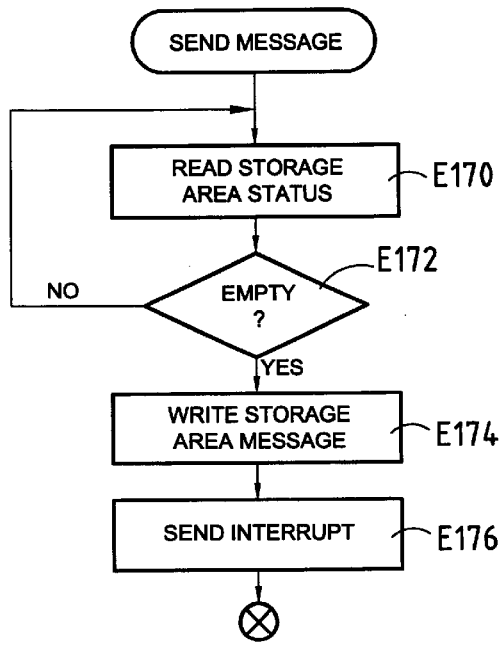
FIG. 9 is a flowchart of the operation of writing a message in a dialogue controller transferring data between the input/output processor and the applications processor.
Figure 10:
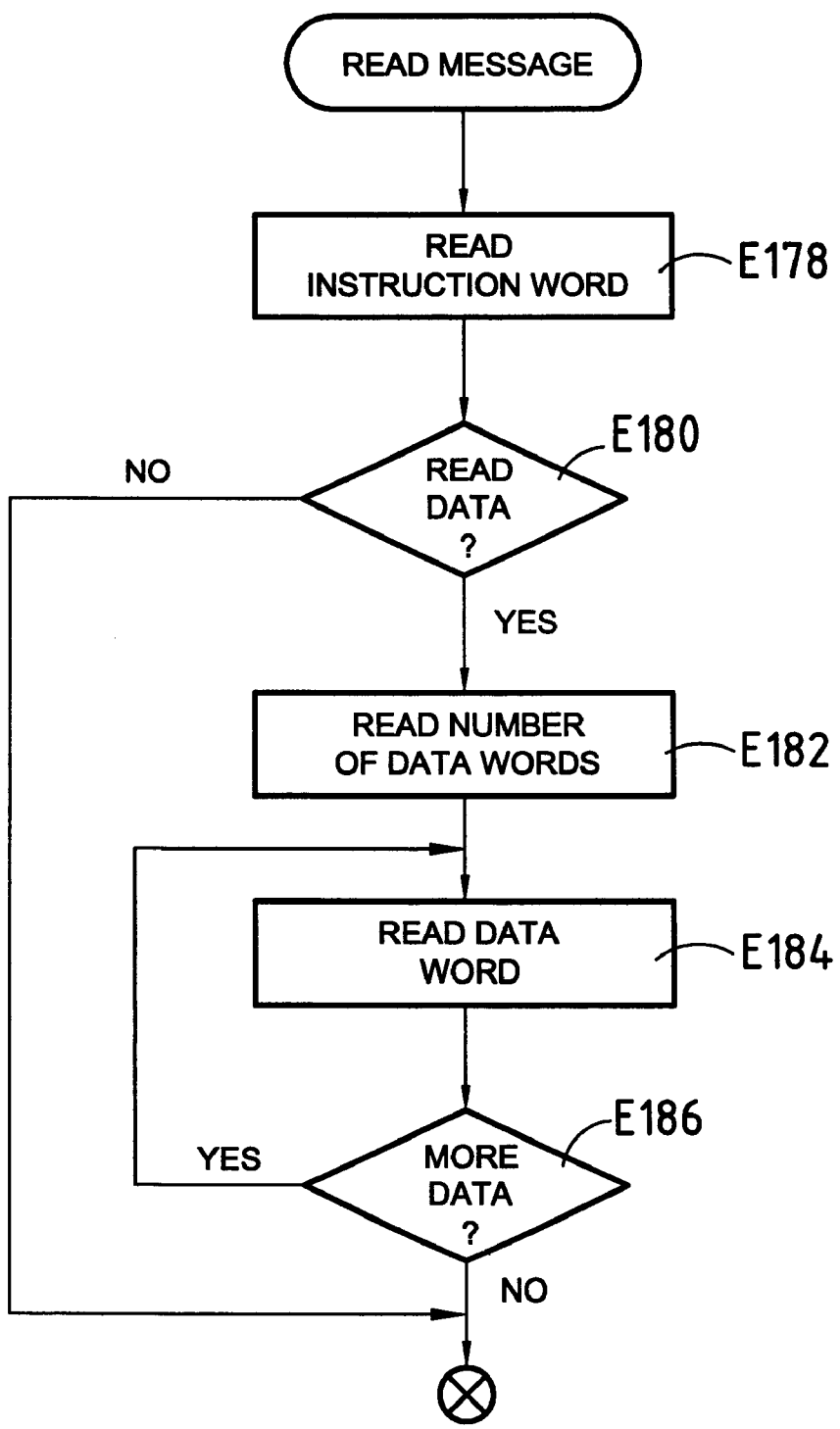
FIG. 10 is a flowchart for reading of a message structured in accordance with FIG. 8A by one of the processors.

The procedure for sending a message from one processor to another will now be explained with reference to the flowcharts of FIGS. 9 and 10. This procedure comprises a phase of the sending processor writing the message in the dialogue controller 134 (FIG. 9) and the receiving processor reading this message (FIG. 10). As shown in FIG. 9, when one processor has to send a message or data to the other processor, it first verifies by reading the storage status (E170) that the dedicated storage area in the dialogue controller 134 is free of any oat information that has not been read by the destination processor (E172). if this is the case it writes the message or the data in the storage area (E174) and then tells the dialogue controller that it must tell the other processor that a message or data is available in the storage area. The dialogue controller then advises the destination processor by means of an interrupt signal APPLI IT (E176) (cf. FIG. 6) if the destination is the input/output processor 40 or a signal I/O IT if the destination is the applications processor 42, using the tasks described previously.

The destination processor reads the information in the storage area and then tells the dialogue controller 134 that the read operation has been completed, authorizing the sending of other information.

As shown in FIG. 10, the receiving processor receives and reads the interrupt instruction word and looks for the message in its storage area in the dialogue controller 134. The message is then analyzed according to its structure, as described with reference to FIG. 8A. This operation consists in first reading the instruction word (word 1) (E178) and then determining if this instruction is followed by data (E180). If this is the case, the receiving processor reads the word (word 2) indicating the number of data words (E182) and the successive data words (word 3–word n+2), verifying after each read the existence of further data words to read (E186).

The interrupt level of the dialogue controller 134 is preferably assigned the highest priority for each processor, so assuring immediate servicing of this interrupt.

Each storage area is written only by one processor and read only by the other processor. Writing is possible only if the storage area does not contain information that has-not been read by the other processor. Similarly, reading is possible only if the storage area contains information written by the other processor.

In the examples of operation of the device described with reference to FIGS. 11 through 22 it is to be understood that data is exchanged between the input/output processor 40 and the applications processor 42 in the same device in accordance with the protocol described with reference to FIGS. 9 and 10.

Transfer Between Telewriting Devices

Information or data is transferred between two or more telewriting devices by means of the modem 44 of each device. Each transfer of information consists of a message. The information comprises one or more words each of which is formed of a fixed number of bytes. The first word always represents an instruction indicating an operation to be executed. This instruction word can be followed by data words incorporated in the message. Depending on the type of instruction, the message can contain a varying number of data words, in which case the message will have a structure similar to that shown in FIG. 8A.

Figure 8B:
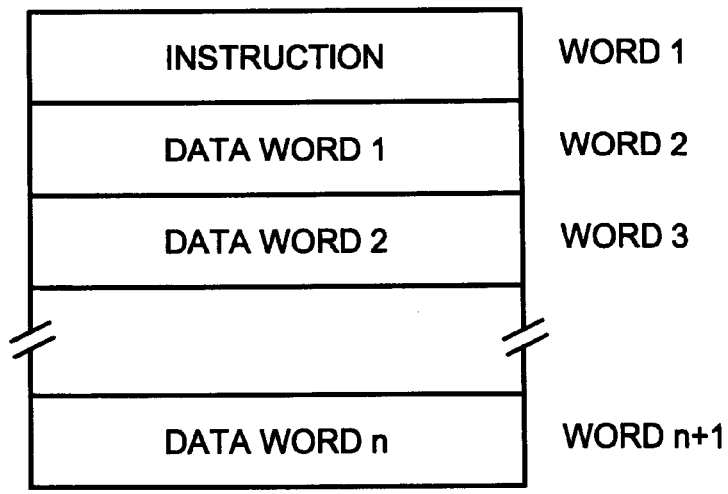
FIG. 8B represents the structure of a message between two telewriting devices when the number of words constituting it is fixed.

The message can equally define implicitly a fixed number of data words after the instruction word, so avoiding the incorporation of a word to indicate the number of data words. The structure corresponding to this latter type of message is represented in FIG. 8B.

Operation in Fax Mode or in Other-data Exchange Mode (Data Mode)

In fax mode and in data mode the telewriting device transfers or receives data only over an external telephone line 34 (FIG. 3) via the modem 44. In this case, the input/output processor 40 executes the transaction and the transfer or the reception of data with the modem using the dedicated bus 66.

Figure 11:
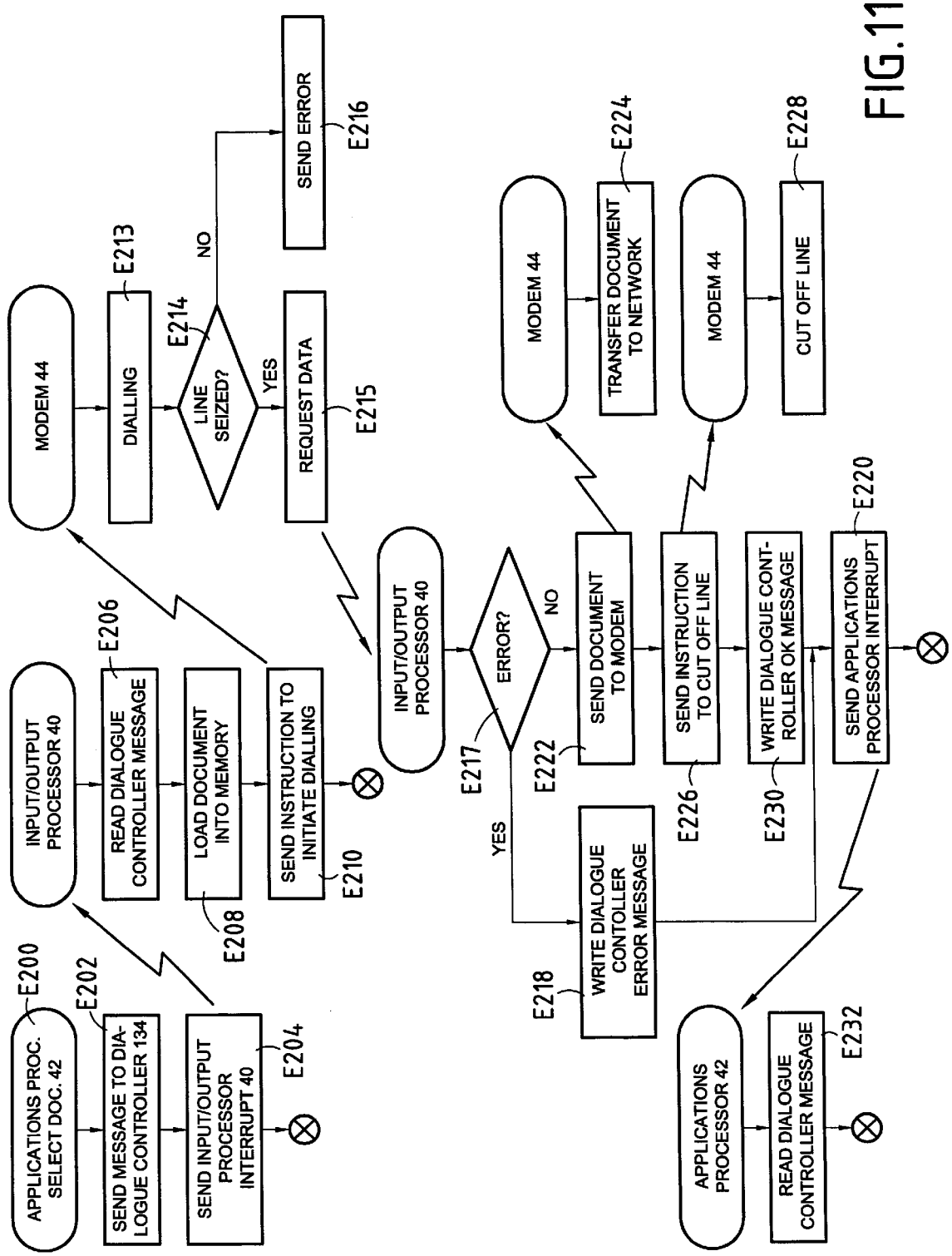
FIG. 11 is a flowchart for transferring only other data constituting a document via the modem (fax mode/data mode)

Transfer from a telewriting device to a fax or modem type device or other (one-way) mode of sending of data constituting a document stored in a storage unit will now be described in detail with reference to FIG. 11.

In the case of sending a stored document to a storage unit of the sending telewriting device, the user of the sending device selects the necessary information by means of the application software running on the applications processor 42 (E200). When all the required information has been acquired, the applications processor 42 sends the input/output processor 40 a message via the dialogue controller 134 indicating that the processor must send documents (E202). As explained with reference to FIG. 9, this message is followed by an instruction to interrupt the input/output processor (E204), telling it that it must read a message. The applications processor will then be free to perform another task. In this case the message consists of an instruction and data signifying: the number to call, the designation of the storage unit containing the document and the name of the document.

The input/output processor reads the message (E206), loads the document to send into memory (E208) and then sends an initialization and dialling instruction to the modem 44 (E210). The modem 44 responds by dialling to set up the connection to the other party (E213). If line seizure is successful (E214) the modem asks to receive the data from the input/output processor (E215). If line seizure fails, the modem sends an error message telling the user that the number is temporarily unobtainable (E216–E218), causing sending to be interrupted (E220), which is notified to the applications processor 42.

When the line is seized, the input/output processor sends the document to the modem (E222) which transfers the document over the telephone network 134 (E224). On completion of sending of the document, the input/output processor sends to the modem the instruction to break the connection (E226) authorizing it to terminate the connection (E228).

The input/output processor then writes a message to the dialogue controller 134 signifying that sending has succeeded (E230) followed by an instruction to interrupt the applications processor (E220) using the procedure described within reference to FIG. 9, enabling the applications processor to read the message in the dialogue controller (E232) in accordance with the procedure described with reference to FIG. 10.

Figure 12:
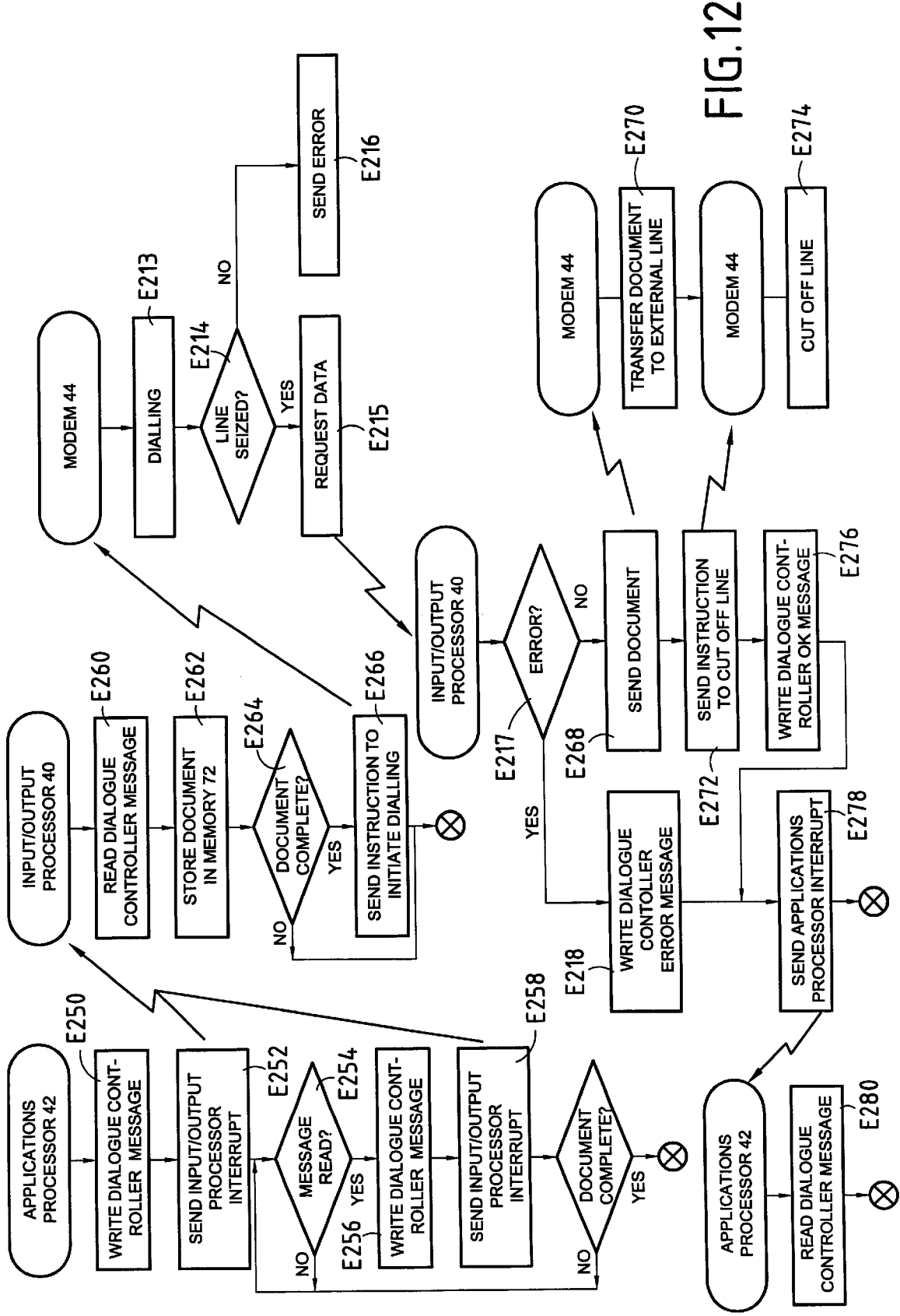
FIG. 12 is a flowchart for transferring a document already present on the screen of a device via the modem (fax mode/data mode)

Transfer from a telewriting device to a fax or modem type device or other (one-way) mode of sending of data constituting a document on the screen 12 under the control of the applications processor will now be described with reference to FIG. 12.

In the case of sending a document on the screen 12 of the telewriting device, after the required information is selected the applications processor 42 sends the input/output processor 40 a message indicating that it must send the document contained in the applications processor using the procedure described with reference to FIG. 9 (E250–E252).

This message comprises an instruction and data signifying the number to call and the data block representing the document.

If the document is larger than the storage area of the dialogue controller 134 more than one message is sent to the input/output processor. In this case the subsequent messages comprise an instruction and the block of data representing the continuation of the document. The final data message includes an instruction indicating the end of the document.

After verifyg (E254) that this message has been read by the input/output processor, in accordance with the procedure described with reference to FIG. 10, the applications processor sends the data corresponding to the required selection to the dialogue controller (E256) followed by an instruction to interrupt the input/output processor (E258).

On receiving this latter instruction, the input/output processor reads the message in the dialogue controller (E260) and extracts from it the document or the part of the document and enters it in its random access memory 72 (E262).

If the message corresponding to the selected information is incomplete, for example if it is too long to fit in the memory space of the dialogue controller, the applications processor repeats the operations of loading this memory space (E256, E258) which are read again by the input/output processor (E260, E262). These operations (E256–E262) are repeated as many times as necessary to load all the selected information.

When transfer of the complete document to the input/output processor 40 (E264) has been verified, the processor sends the initialization and dialling instruction to the modem 44 via the dedicated bus 66 (E266).

On receiving this instruction, the modem dials and seizes the line, with an error indication in the event of failure, as explained previously with reference to FIG. 11 (steps E216 through E220). Once the connection has been set up (E214), the modem requests data from the input/output processor which then sends the document to the modem via the dedicated bus 66 (E268) for transfer over the external telephone line 34 (E270). At the end of sending of the document the input/output processor sends the modem an instruction to break the connection (E272). The modem then performs a routine to break the connection (E274) and the input/output processor then writes a message indicating that the transfer was successful (E276) followed by an instruction to interrupt the applications processor (E278), enabling it to read a report message in the dialogue controller 134 (E280).

The final steps of this operation (E274 through E280) are effected in the same manner as the respective steps E228 through E240 described with reference to FIG. 11.

Figure 13:
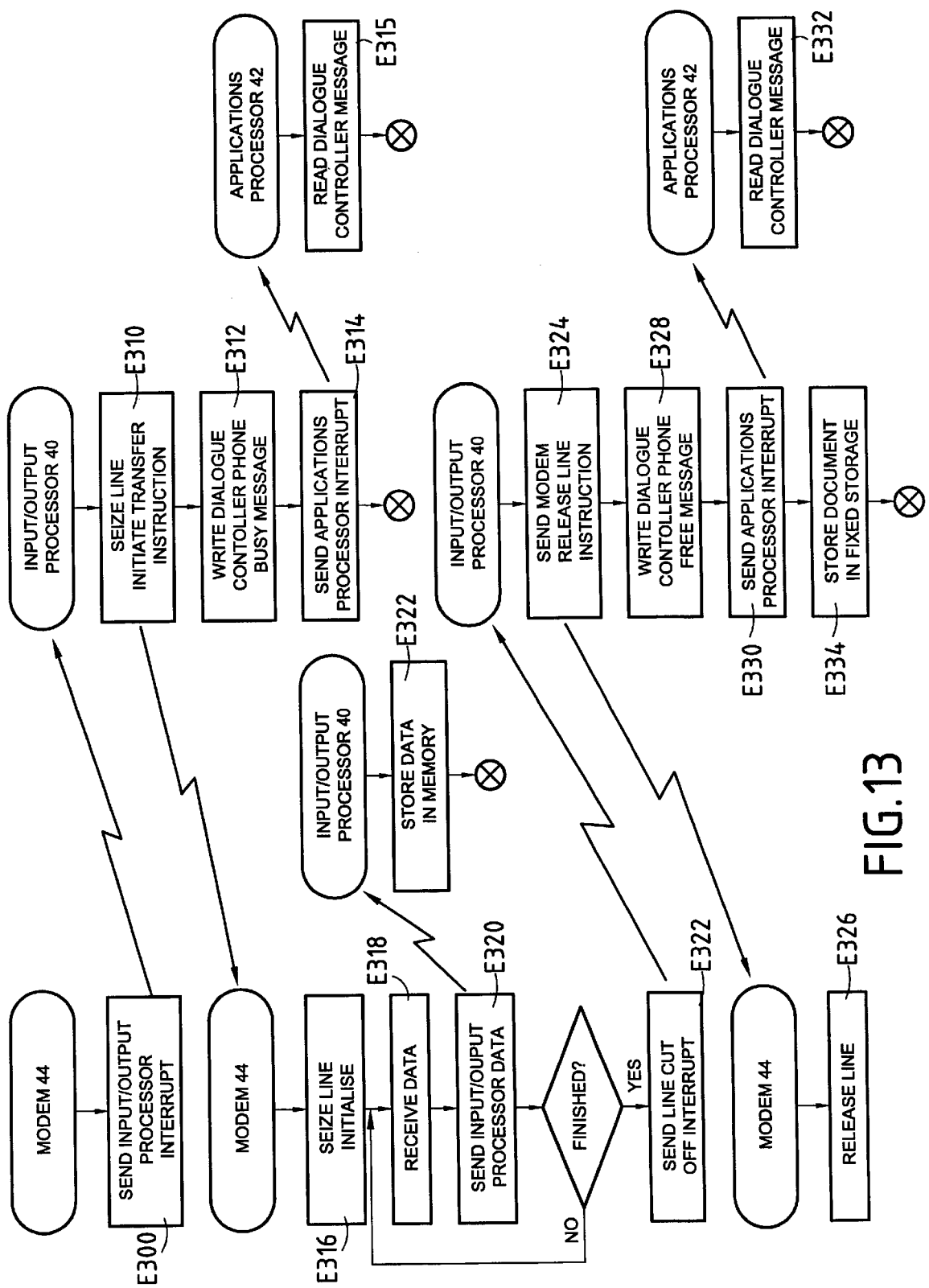
FIG. 13 is a flowchart for receiving a document from a fax type or modem type device.

Reception by a telewriting device of data constituting a document sent from a fax or modem type device will now be described with reference to FIG. 13. In these figures the modem 44, the input/output processor 40 and the applications processor 42 are part of the telewriting device that receives data.

When the modem 44 receives a call from another fax or modem type device on the telephone line it sends an instruction to interrupt the input/output processor (E300) which responds by commanding the modem to seize the line and initialize the transfer (E310). At the same time the input/output processor writes a message indicating that the telephone is busy (E312) and sends an instruction to interrupt the applications processor (E314), enabling it to read this message from the dialogue controller 134 (E315) (cf. FIGS. 9 and 10).

After receiving the instruction, the modem of the receiving device seizes the line, performs the initialization (E316) and receives the data transferred over the telephone line (E318). This data is transferred over the dedicated bus 66 to the input/output processor where it is stored in memory (E320, E322), At the end of sending of the data the modem sends the input/output processor an instruction to break the connection and an interrupt (E322), the input/output processor sending back an instruction to release the line (E324) that will be executed by the modem 44 (E326).

The input/output processor then writes a message to the dialogue controller indicating that the telephone is free (E328) followed by an instruction to interrupt the applications processor (E330), enabling it to read the message in the dialogue controller (E332) (cf. FIGS. 9 and 10).

Finally, the input/output processor stores the transferred document on the fixed storage unit 48 (E334).

Note that the applications processor 42 of the receiving device is not involved in any way in receiving a document except that it is informed of the status of the external telephone line. Accordingly, a user task such as document entry or printing can be effected without interruption. This advantage is due to the specific architecture in accordance with the invention based on the use of two processors respectively dedicated to input and output tasks and to application management tasks, the two processors being independently connected to the modem 44.

Operation of the Telewriting Device in Interactive Mode

The telewriting device in accordance with the present invention enables interactive voice and written (written input) communication between two or more parties. The data communication mode is full duplex. This interactive mode is initialized by one party after seizing the line. In the following description, the telewriting device initializing the mode will be referred to as the "initiating" device and the other telewriting device will be referred to as the "receiving" device.

The interactive mode supports two functions: interactive creation of a document and interactive updating of an existing document.

The interaction of the processors with regard to receiving and sending information will be different depending on the function.

Interactive Document Creation

Figure 14:
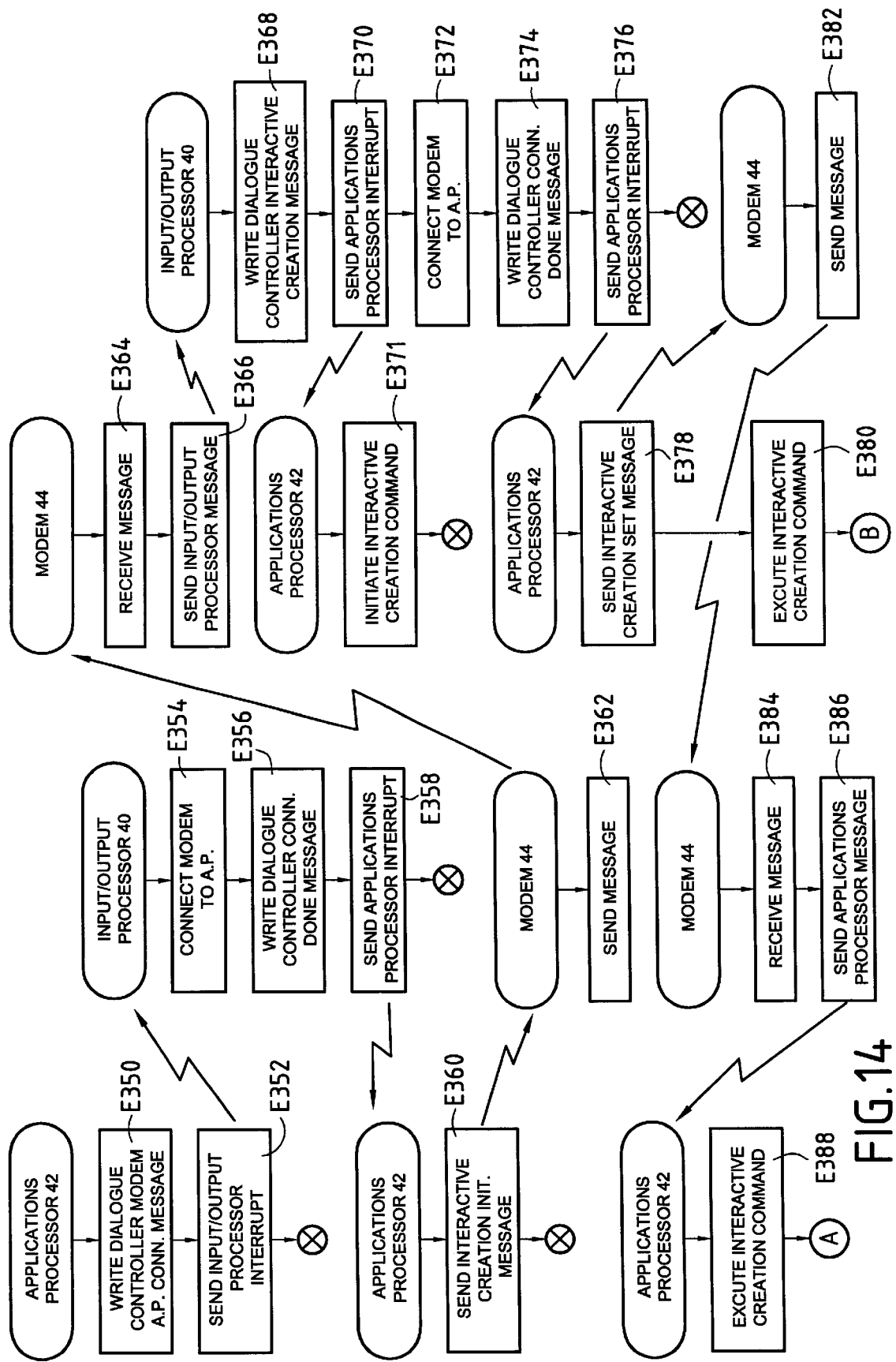
FIG. 14 is a flowchart for the phase of initializing two telewriting devices when they perform interactive voice communication and written input for interactive creation of a document.

The sequences of operations in the case of interactive creation of documents will be now be described with reference to the flowcharts of FIGS. 14, 15 and 16 which respectively relate to the initialization phase, the interactive communication phase and the end of communication phase.

In the initialization phase (FIG. 14) the applications processor 42 of an initiating telewriting device sends to the dialogue controller 134 of its input/output processor 40 a request to set up and to maintain a connection between the modem 44 and the applications processor (A.P.) via the dedicated bus 68 (E350) followed by an instruction to interrupt the input/output processor (E352). On receiving this request and the interrupt instruction, the input/output processor sets up the connection between the modem 44 and the applications processor via the dedicated bus 68 (E354). It then sends the dialogue controller 134 a message indicating that the connection has been opened (E356) followed by an instruction to interrupt the applications processor (E358).

Once the connection has been set up the applications processor sends the modem a message for initializing interactive creation so that it sends it to the modem 44 of the receiving telewriting device (E360, E362).

This modem receives the interactive creation initialization message (E364) which is sent to the input/output processor 40 of the receiver (E366) which forwards it to the applications processor of the receiving device 42 (E368, E370) to enable the device to initialize the interactive creation command (E371).

The input/output processor of the receiving device then sets up the connection between the modem and the applications processor via the dedicated bus 68 (E372) and sends the dialogue controller 134 a message indicating that the connection has been set up (E374, E376).

The applications processor of the receiving device then sends to the modem 44 of the receiving device a message indicating that interactive creation has been initialized (E378). The applications processor of the receiving device then goes to an interactive creation command execution mode (E380), executing a sequence of interactive operations with the initiating telewriting device that will be described with reference to branch B of the FIG. 15 flowchart.

The message indicating that interactive creation is set is sent by the modem of the receiving device (E382) to the modem of the initiating device which, after receiving it (E384), sends it to the applications processor of the initiating device (E386). On receiving this message the applications processor goes to the interactive creation command execution mode (E388), executing a sequence of interactive operations that will be described with reference to branch A of the FIG. 15 flowchart.

After the initialization phase the telewriting devices can enter the interactive communication phase.

In this phase, each passage of the stylus 26 over the touch-sensitive screen 12 in the writing area will have the effect of displaying a series of pixels corresponding to the trace made on the same touch-sensitive screen and of sending the values and the addresses of this series of pixels over the telephone line 34 to the other party for display of the trace in real time on their screen. This exchange can be effected in both directions in real time. Similarly, each movement of the stylus on the touch-sensitive screen in the command area 28A or the status area 28B (FIG. 2) will have the effect of executing the selected sub-command.

After detecting the stylus in the writing area, the applications processor 42 associated with the touch-sensitive screen 12 will display the series of pixels on the screen and will send to its modem 44 via the dedicated bus 68 a message containing the addresses and the values of the pixels constituting the trace. This modem 44 will then send this message to the other party.

When the stylus is used to confirm commands or states, the applications processor executes the corresponding sub-command and then, as appropriate, will send to its modem 44 via the dedicated bus 68 a message indicating execution of that command. The modem will then send this message to the other party.

In the receiving telewriting device the modem 44 will receive the message and send it to the applications processor 42 of the receiving device directly via its dedicated bus 68. After receiving the message the applications processor will execute the instruction contained in the message.

The interactive document creation commands employ a number of sub-commands for managing the document being produced, for example: delete area, change color, etc. Some commands send to the other party an execution instruction specifying the nature of the command to be executed.

An example of interactive communication between two telewriting devices will now be described with reference to FIG. 15.

In the following description, the communicating devices designated device 1 and device 2 send and receive as appropriate to the various phases of the exchange process.

Consider the case where device 1 sends a sequence of pixels corresponding to telewriting input on device 1 to device 2 for display on its display screen. After the initialization phase, the device 1 (which is the initiating device in this example) begins the data sending sequence (branch A). On each detection of a coordinate point designated by the stylus 26 on the interactive screen 12 (E450), the applications processor determines if this is a designation on the input screen or in the command or status area 28A, 28B (E452). in the latter case, it executes the corresponding command (E454). It then detects if there is an instruction to send (E456) and, if so, sends it to the modem 44 via the dedicated bus 68 (E458). The modem then forwards it to the modem of device 2 of the other party (E460).

If the stylus 26 makes a trace on the writing surface, the corresponding pixels are detected in the form of a sequence of coordinates that can constitute a data message. This message will be sent to the modem 44 (E462) over the dedicated bus 68 for sending to device 2 of the other party (E460).

The modem 44 of device 2 receives the message (E464) and sends it directly to the applications processor 42 via the dedicated bus 68 (E466).

The applications processor then determines if the message concerns pixel data (E468). if so, it performs the operations for displaying the series of pixels in order to reproduce the trace on its screen (E470). If not, the applications processor decides that this is an instruction and executes it (E472).

Device 2 can send manuscript trace data at any time using exactly the same protocol. It is then possible for one of the communicating devices to send traces to another device even though that other device is sending other traces to the other party. Communication of written input is then totally interactive and takes place in real time (at the level of human perception).

Figure 15:
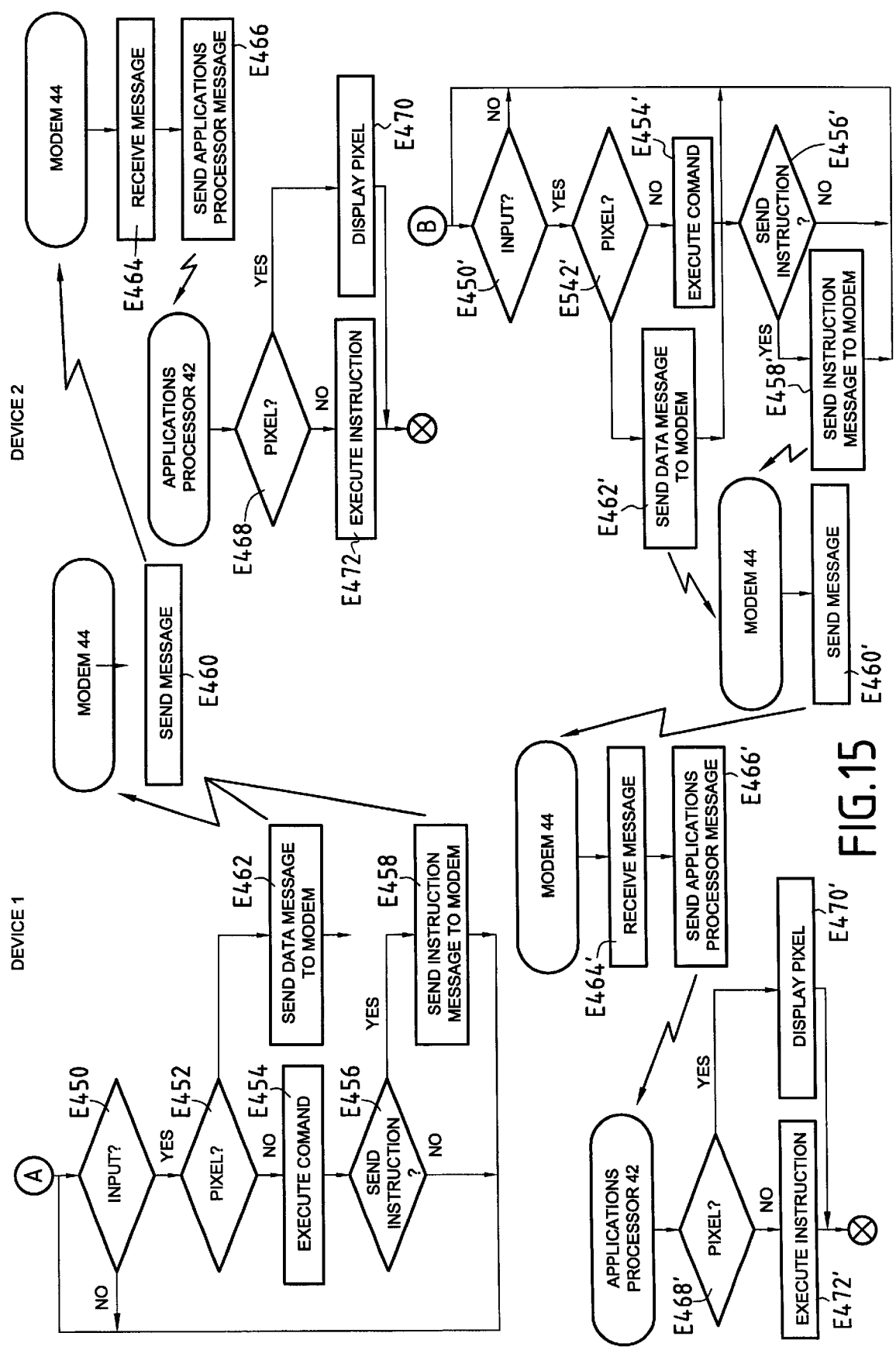
FIG. 15 is a flowchart of the active phase of communication between two telewriting devices after initialization for interactive creation of a document
Figure 16:
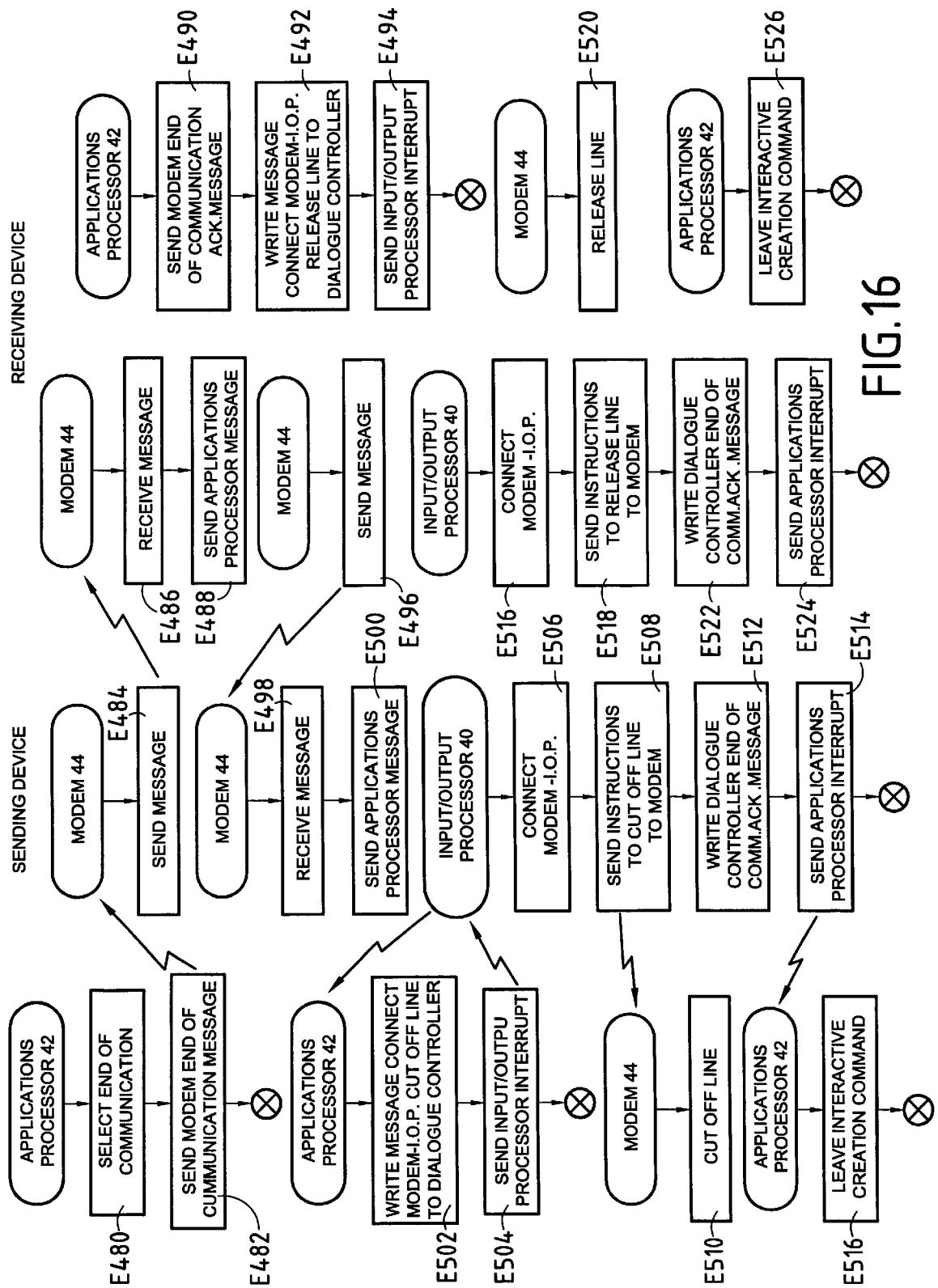
FIG. 16 is a flowchart of the phase of end of communication between two telewriting devices during interactive creation of a document.

Sending of manuscript trace data by device 2 to device 1 is represented in the lower part of the FIG. 15 flowchart, starting with branch B (end of initialization phase) for device 2. These operations being entirely symmetrical vis à vis the operations described previously for sending from device 1 to device 2, for conciseness they will not be explained again. The corresponding steps are indicated by the same references with the symbol "'".

The end of communication phase will now be described with reference to FIG. 16.

In the following description the device signalling the end of interactive communication is called the sending device and the device receiving the end of interactive communication instruction is called the receiving device.

After selection of the end of communication command entered by the stylus 26 on the interactive screen 12 of the sending device (E480) the applications processor 42 of the sending device sends an end of communication message to the modem 44 via the bus 68 (E482). This modem sends the message to the modem 44 of the receiving device (E484) which receives the message (E486) and sends it to the applications processor of the receiving device (E488). The applications processor responds by sending back to the modem 44 of the receiving device an end of the communication-acknowledge message (E490) and writes in the dialogue controller a message requesting the connection between the modem and the input/output processor on the designated bus 66 and release of the line (E492), this message being signalled by sending an interrupt instruction to the input/output processor (E494).

In parallel with this, the modem 44 of the receiving device sends to the sending device the communication-leave message received from the applications processor (E496). After receiving this message (E498) the modem of the sending device sends it to the applications processor via the dedicated bus 68 (E500). The applications processor responds by writing a message to the dialogue controller 134 requesting the connection between the modem and the input/output processor of the sending device via the dedicated bus 66 and cutting off of the line to the dialogue controller 96 (E502), this message being followed by sending an instruction to interrupt the input/output processor (E504).

On receiving this message, the input/output processor (I.O. P.) of the sending device sets up the direct connection between the device and the modem 44 (E506) and sends the instruction to break the connection to the modem via the dedicated bus 66 (E508). At the same time as this instruction is executed by the modem (E510) the input/output processor of the sending device writes an end of the communication-acknowledge message to the dialogue controller 134 (E512) and sends an instruction to interrupt the applications processor (E514). The applications processor responds by acknowledging the interactive creation command and returns to waiting for selection of a command (E516).

At the receiving device, the command to release the line (E492, E494) sent to the input/output processor causes it to set up the connection between the modem 44 and the input/output processor of the receiving device on the dedicated bus 66 (E516). The input/output processor then sends the instruction to release the line to the modem (E518) which responds by releasing the line (E520).

The input/output processor of the receiving device then writes an end of the communication-leave message to the dialogue controller 134 followed by an instruction to interrupt the applications processor (E522, E524) to which the applications processor responds by leaving the interactive creation command mode (E526).

Interactive Updating of a Document

This function enables two or more parties to update a document interactively. The original document is contained in the initiating telewriting device. It can comprise one or more successive pages formed of text and/or graphics. The page of the document displayed on the screen 12 of the initiating device will be called the active page.

Figure 19A:
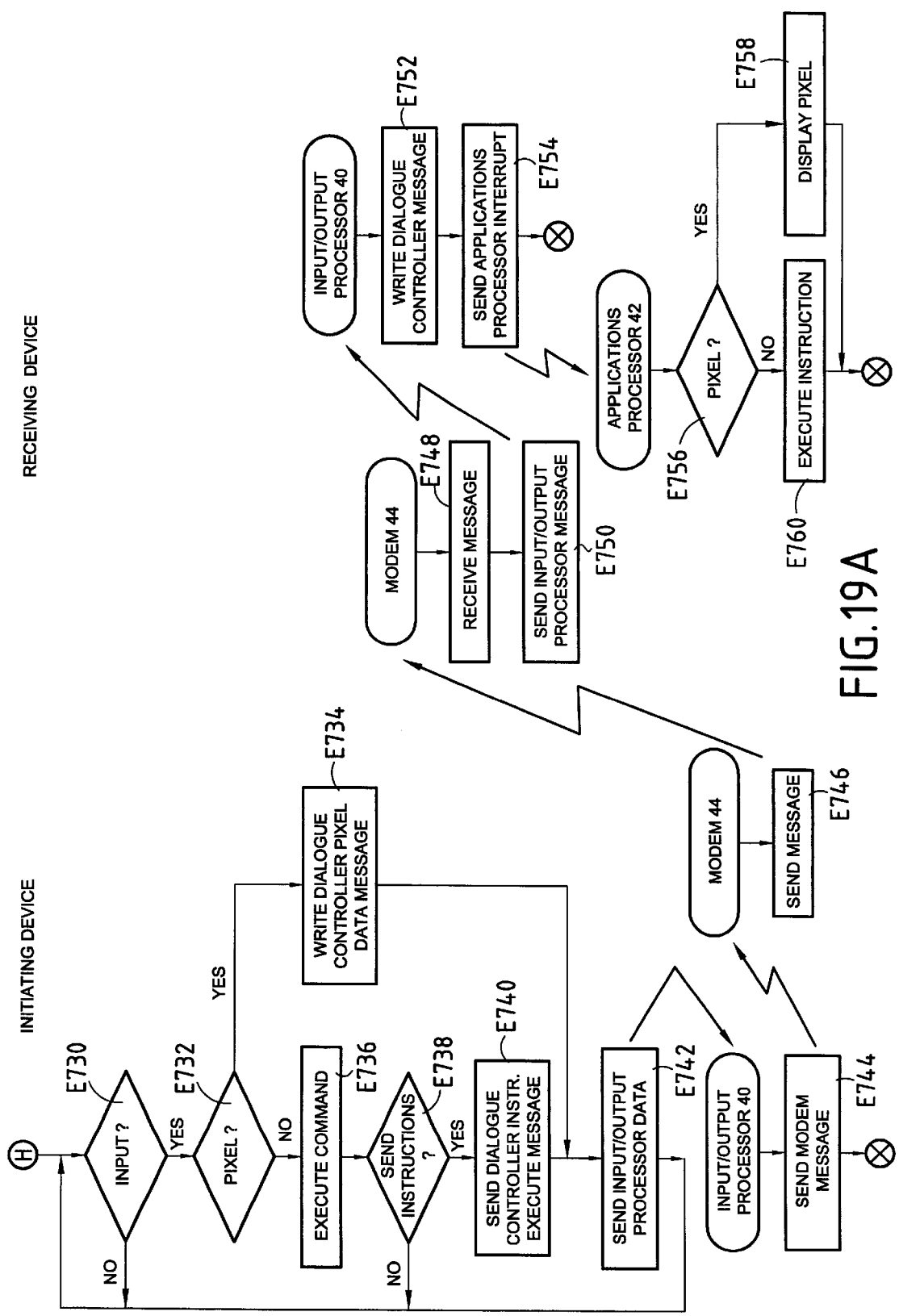
FIGS. 19A and 19B represent on two separate sheets the flowchart of the activity of the applications processors during the phase of interactive communication in writing mode when the input/output processor must also send other data (remaining page) during interactive updating of a document.
Figure 19B:
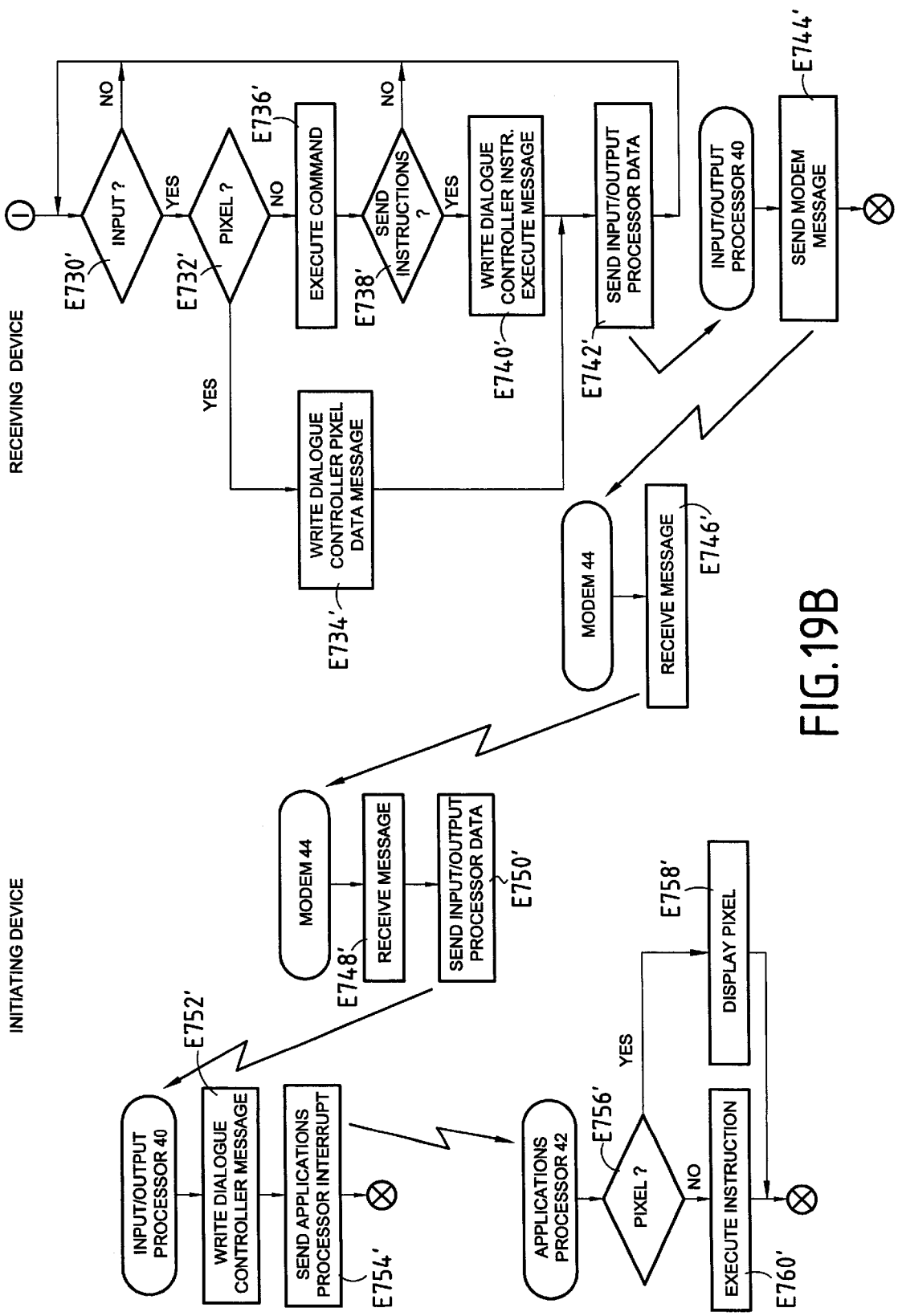
Figure 20:
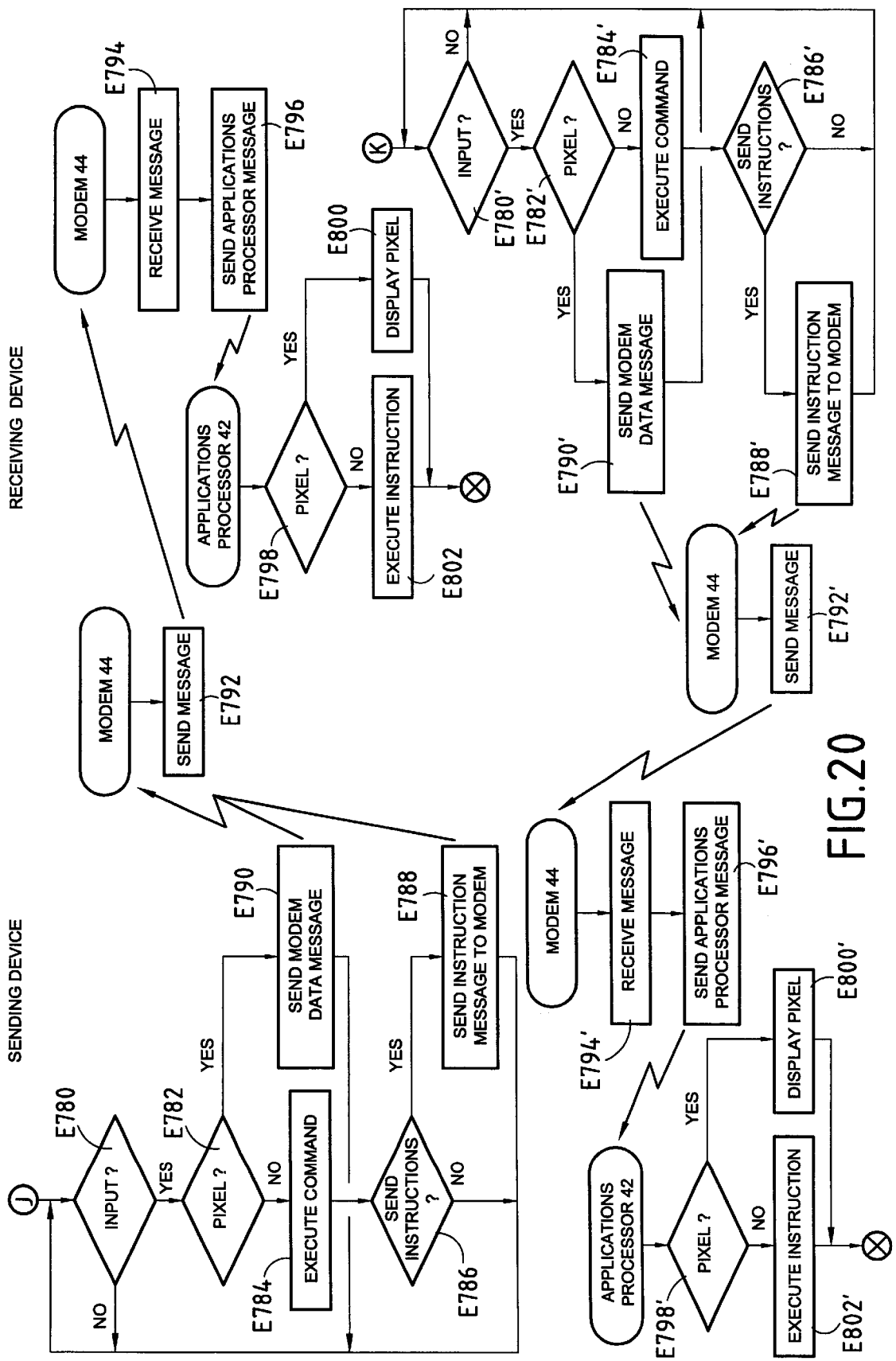
FIG. 20 is a flowchart of the phase of interactive communication when the applications processors of two telewriting devices are connected directly to their modem during interactive updating of a document.

This function includes an initialization phase (FIGS. 17A, 17B, 17C, 17D), an interactive communication phase (FIGS. 18A, 18B and 19) and an end of communication phase (FIG. 20).

Figure 17A:
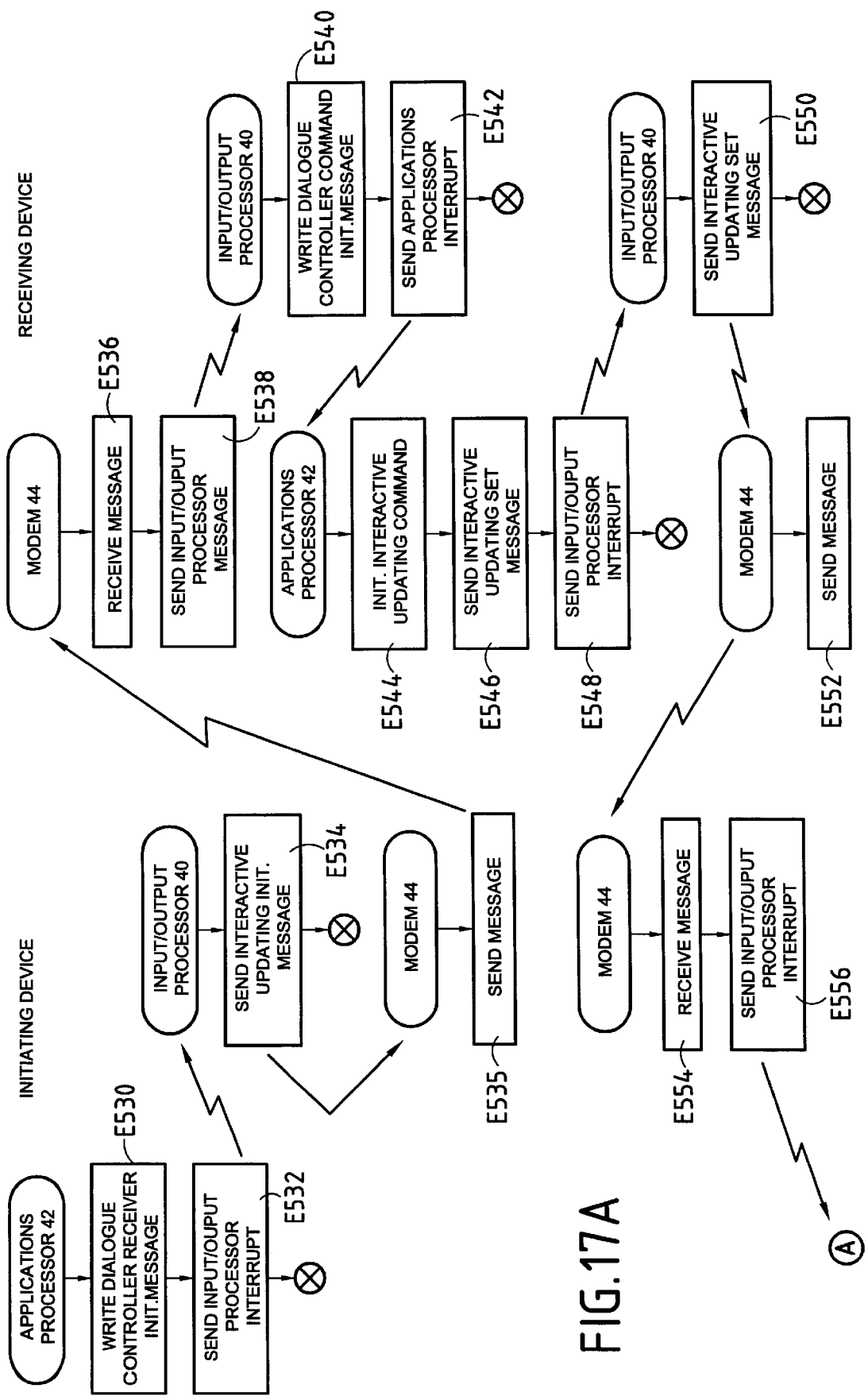
FIGS. 17A, 17B, 17C and 17D represent on four sheets the flowchart of the phase of initializing two telewriting devices during interactive updating of a document contained in one telewriting device.

The initialization phase will now be described with reference to FIG. 17A.

When the interactive document updating mode is initialized, the applications processor 42 of the initiating device sends to its input/output processor a message requiring initialization via the dialogue controller 142 followed by an instruction to interrupt the input/output processor (E530, E532).

On receiving this message the input/output processor sends an initialization and interactive updating message to the modem 44 (E534) for it to send to the modem of the receiving device (E535).

The modem of the receiving device receives the message (E536) and sends it to the input/output processor of the receiving device via the dedicated bus 66 (E538). The input/output processor then writes a command initialization message to the dialogue controller (E540) followed by an instruction to interrupt the applications processor (E540, E542), enabling it to read the message and to initialize the interactive updating command (E544).

Once this interactive updating message has been sent, this status is signalled to the input/output processor by sending an instruction to interrupt it (E546, E548). The input/output processor then sends to the modem 44 the message indicating that interactive updating has been set at the receiving telewriting device (E550), this message being sent to the modem of the initiating device (E552). Once received by the initiating device (E554), this message is sent to the input/output processor of this device (E556).

The initialization procedure then continues with the transfer of data constituting the document to be updated from the initiating device to the receiving device (branch A; FIG. 15). In this example the active page is displayed on the display screen of the initiating device.

Figure 17B:
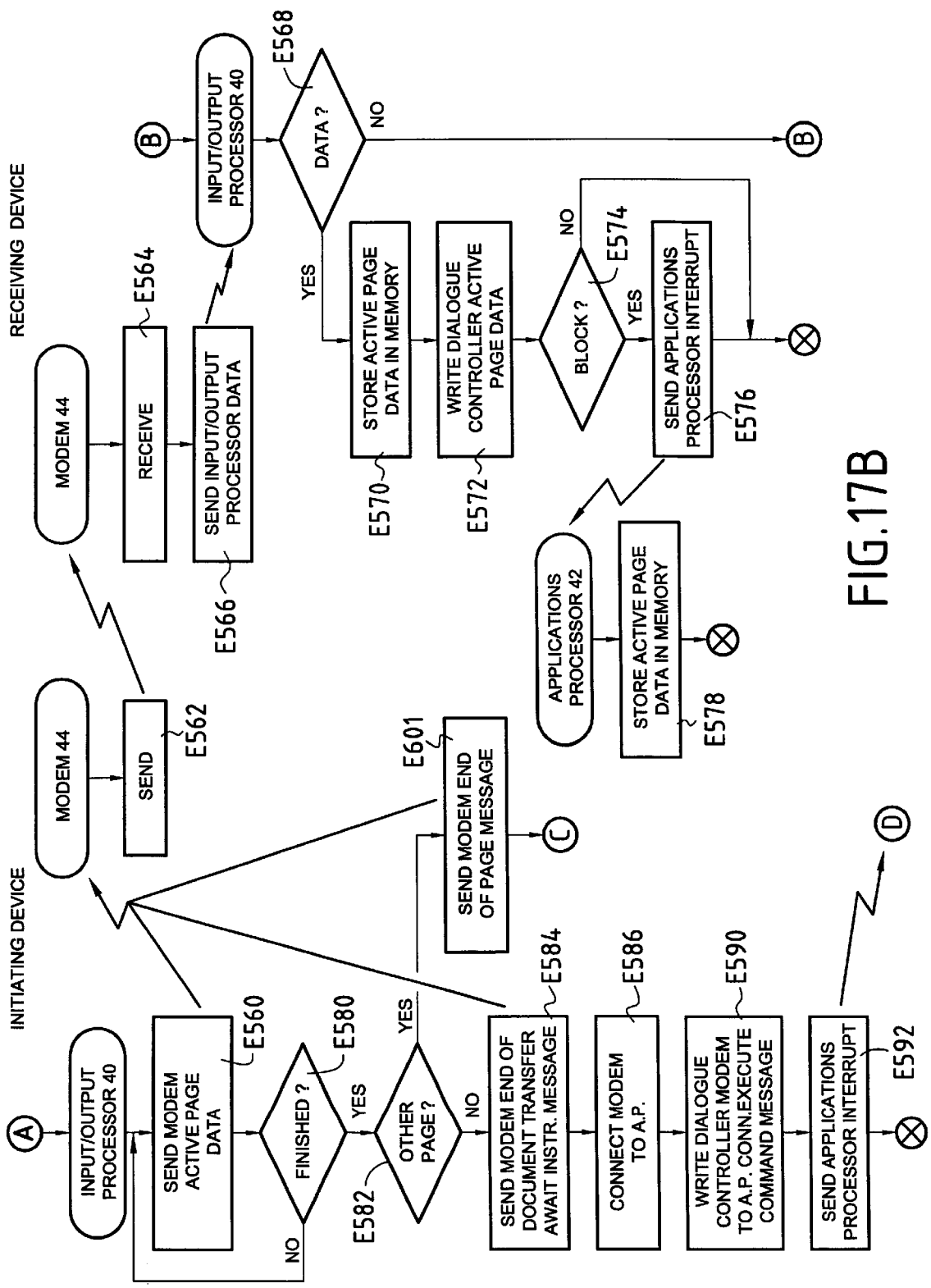
Figure 17C:
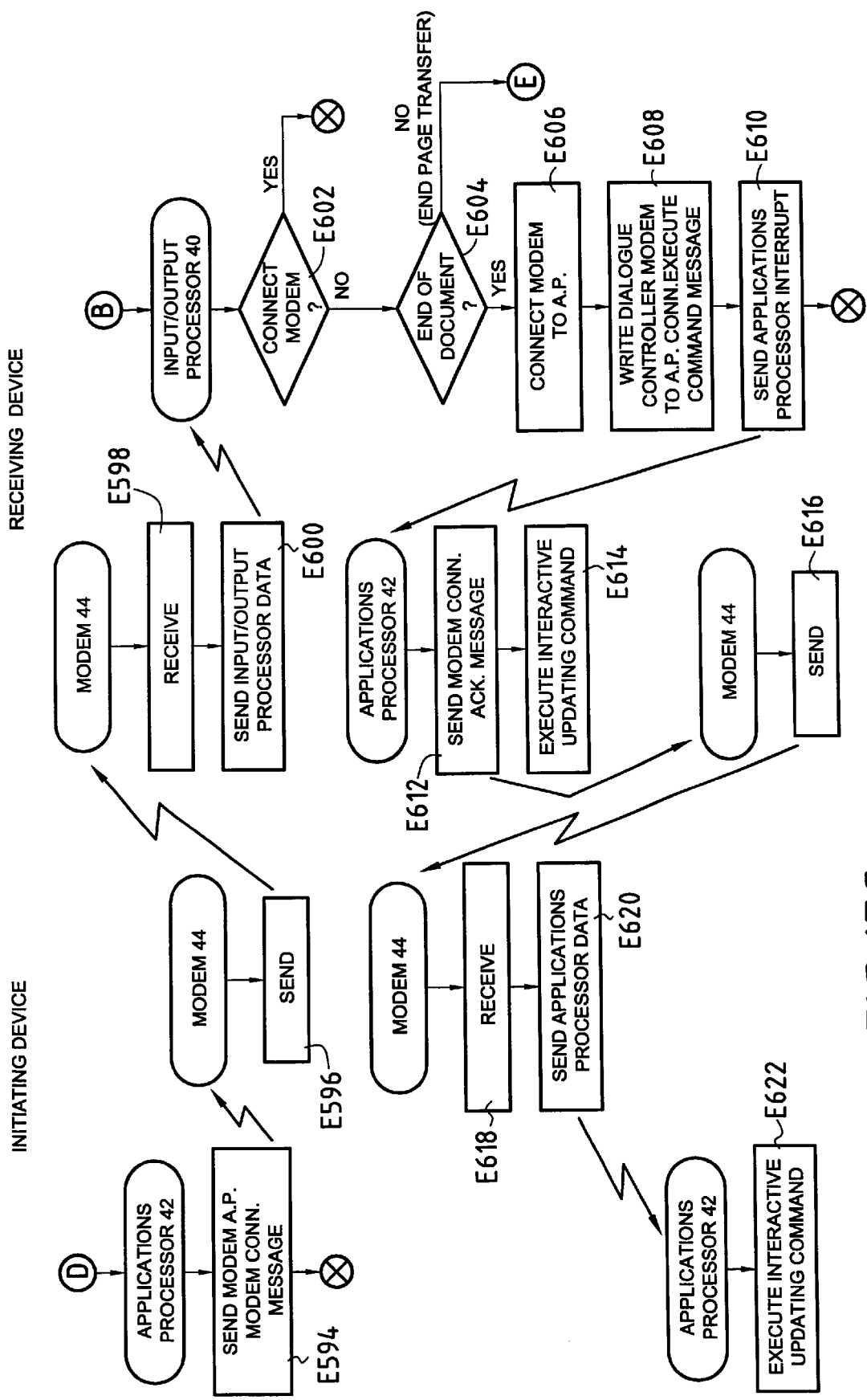

The transfer of one or more pages of data will now be described with reference to FIG. 17B.

Once the message indicating that the interactive updating mode has been set in the receiving device (E550) has been sent to the input/output processor of the initiating device (E556) (FIG. 17A), the input/output processor of the initiating device begins to send the data of the active page to the modem 44 via the dedicated bus 66 (E560). The data is first sent to the modem of the initiating device (E562) and from there to the modem of the receiving device which receives it (E564) and sends it to the input/output processor (E566). The input/output processor detects the presence of data (E568) and, if data is present, stores it in memory as active page data (E570). This data is written into the dialogue controller 134 (E572) so that it can be used by the applications processor. The active page data is accumulated in the dialogue controller in block units of appropriate size (E574) before its presence is signalled to the applications processor by sending an instruction to interrupt it (E576). The data received by the applications processor is stored in its random access memory 114 (E578—FIG. 6).

When the input/output processor of the initiating device detects the end of sending of the active page data to the modem (E580) it determines whether another page must be sent or not (E582).

If the document comprises only one page, i.e. only the active page, the input/output processor sends to its modem an end of document transfer and await instruction message (E584) for sending via the modems to the input/output processor of the receiving device. This command to wait for instructions tells the receiving device that it must wait for a message to confirm execution of the interactive document updating command.

The input/output processor of the initiating device then connects the modem to the applications processor (A.P.) via the dedicated bus 68 (E586). After the modem is connected, the input/output processor sends to the applications processor via the bidirectional bus 64 connecting them directly a message indicating connection of the modem and execution of the interactive document updating command (E590), this request being signalled by sending an instruction to interrupt the applications processor (E592). After receiving the message, in branch D of the FIG. 17C flowchart, the applications processor sends to the receiver, via the modems, a message telling it to proceed with connecting its modem to its applications processor (E594 through E596, FIG. 17C). The applications processor of the initiating device then waits for a receiving device modem/applications processor connection acknowledgment message.

If the document has more than one page (E582) (cf FIG. 17B), the input/output processor sends to its modem an end of page transfer message (E601) that will be sent to the receiving device via its modem (E562, E564). The effect of this message is to indicate to the receiving device the end of transfer of the active page and that one or more other pages will be transferred, but that it can execute the interactive document updating command on the active page without waiting to receive the other page or pages of the document. The input/output processor of the initiating device then sends the applications processor over the bidirectional bus 64 connecting them directly a message indicating execution of the interactive document updating command on the active page (E624), in branch C of the FIG. 17D flowchart, this request being signalled by sending an instruction to interrupt the applications processor (E626). After sending the interactive document updating command execution message, the input/output processor maintains the connection of the modem in order to send subsequent other pages during the interactive document communication phase, described below, in branch F of the FIG. 18A flowchart. After receiving the message, the applications processor executes the interactive document command (E628), explained below, in branch H of the FIG. 19A flowchart.

After the active page transfer the input/output processor of the receiving device performs various actions following reception of the message:

i) —When the input/output processor of the receiving device detects the end of document transfer and wait for instructions message (E602) it waits for the instruction to connect its modem to the applications processor via the dedicated bus 68 (E604). After receiving the connection instruction the input/output processor connects the modem to the applications processor. The flow of data is then maintained between the modem and the applications processor on the bus 68 (E606). After the modem is connected, the input/output processor sends to the applications processor a message indicating connection of the modem and execution of the interactive document command (E608), this being signalled to the applications processor by sending an instruction to interrupt it (E610).

Figure 17D:
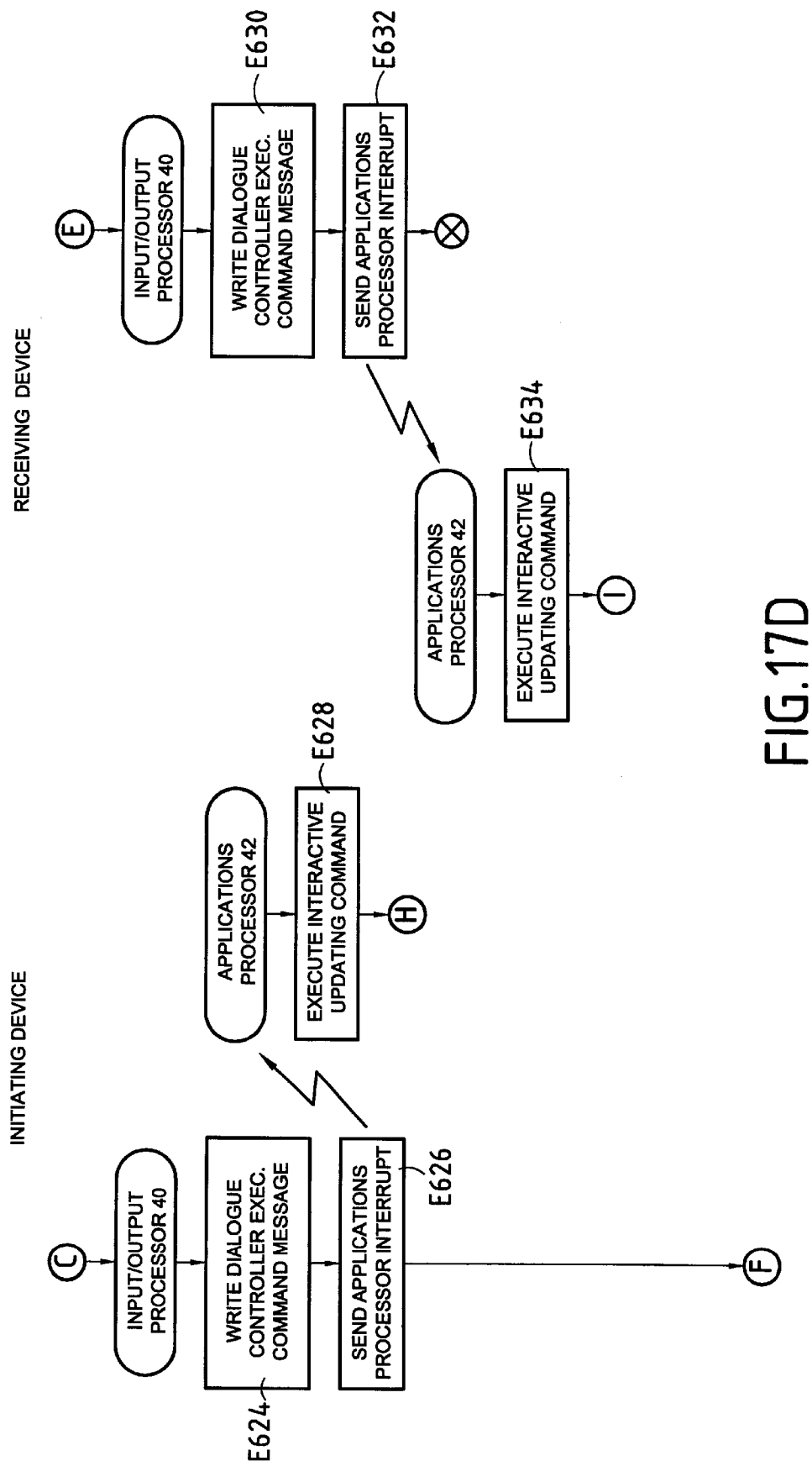

On receiving this message the applications processor sends a connection acknowledgment message to the initiating device via the modem (E612) and executes the interactive document updating command (E614). The modem of the receiving device sends the modem connection acknowledgment message to the modem of the initiating device (E616), which receives it (E618) and sends it to the applications processor (E620) which then executes the interactive updating command (E622).

ii) —When the input/output processor of the receiving device detects the end of page transfer message (E604), in branch E of the FIG. 17D flowchart, it writes an interactive document command execution message to the dialogue controller 134 (E630) followed by an instruction to interrupt the applications processor (E632). After receiving the message, the applications processor executes the interactive document command (E634), see below, in branch 1 of the FIG. 19B flowchart The input/output processor retains the connection of the modem in order to receive the following page or pages during execution of the interactive document updating command.

Interactive Communication Phase

During the interactive communication phase involving exchange of written input between the touch-sensitive screens and transfer of page data, the input/output processor of the initiating device maintains the connection of the modem via its dedicated bus 66 if the document has not been sent in full. Similarly the input/output processor of the receiving device maintains the connection of the modem via its dedicated bus 66. This enables the remaining pages to be sent to the receiving device. In this case the page data is interleaved with the data of pixels to be displayed from traces telewriting input on the initiating device. In order not to penalize the transfer of written input pixels, the maximum time for transferring a page data block will be equal to the time between two acquisitions of pixels less the time to transfer pixel data to the other party.

This process of transferring remaining pages exploits the unused time between two acquisitions of pixels. The applications processor of each of the communicating devices is thereby relieved of this transfer task, which is entirely handled by the input/output processor. The applications processor can therefore execute other sub-commands inherent to the interactive document updating functional application or take care of other tasks associated with units under its control.

Figure 18A:
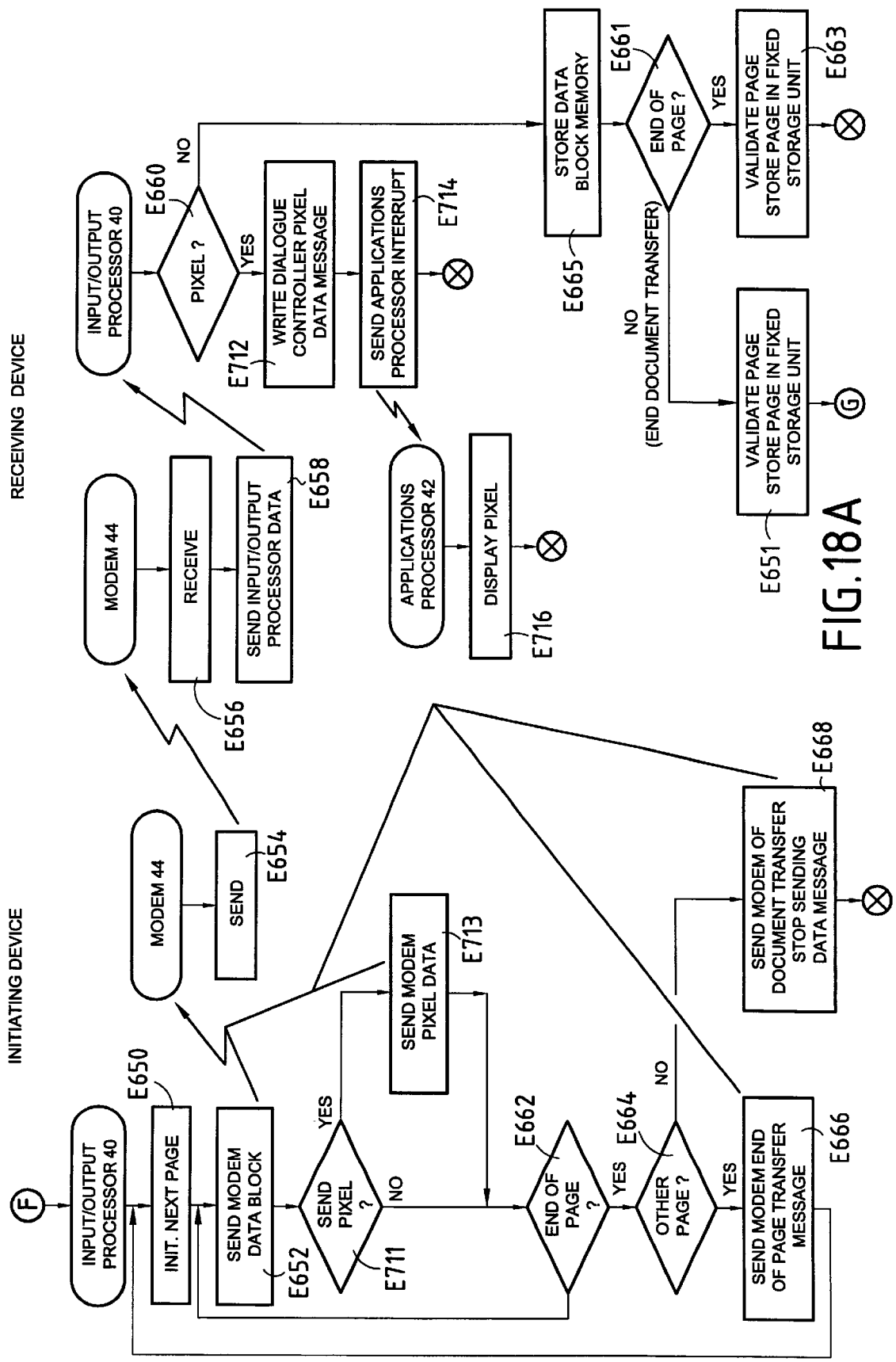
FIGS. 18A and 18B represent on two sheets the flowchart of the activity of the input/output processors during the phase of interactive communication between two telewriting devices in written input mode (writing mode) and sending other data (remaining page) during interactive updating of a document.

This interactive communication phase will now be described with reference to FIGS. 18A and 18B which show the activity of the input/output processors of each device. During this phase, each applications processor can send pixels relating to a trace telewriting input to be displayed on the screen of the receiving device. FIG. 18A shows the interleaving of the pixel data and the remaining page data of the document from the input/output processor of the initiating device. FIG. 19B shows the sending of pixels to be displayed on the receiving device, which is described below.

This interactive communication begins with branch F of FIG. 17D and continues in FIG. 18A, after the steps of transferring the command execution message from the input/output processor to the applications processor (E624, E626).

The input/output processor of the initiating device loads the next page to transfer into its random access memory 72 (E650) and then sends the data blocks of this page to the modem (E652) which sends it to the modem of the receiving device (E654) which receives it (E656) and sends it to the input/output processor (E658). The input/output processor of the receiving device determines if the data corresponds to pixels of the written trace or to data blocks (E660). In the case of page data blocks, the blocks are stored in memory as and when they are received (E665).

When the input/output processor of the initiating device detects the end of the page to send (E662) it determines if there is another page to transfer (E664). If there is another page to transfer the input/output processor sends an end of page transfer message to the modem (E666) which sends it to the modem of the receiving device (E654). It then initializes the transfer of the next page (E650) and sends the data to the receiving device (E652–E658). After receiving the end of page transfer message (E661), the input/output processor of the receiving device validates the received page and stores it on its fixed storage unit (E663).

If there is no page to transfer, the input/output processor of the initiating device sends an end of document transfer message via the modem and stops sending data to the input/output processor of the receiving device (E668, E654–E658). The end of transfer message tells the input/output processor of the receiving device that the page data block or blocks received form the last page of the document and ceasing to send data signifies no further sending of pixel data in order to assure the constant connection of the modem to the applications processor. The input/output processor of the initiating device then waits for the acknowledgment from the receiving device. The process then continues in branch G of the FIG. 18B flowchart.

After receiving the end of document transfer message and stopping sending data, the input/output processor of the receiving device validates the received page, stores it on its fixed storage unit (E651) and then sends an acknowledgment message (E670) to its modem, which sends it to the modem of the initiating device (E672) which, after receiving it (E674), sends it to the input/output processor of the initiating device (E676). The input/output processor of the initiating device then connects the modem to the applications processor via the dedicated bus 68 (E678), so maintaining the flow of data between the modem and the applications processor continuously on this bus.

After the modem is connected, the input/output processor of the initiating device sends to the applications processor over the bidirectional bus 64 connecting them directly a message indicating connection of the modem, this message being signaled to the dialogue controller 134 by sending an interrupt command to the applications processor (E680 and E682).

After this message is received, the applications processor sends to its modem a message commanding connection of the modem of the receiving device to its applications processor (E684). The applications processor of the initiating device then waits for a message acknowledging connection of the modem of the receiving device. This message is sent from the modem of the initiating device (E686) to the modem of the receiving device (E688) which sends it to the input/output processor (E690). The input/output processor then connects the modem to the applications processor of the receiving device (E692) and writes a message to the dialogue controller 134 signaling this connection to the applications processor (E694), this message being followed by an instruction to interrupt the applications processor (E696).

After this message is received, the applications processor sends to the initiating device a message acknowledging modem connection (E700). This message is sent from the modem of the receiving device (E702) to that of the initiating device (E704) which sends it to the applications processor (E706).

After the modem connection acknowledgment message sent by the receiving device is received, the applications processors of the initiating and receiving devices will be in a position to resume execution of the interactive document updating command (E708 and E710).

The flow of data is thus maintained between the modem and the applications processor over the dedicated bus 68 of each device.

As indicated above, during the sending of subsequent page data, it is possible to send pixels corresponding to the trace telewriting input in interactive mode. In so far as the initiating device is concerned, the corresponding procedure uses the path from a step (E711) of detection of sending of pixels by the input/output processor of the initiating device (FIG. 18A, branch F). In this case the input/output processor commands the modem to enable sending to it of pixel data coming directly from the bus connecting the applications processor to the modem (E713). These pixels are then sent to the receiving modem as when sending data blocks (E654). The modem sends the pixel data to the input/output processor (E656, E658) which loads it into the dialogue controller (E712) and sends it to the applications processor after notification by sending an interrupt instruction (E714). The applications processor then processes the data for presentation on the display screen (E716).

Note that in this mode data blocks and pixels are interleaved (steps E652 and E713) in the flow sent between the communicating devices. In the example, one or more data blocks are therefore interleaved between each pixel sender. To assure correct interleaving without compromising the "real time" quality of pixel sending, the input/output processor assures that the time to send the data block or data blocks between each pixel is less than the normal time interval between two consecutive pixels (approximately 5 ms).

The activity of the applications processors during the interactive communication phase between two telewriting devices with remaining pages sent by an initiating device to a receiving device will now be described with reference to the FIG. 19A and 19B flowcharts. These two flowcharts also show the full duplex exchange of pixel data in real time by the two devices.

Figure 18B:
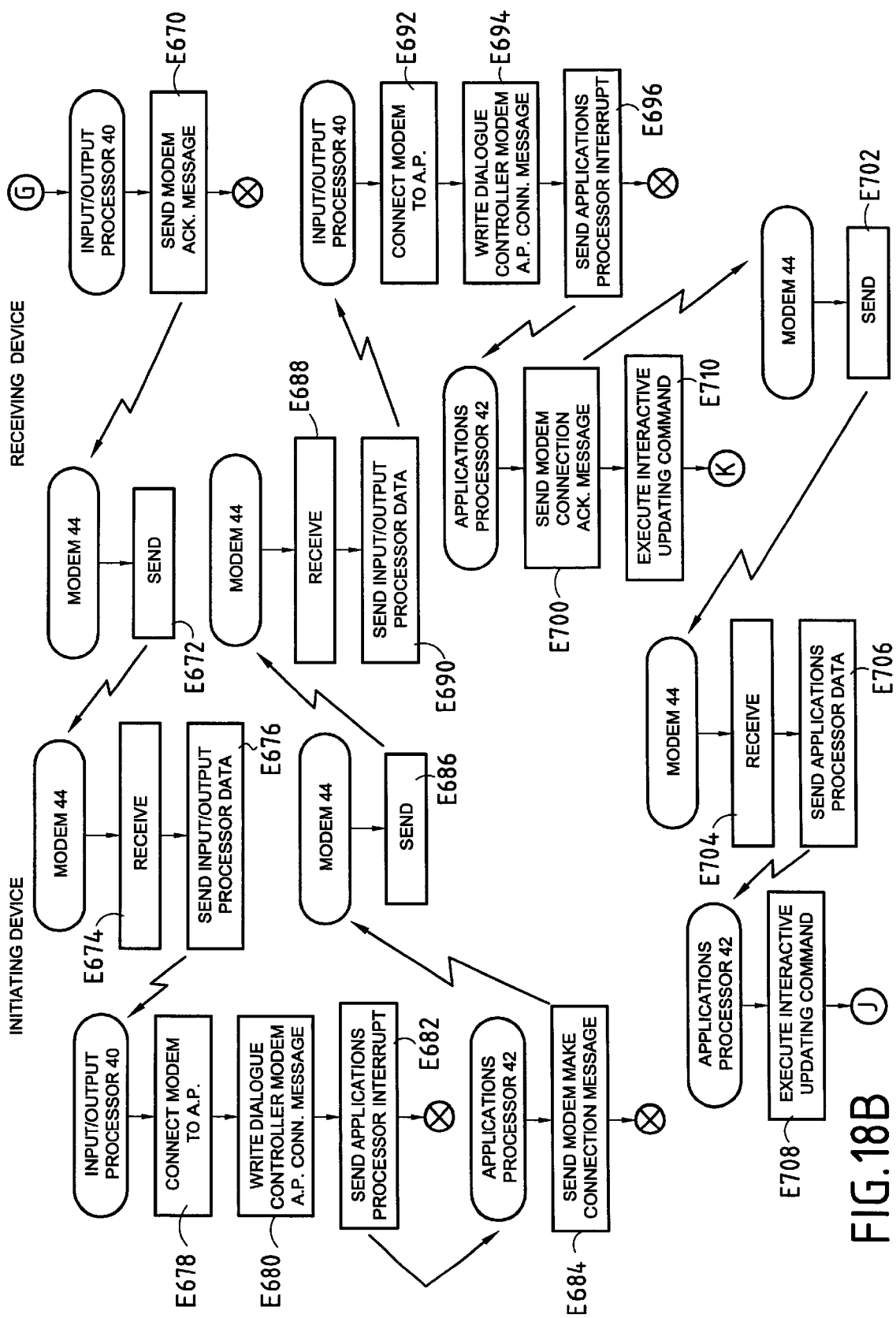

Note that the communication phases identified in FIGS. 19A and 19B are concomitant with the phases identified in FIGS. 18A and 18B, as indicated in particular by branches I and H of these figures.

Thus the combination of FIGS. 18A, 18B, 19A and 19B shows how a telewriting device in accordance with the present invention enables simultaneous sending of pages and interactive communication of written input.

The use of an architecture based on two independent processors 40 and 42, each using a separate dedicated bus 66 and 68 for exchange of specific data with the modem 44, provides total transparency vis à vis users on transferring manuscript trace data on the touch-sensitive screens 12 while transferring data pages from one device to the other. Accordingly, as in the previous example, each user can execute commands for interactive updating of one or more active pages and at the same time make and view traces in real time on their respective screen using the stylus 26. As in the previous mode, each passage of the stylus 26 over the touch-sensitive screen 12 in the writing area will have the effect of displaying the pixel on the screen where the writing is being done and of sending the value and the address of the pixel to the other party for identical and simultaneous display on their screen. Each passage of the stylus over the touch-sensitive screen in the command or status area will have the effect of executing the selected subcommand.

In the FIG. 19A example, written data (pixel data), is being transferred from a telewriting device (initiating device) while it is sending remaining page data to another device (receiving device).

This procedure starts after the step of execution of the interactive updating command (E628) by the applications processor of the initiating device (FIG. 17D, branch H). In this case, the applications processor of the initiating device detects the presence of the stylus 26 in its writing area (E730). The applications processor then determines if this is a designation of a pixel or a command in the status area 28 of the touch-sensitive screen 12 (E732). If it is a pixel, the applications processor writes the data message corresponding to this pixel to the dialogue controller 134 (E734). If, on the other hand, it is a command, the applications processor executes it (E736) and determines if executing this command entails sending an instruction (E738). If an instruction must be sent, the message corresponding to the execution of this instruction is sent to the dialogue controller 134 (E740).

When the message is written in the dialogue controller—whether it is an instruction or pixel data—its presence is signalled to the input/output processor by sending it an instruction to interrupt it (E742).

This message is read by the input/output processor of the initiating device which sends it to the modem (E744). The modem then sends this message to the receiving device (E746) which receives it (E748) and sends it to its input/output processor (E750). The input/output processor sends this message to the dialogue controller 134 (E752) and sends an interrupt instruction to the applications processor (E754) to signal the presence of the message thereto. When this message is received, the applications processor determines if its content concerns a pixel (E756). If so, it performs the calculations necessary for it to be displayed at the corresponding point on the display screen (E758). If not, the applications processor determines the instruction contained in the message and executes it (E760).

FIG. 19B is a flowchart representing exactly the same situation of data exchange as represented in FIG. 19A except that the roles of the sending and receiving devices are reversed. In this case the procedure begins after execution of the interactive updating command (E634) by the applications processor of the receiving device (FIG. 17D, branch I). The steps of this procedure are therefore identical and are identified by the same references followed by the symbol "'". For conciseness these operations will not be described again.

In the case where interactive communication is in progress when the applications processors of each communicating telewriting device are connected to their respective modem via the dedicated bus 68, the interactive communication phase shows the same behavior as the interactive communication phase of the interactive document creation command described above.

This interactive communication phase when the applications processors 42 are connected to their modem 44 will now be explained with reference to the FIG. 20 flowchart. This flowchart also shows full duplex exchange of pixel data in real time by the two devices.

The description will be given for the situation in which manuscript trace data (pixels) is sent from the initiating telewriting device. These operations are therefore effected after executing the interactive updating command (E708) described above with reference to FIG. 18B (branch J).

As in the previous case, the initiating device (device 1) detects the presence of the stylus 26 on its touch-sensitive screen 12 (E780) and determines if it is designating pixels on its written input surface or designating a command in the operation area 28 (E782). In the case of a command, the applications processor executes it (E784) and determines whether it is necessary to send an instruction relating to the command to the receiving device (E786). If yes, the applications processor sends the instruction message to the modem (E788).

If the input corresponds to a pixel, the applications processor sends a data message corresponding to the pixels to the modem (E790).

The modem of the initiating device then sends the message (command or pixel) to the modem of the receiving device (E792). The modem of the receiving device receives the message (E794) and sends it directly to its applications processor (E796), the direct channel of communication between the processor and the modem having been established via the dedicated bus 68. On receiving this message, the applications processor of the receiving device determines if it corresponds to a pixel (E798). If so, it performs the operations needed to display it on its screen 12 (E800). Otherwise it executes the instruction corresponding to the message (E802).

These interactive communication operations when the applications processors are connected to their modem via their dedicated bus 68 are identical if the flow of data is reversed, i.e. if the pixel or command data is sent from the receiving device (device 2) to the initiating device (device 1). In this case, the message sending process will be carried out after execution of the interactive updating command (E710) by the applications processor of the receiving device shown in FIG. 18B (branch K). These operations being identical, for conciseness they will not be repeated. The corresponding steps will be designated by the same references followed by the symbol "'".

Note that the interactive document updating commands have a number of sub-commands enabling management of the document being produced, for example: erase area, change color, etc. Some commands send to the other party a command execution instruction specifying the nature of the operation to be performed.

The end of interactive communication phase operations will now be described with reference to the FIGS. 21 and 22 flowcharts.

Figure 21:
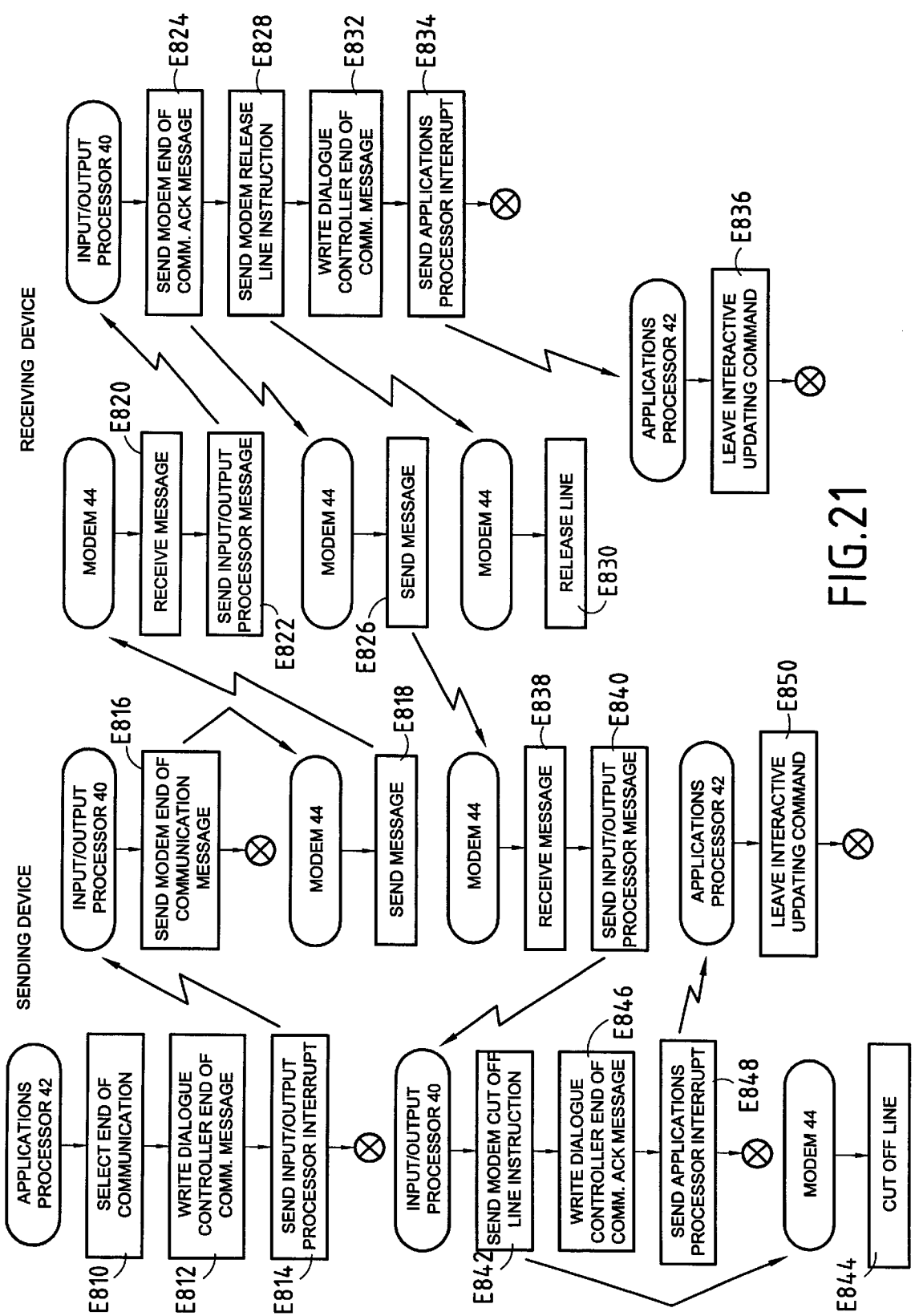
FIG. 21 is a flowchart of the end of communication phase during the phase of sending remaining pages.

The FIG. 21 flowchart describes the end of communication phase during the phase of sending remaining pages by the initiating device. In this case, the input/output processors of each device are connected to their respective modem via the dedicated bus 66.

In this case, the user of the sending device will have selected the end of communication command (E810). The applications processor then writes the end of communication message to the dialogue controller followed by an instruction to interrupt the input/output processor (E812, E814), enabling it to read the end of communication message. This message is then sent from the input/output processor to the sending device modem (E816) for sending to the modem of the receiving device (E818).

The modem of the receiving device receives this message (E820) and sends it to the input/output processor (E822) which in return sends an end of communication acknowledgment message to its modem (E824). The modem of the receiving device then sends the acknowledgment message to the modem of the sending device (E826). The input/output processor then sends to the modem the instruction to release the line (E828), in response to which the modem releases the line (E830).

The input/output processor of the receiving device communicates to its applications processor the end of communication status via the dialogue controller 134 and an interrupt message (E832, E834).

On receiving this message the applications processor leaves the interactive updating command (E836).

The modem of the sending device (E838) receives the end of communication acknowledgment message and sends it to its input/output processor (5840). The input/output processor of the sending device responds by sending the instruction to break the connection to its modem (E842). The modem then breaks the connection and so terminates the communication between the sending and receiving devices (E844). The input/output processor of the sending device then communicates this end of communication status to its applications processor by writing an end of communication acknowledgment message to the dialogue controller 134 followed by an interrupt request (E846, E848). On receiving this end of communication acknowledgment message, the applications processor leaves the interactive updating command (E850).

Figure 22:
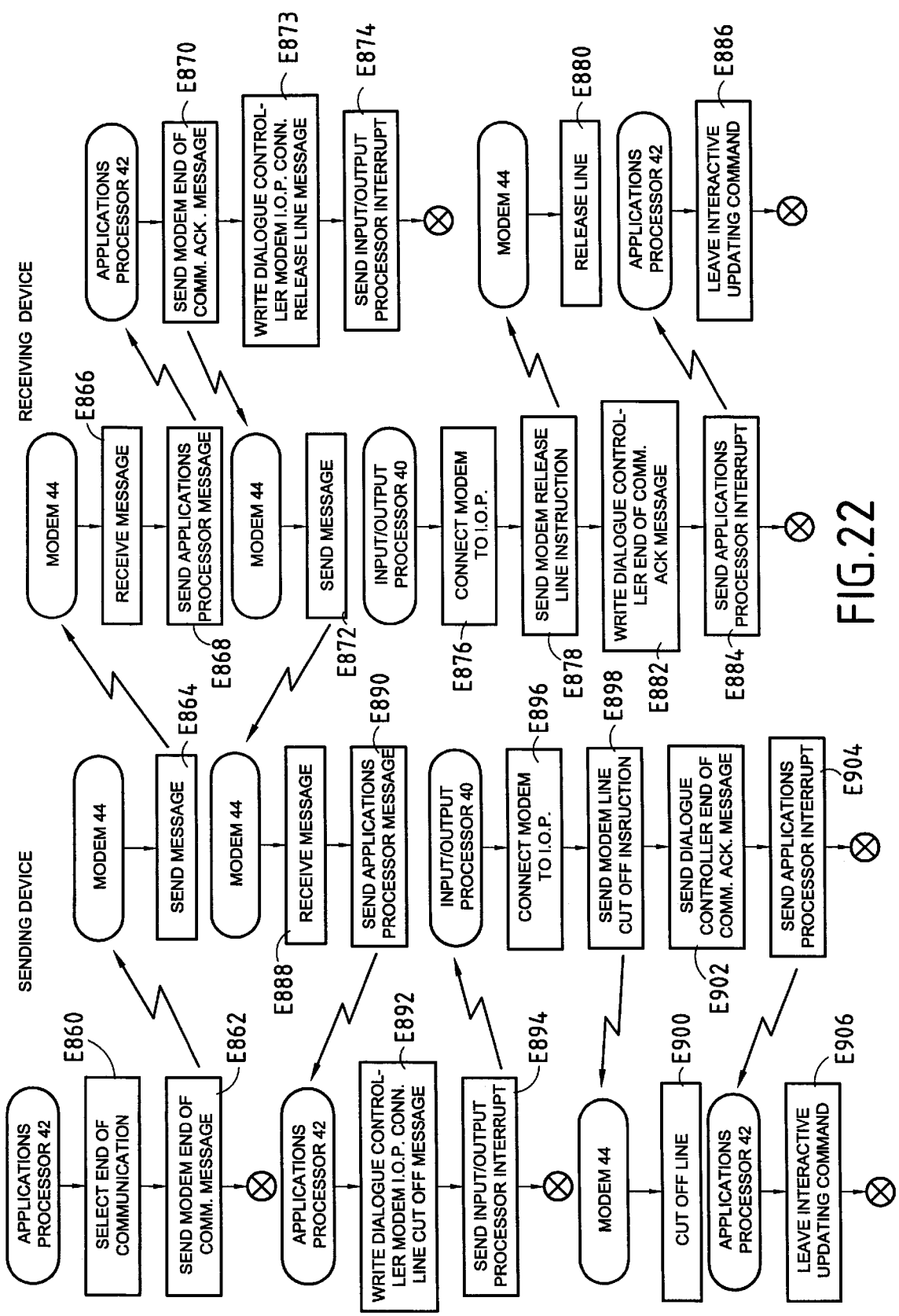
FIG. 22 is a flowchart of the end of communication phase when the applications processors are connected to their modem.

The FIG. 22 flowchart describes the end of communication phase when the applications processors of each of the communicating devices are connected to their respective modem via the dedicated bus 68.

In the example, the end of communication is initiated by the sending device. The applications processor of the sending device then receives the end of communication command selected by the user (E860) and sends this end of communication message to the modem via the dedicated bus 68 (E862). The modem sends this message to the modem of the receiving device (E864), which receives it (E866) and sends it to the applications processor directly via the dedicated bus 68 (E868). When this message is received by the applications processor of the receiving device, it sends the end of communication acknowledgment message to its modem (E870). The modem then sends this acknowledgment message to the modem of the sending device (E872).

The applications processor of the receiving device then writes the modem to input/output processor connection and line release message to the dialogue controller 134 (E873) and then sends an instruction to interrupt the input/output processor (E874) so that it can read the message.

The input/output processor responds by making the connection between the modem and the input/output processor (E876) and sends the instruction to release the line to the modem (E878), this instruction being sent directly over the dedicated bus 66. On receiving this instruction, the modem releases the line (E880).

The input/output processor of the receiving device then writes an end of communication acknowledgment message to the dialogue controller 134 (E822) followed by an instruction to interrupt the applications processor (E884) so that it can read the message. On receiving this message, the applications processor of the receiving device leaves the interactive updating command (E886).

At the sending device, the end of communication acknowledgment message sent by the receiving device (E872) is received (E888) and sent directly to the applications processor over the dedicated bus 68 (E890). On receiving this message, the applications processor of the sending device writes a modem to input/output processor connection and line cut off message to the dialogue controller 134 (E892) followed by an instruction to interrupt the input/output processor (E894) so that it can read the message.

In response to this message the input/output processor connects the modem directly to the input/output processor via the dedicated bus 66 (E896) and sends the modem the instruction to break the connection (E898). In response to this instruction, the modem breaks the connection, so terminating communication between the receiving and sending devices (E900).

The input/output processor of the sending device then writes an end of communication acknowledgment message to the dialogue controller 134 (F902) and then sends an instruction to interrupt the applications processor (E904) so that it can read the message. On receiving this message the applications processor of the sending device leaves the interactive updating command (E906), so terminating the dialogue between the communicating devices.

A variant of the invention will now be described which relieves the first control unit of interleaving data, namely said other data and manuscript trace data.

This variant uses interface means including "autonomous intelligence" handling exchange of manuscript trace data and other data on the external data communication line. The interface means 950 will be referred to hereinafter as the communication processor (FIG. 23).

The communication processor 950 handles execution of low-level programs of the various communication modes and specific data processing. The input/output processor 40 is therefore relieved of these tasks. The advantage of a structure of this kind is that it renders the telewriting device independent of present and future modes, protocols and communication media. The input/output processor 40 and applications processor 42 will be seen as an application system relative to the communication processor. Only the communication processor 950 will be interchangeable, so enabling future evolution of the telewriting device.

Figure 23:
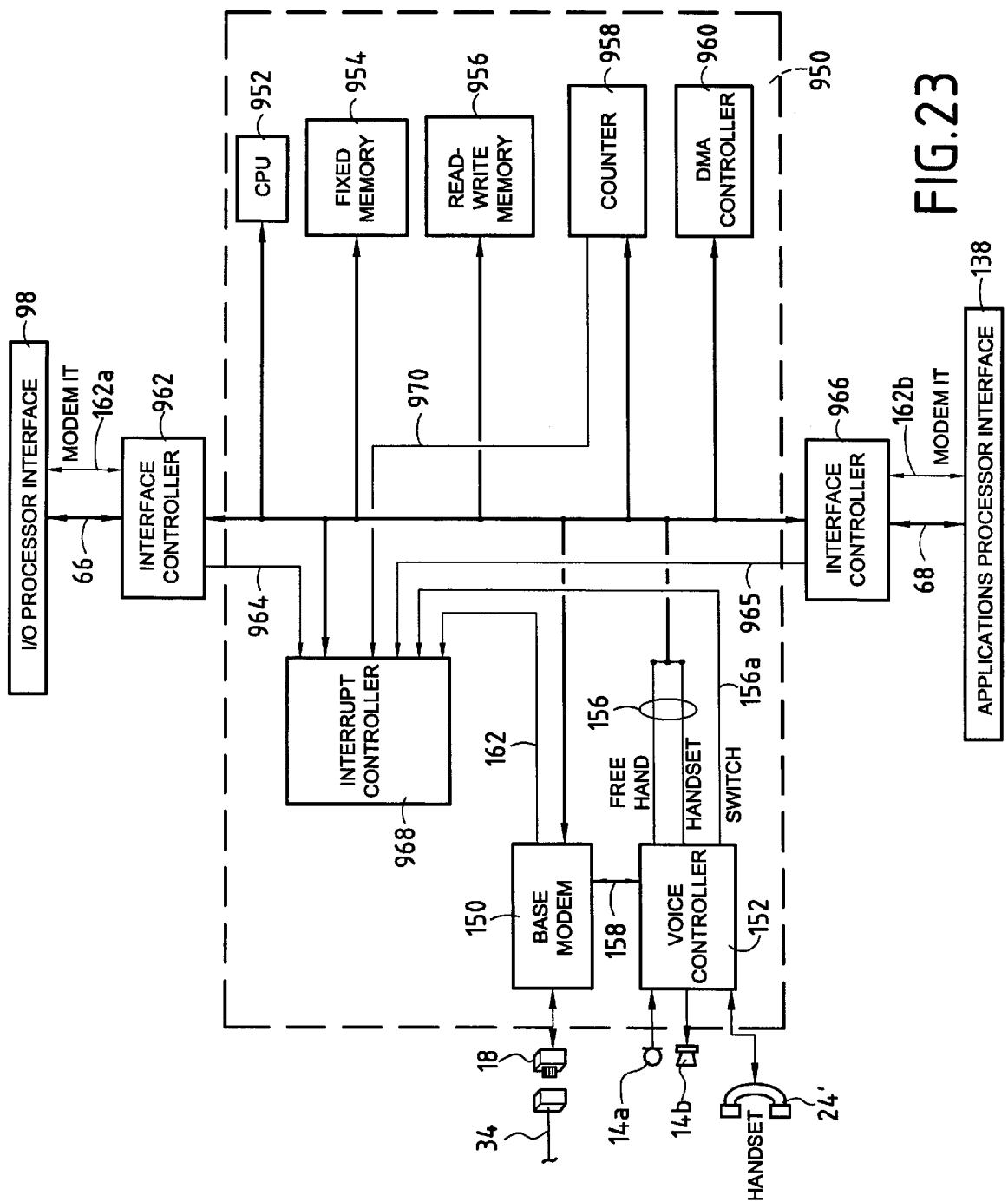
FIG. 23 is a detailed block schematic of a communication processor used in a second embodiment of the invention.

FIG. 23 is a detailed block schematic of the communication processor 950.

Note that the variant now to be described uses exactly the same architecture as the device in the previously described embodiment, in particular for the device as a whole, the input/output processor and the applications processor respectively shown in FIGS. 4, 5 and 6. These figures and the corresponding description must therefore be deemed to be incorporated into the explanation of this variant, although for conciseness they are not repeated. The modifications to these figures and to the corresponding description which are specific to this variant are either obvious or explained as and when necessary.

Internal management of the communication processor 950 is handled by a central processor unit (CPU) 952 which drives the various controllers and the base modem 150. The CPU 952 runs a "real time" operating system enabling it to execute all requests from the various controllers to guarantee immediate processing of the various resources.

The real time operating system is stored as software in a fixed memory 954 which also contains the initialization program for the communication processor and the low-level management programs of the controllers.

The low-level communication and data processing programs are stored as software in a random access memory 956. These programs are loaded into the random access memory 956 in the form of active files or modules required for a given communication mode. Depending on the communication mode to be executed, the communication processor 950 will send a program loading request to the input/output processor 40, these various programs being stored in the hard disk drive 48.

A counter 958 is used to determine time periods for execution of the real time operating system and functions including "watchdog" functions to prevent operation locking up.

A direct memory access (DMA) controller 960 employing well-established techniques transfers data between the various controllers or the memory without using the central processor unit 952.

An interface controller 962 connects the modem interface 98 of the input/output processor 40 to the dedicated bus 66 (cf. FIG. 5). The full duplex flow of data exchanged between the input/output processor 40 and the communication processor 950 passes through this controller (simultaneous sending and receiving of data). The controller has two data buffer storage interface areas: a receive buffer storage area and a send buffer storage area, enabling seamless exchange of data, even if one of the two processors happens not to be in a position to leave immediately the transfer request. The data transfer rate is orchestrated by interrupt signals sent over lines 964 and 162a in the following fashion:

When the communication processor 950 sends data to the input/output processor 40, the communication processor 950 writes data into the interface controller 962 until its send buffer storage area is filled. As soon as the first data is received, the controller advises the input/output processor 40 by means of the interrupt signal MODEM IT on line 162a that data is available and it must read it. Before the send buffer storage area is emptied, the interface controller 962 advises the communication processor 950 by means of the interrupt signal on the line 964 that it must supply other data or, if there is no more data to transfer, that it must initialize the end of transfer.

When the input/output processor sends data to the communication processor 950, the input/output processor 40 will write data into the interface controller 962 until the receive buffer storage area is filled. As soon as the first data is received, the controller will advise the communication processor 950 by means of the interrupt signal on the line 964 that data is available and that it must read it. Before the receive buffer storage area is emptied, the interface controller 962 will advise the input/output processor 40 by means of the interrupt signal MODEM IT on the line 162a that it must supply other data or, if there is no more data to be transferred, that it must initialize the end of transfer.

The previous two steps run simultaneously, so enabling full duplex exchange of data between the input/output processor 40 and the communication processor 950.

An interface controller 966 connects the modem interface 138 of the applications processor 42 to the dedicated bus 68. The full duplex flow of data exchanged between the applications processor 42 and the communication processor 950 passes through this controller (simultaneous sending and receiving of data). The functionality of this interface controller 966 is identical to that of the interface controller 962 and for conciseness will not be explained. The interrupt signal on the line 965 and the MODEM IT signal on the line 162b are similar to the signals 964 and modem IT on the line 162a, respectively.

The base modem 150 and the voice controller 152 implement the functions of connection to the telephone network, conveying the necessary information. They are identical to the modem interface means 44 described above with reference to FIG. 4. For conciseness they will not be explained. However, the voice controller is no longer controlled by the modem controller 96 of the input/output processor 40. The hands-free and handset signals on the line 156 are now controlled by the CPU 952 and the interrupt signal 156a is connected direct to the interrupt controller 968, so that the CPU 952 can be advised of the on-hook or off-hook status of the handset 24'.

An interrupt controller 968 receives the various interrupt signals from the controllers, from the base modem 150 and from the counter 958, via a signal line 970, and then interrupts the CPU 952, telling it the entity that requires service.

Operating Modes

The operating differences with the, communication processor 950 compared to the interface means 44 described above with reference to FIG. 4 will now be explained.

Transfer Between Communication Processor 950 and Processors 40 and 42

The communication processor unit being comparable to the input/output processor 40 and applications processor 42, data is transferred between the former processor and the latter two processors in the form of messages. The message structure is identical to that represented schematically in FIG. 8A and for conciseness will not be explained.

The messages pass through the interface controllers 962 and 966, the functionality of which has been described above, these interfaces respectively connecting the input/output processor 40 via the bus 66 and the applications processor 42 via the bus 68. The connections between the communication processor 950 and the input/output processor 40 and the applications processor 42 are permanent and are not under the control of the input/output processor 40, as when using the interface means 44.

This architecture of the telewriting device enables the three units to operate in parallel, each having one or more specific tasks to execute. In this architecture the main functionalities of each unit can be defined in the following terms:

the input/output processor 40 is now dedicated exclusively to managing the various internal peripheral devices of the telewriting device, to organizing and managing documents and, during interactive communication, to sending other data to the communication processor 950. It will also execute instructions sent by the applications processor for sending data to the communication processor in the case of non-interactive communication, for example exchanges in fax mode or in data mode.

as before, the applications processor 42 is dedicated to functions as described previously.

the communication processor 950 is dedicated to controlling the various types of communications and communication protocols and to managing telephone-related functions and handles interleaving of other data from the input/output processor 40 during interactive communication.

the input/output processor 40 and the applications processor 42 can if necessary communicate simultaneously with the communication processor 950 via their respective buses 66 and 68 without requiring arbitration by either processor 40 or 42. The communication processor 950 accepts in real time requests from either processor 40 and 42 and then executes the messages sent via either of the processors 40 and 42.

Fits Transfer in Fax Mode or Data Mode

In these modes the functionalities are identical to those previously described and for conciseness will not be explained again.

Transfer Between Telewriting Devices

Information or data is transferred between two or more telewriting devices via the communication processor 950 of each device. Each transfer of information consists of a message having the structure represented in FIG. 8A which for conciseness will not be explained again. The content of the message will tell the communication processor 950 if the message concerns it alone or if the communication processor must send it to its input/output processor 40 via the dedicated bus 66 or to its applications processor 42 via the dedicated bus 68 or simultaneously to the input/output processor 40 and to the applications processor 42 via their respective dedicated buses 66 and 68. In this way permanent transfer is maintained between the three processors.

As previously described above, the interactive mode supports two functionalities: interactive creation of a document and interactive updating of an existing document. Voice and other data is still communicated in full duplex mode.

In the following description the telewriting device initializing the mode will be called the "initiating" device and the other telewriting device will be called the "receiving" device.

Interactive Creation of a Document

Figure 24:
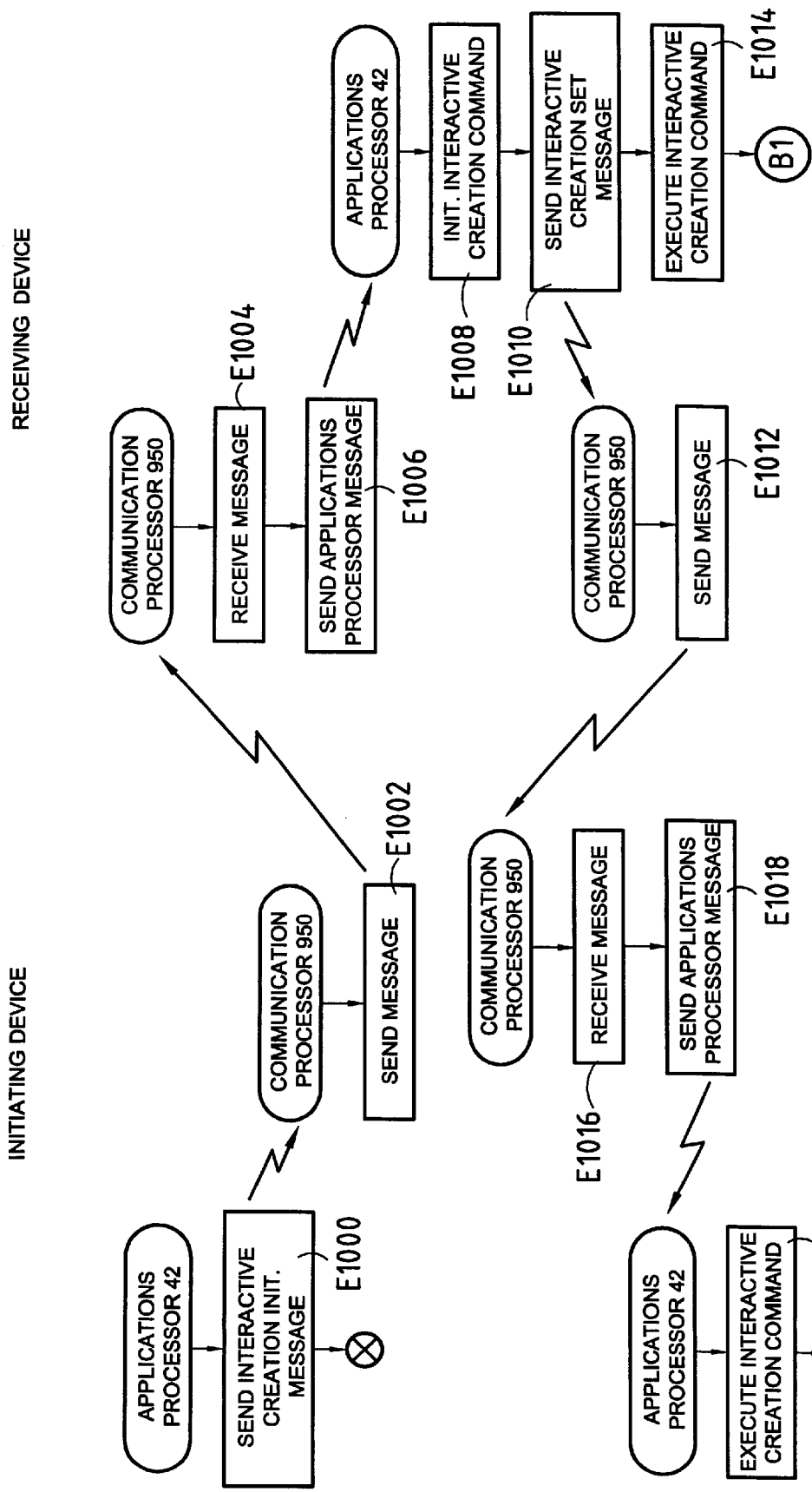
FIG. 24 is a flowchart of the phase of initializing the telewriting device of the second embodiment during an operation of interactive creation of a document.
Figure 25:
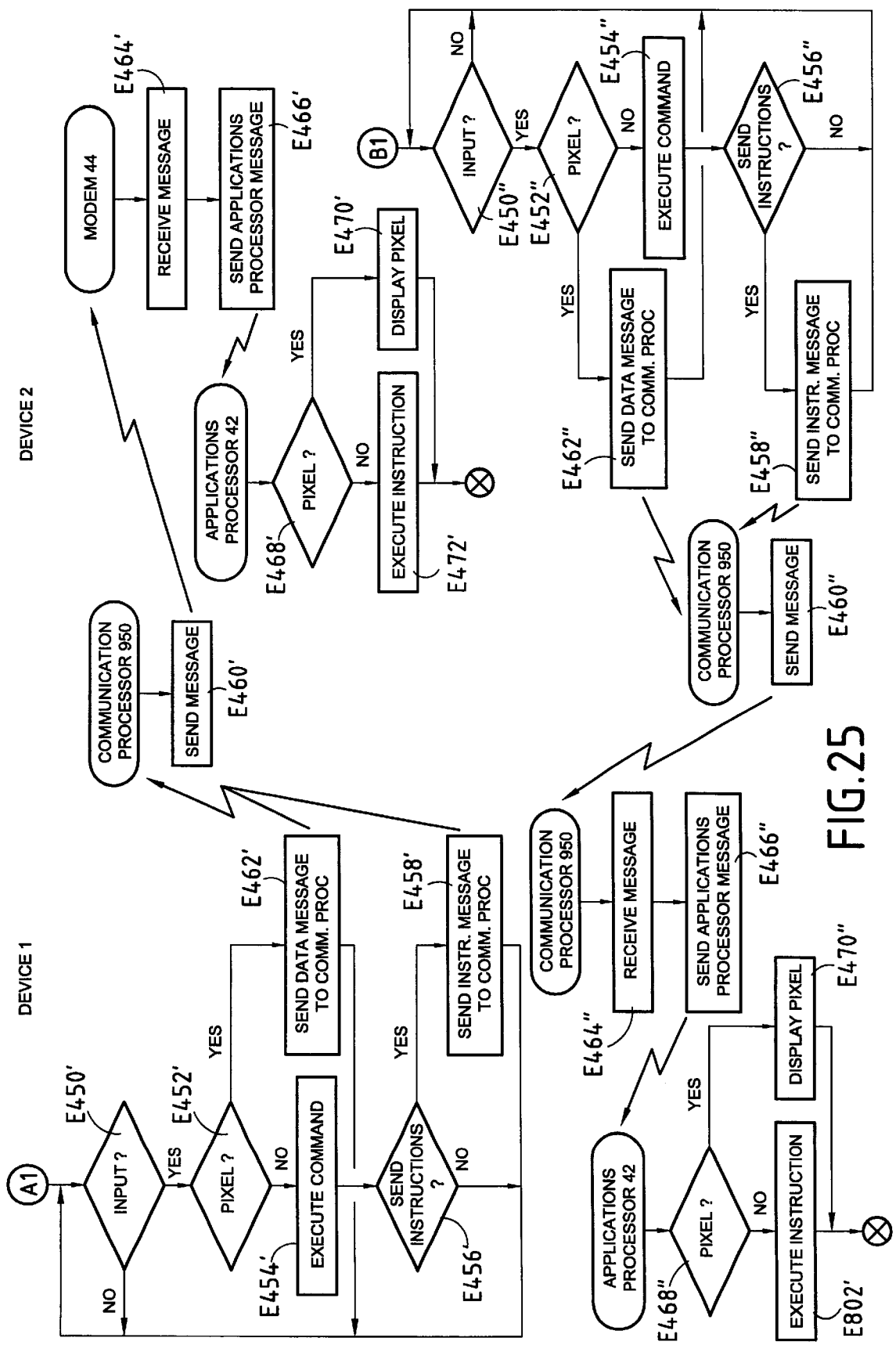
FIG. 25 is a flowchart of the interactive communication phase of the telewriting device of the second embodiment during an operation of interactive creation of a document.
Figure 26:
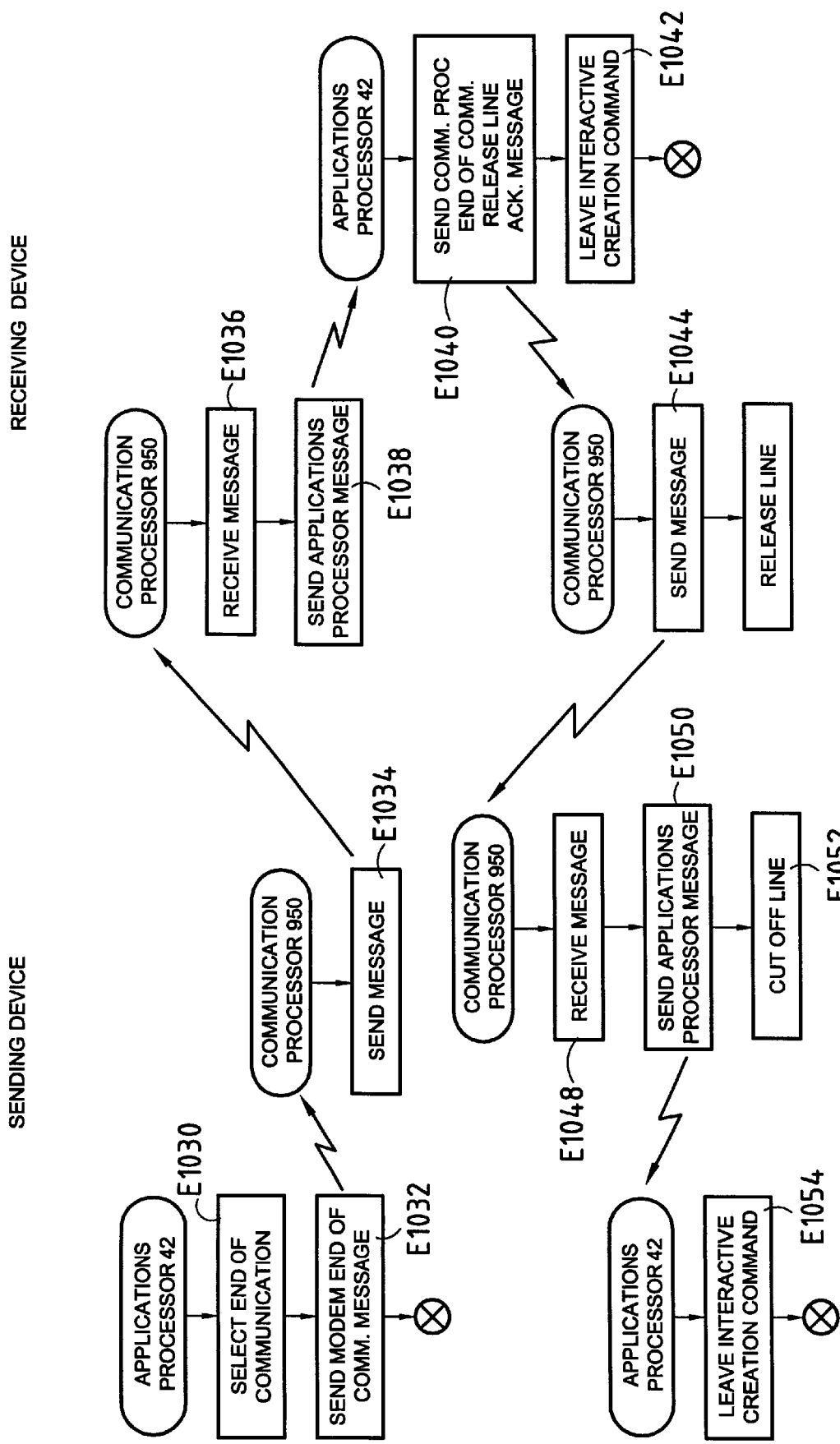
FIG. 26 is a flowchart of the end of interactive communication phase of the telewriting device of the second embodiment during an operation of interactive creation of a document.

The sequences of operations in the event of interactive creation of a document will now be described with reference to the flowcharts of FIGS. 24, 25 and 26, which respectively relate to the initialization phase, the interactive communication phase and the end of communication phase.

In the initialization phase (FIG. 24), the applications processor 42 of an initiating telewriting device sends to the communication processor 950, via the dedicated bus 68, an interactive creation initialization message (E1000) for it to send to the communication processor 950 of the receiving device (E1002) which receives the interactive creation initialization message (E1004) and sends it to its applications processor 42 (E1006) for it to initialize the interactive creation command. After receiving this message the applications processor 42 initializes the interactive creation command (E1008) and then sends its communication processor 950 a message indicating that interactive creation is set (E1010), the processor then sending this message to the communication processor 950 of the initiating device (E1012). The applications processor 42 of the receiving device then goes to the interactive creation command execution mode (E1014), executing a sequence of interactive operations that will be described with reference to branch B1 of the FIG. 25 flowchart.

After receiving the interactive creation setting message (E1016), the communication processor 950 of the initiating device sends this message to its applications processor (E1018) which goes to the mode for executing interactive creation commands (E1020), executing a sequence of interactive operations that will be described with reference to branch A1 of the FIG. 25 flowchart.

Thus in the case of using a communication processor 950, during the initialization phase, there is no functional link to the input/output processor 40, in contrast to the situation of using a modem 44 as described in relation to the first embodiment.

After the initialization phase between the telewriting devices is established, they can begin the interactive communication phase. FIG. 25 describes this phase. Note that this phase is identical to that described above in the case of operation with a modem 44 (cf. FIG. 15) and for conciseness will not be reproduced. FIG. 25 can be understood with reference to the description of FIG. 15, the steps being indicated in FIG. 25 with the same numbers "primed".

The end of communication phase will now be described with reference to FIG. 26. In what follows the device signalling the end of interactive communication will be called the sending device and the device receiving the end of interactive communication instruction will be called the receiving device.

After selection of the end of communication command entered by means of the stylus 26 on the interactive screen 12 of the sending device (E1030), its applications processor 42 sends an end of communication message over the bus 68 (E1032) to its communication processor 950 which sends the message to the communication processor 950 of the receiving device (E1034). This device receives the message (E1036) and sends it to the applications processor 42 of the receiving device (E1038). The applications processor 42 responds by sending it an end of communication acknowledgment message, intended for the sending device, followed by an instruction to release the line (E1040). It then leaves the interactive creation command (E1042). The communication processor 950 of the receiving device then sends the end of communication acknowledgment message to the communication processor 950 of the sending device (E1044) and then releases the line (E1046).

On receiving the end of communication acknowledgment message (E1048), the communication processor 950 of the sending device sends the message to its applications processor 42 over the bus 68 (E1050) and then breaks the connection (E1052) to terminate interactive communication. The applications processor 42 then leaves the interactive creation command (E1054).

As for the communication initialization phase, the use of a communication processor 950 during the end of communication phase is not functionally linked to the input/output processor 40 as in the case of using a modem 44.

Interactive Updating of a Document

As previously described, this function enables two or more parties to update a document interactively. The initial document is contained in the telewriting device called the initiating device.

Figure 28A:
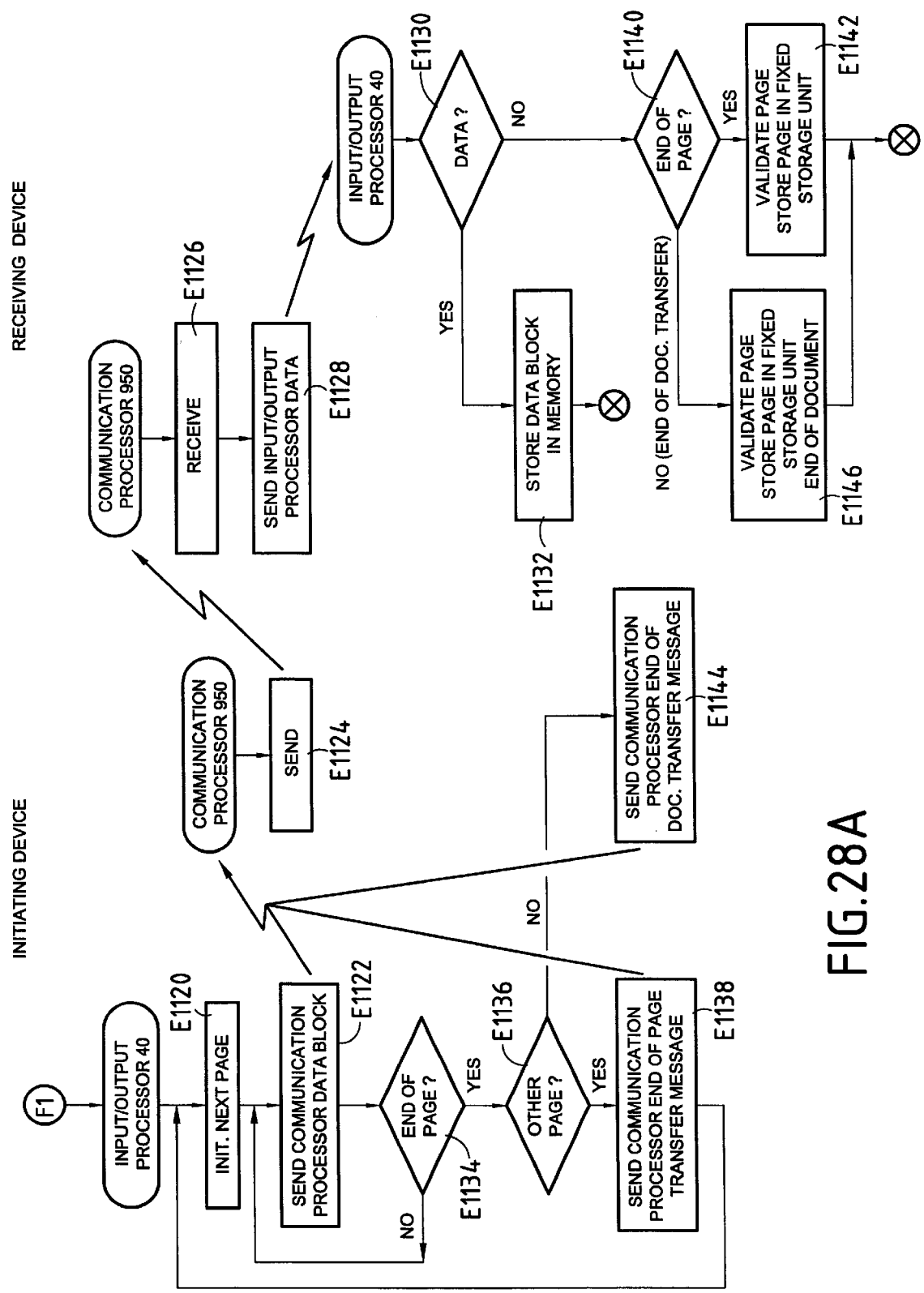
FIGS. 28A and 28B represent on two sheets the flowchart of an interactive communication phase of the telewriting device of the second embodiment during interactive updating of a document.
Figure 28B:
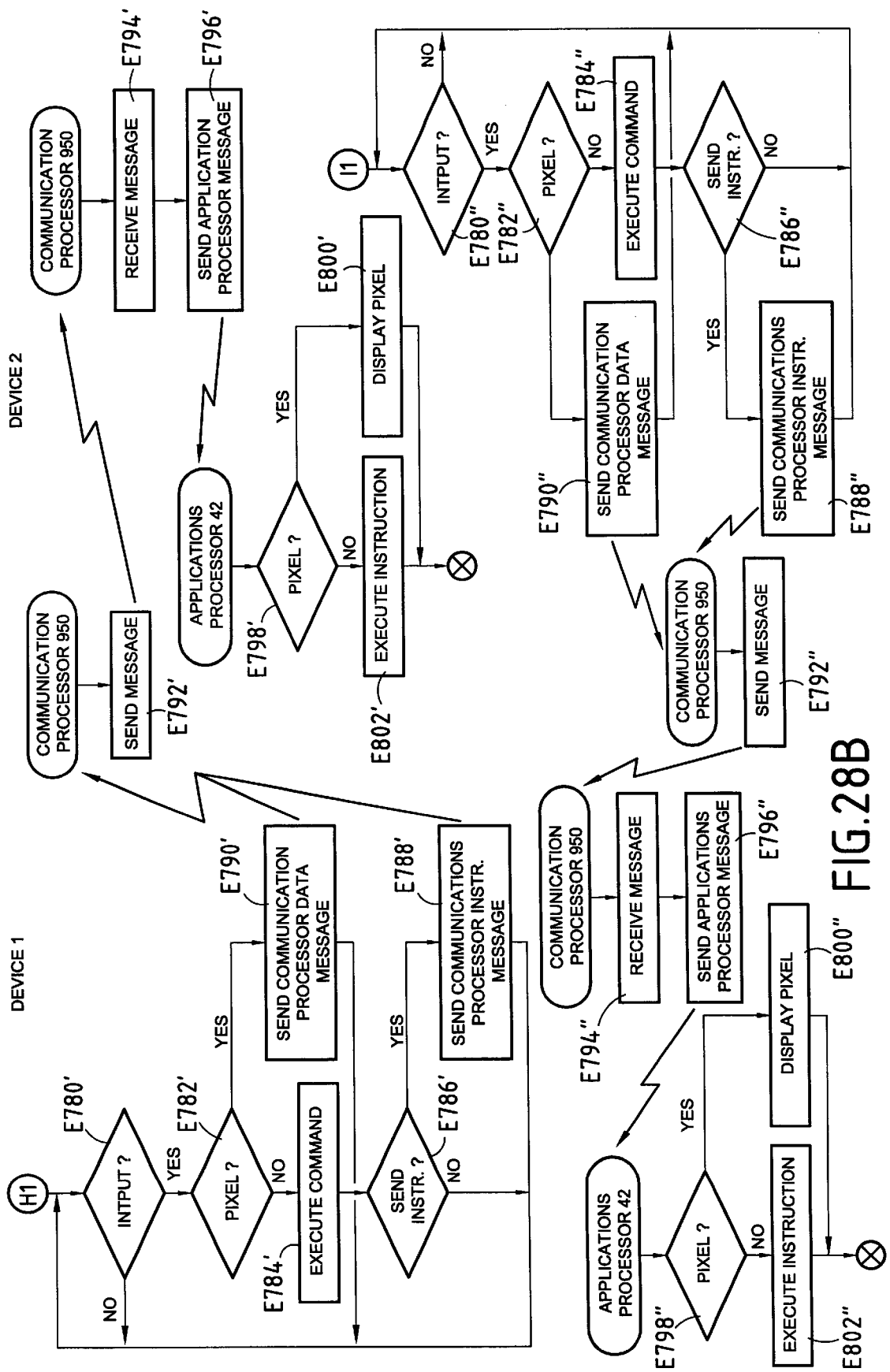
Figure 29:
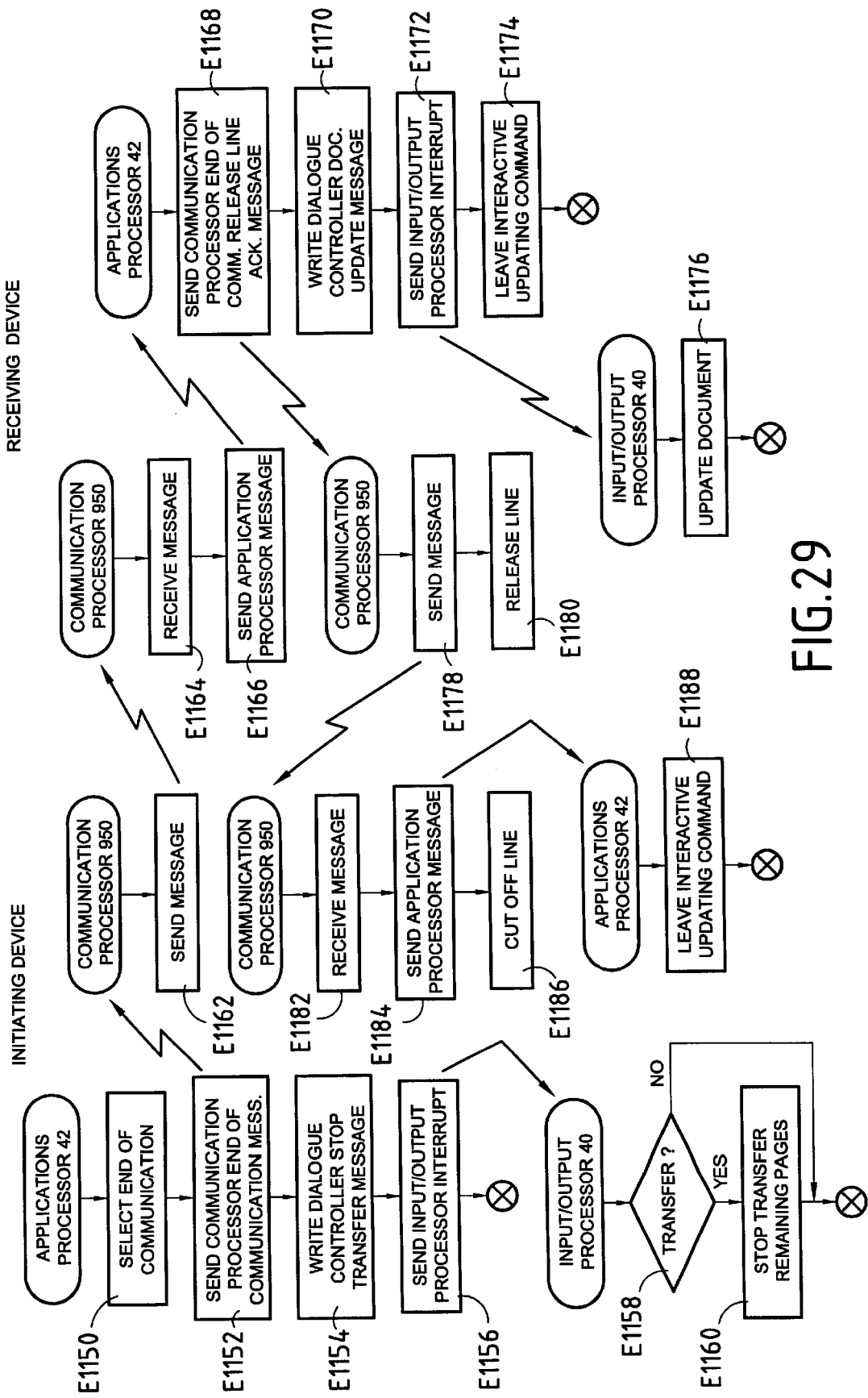
FIG. 29 is a flowchart of an end of interactive communication phase of the telewriting device of the second embodiment initiated by the user of the initiating device.
Figure 30:
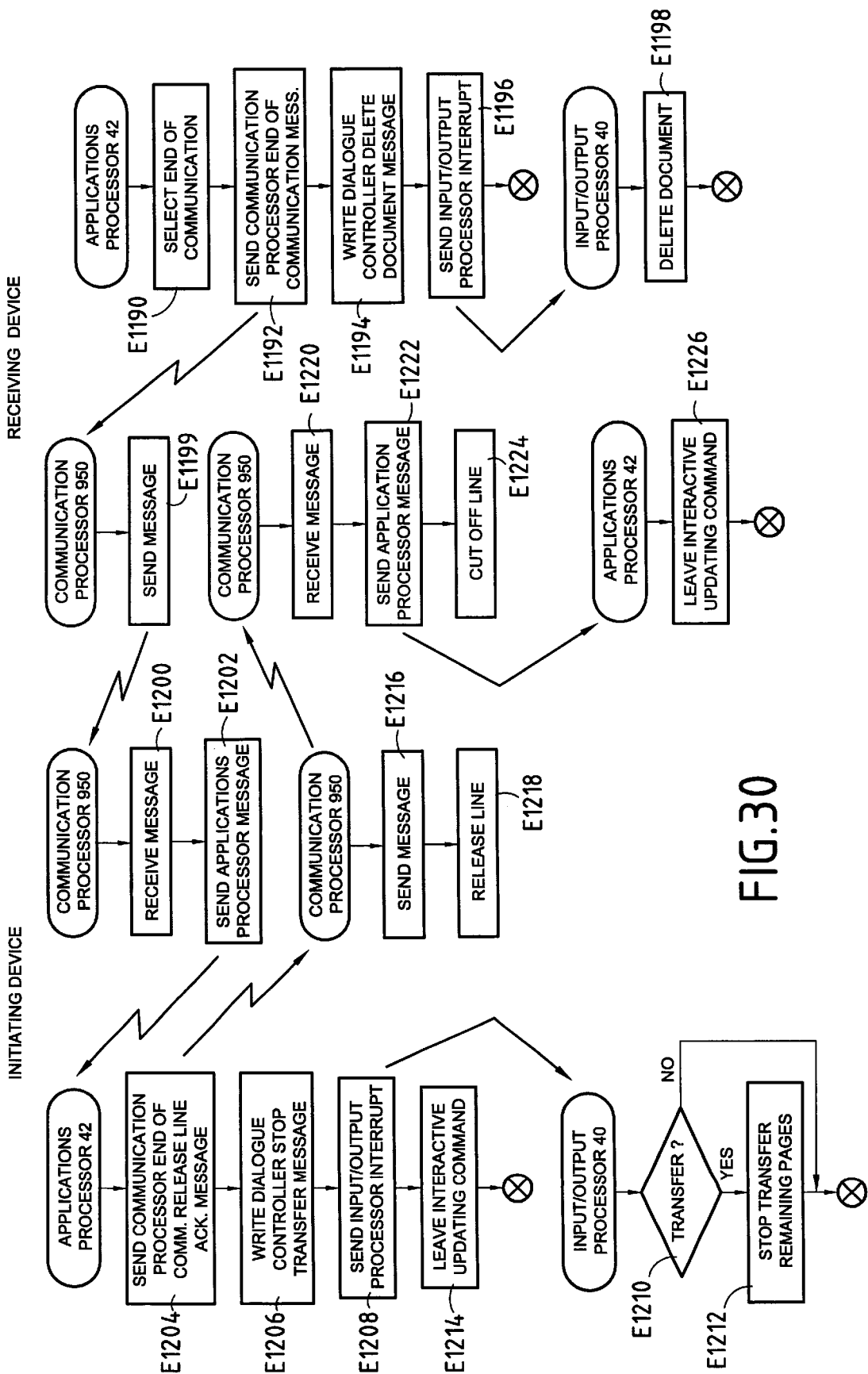
FIG. 30 is a flowchart of an end of interactive communication phase of the telewriting device of the second embodiment initiated by the user of the receiving device.

This function includes an initialization phase (FIGS. 27A, 27B and 27C), an interactive communication phase (FIGS. 28A and 28B) and an end of communication phase (FIGS. 29 and 30).

Figure 27A:
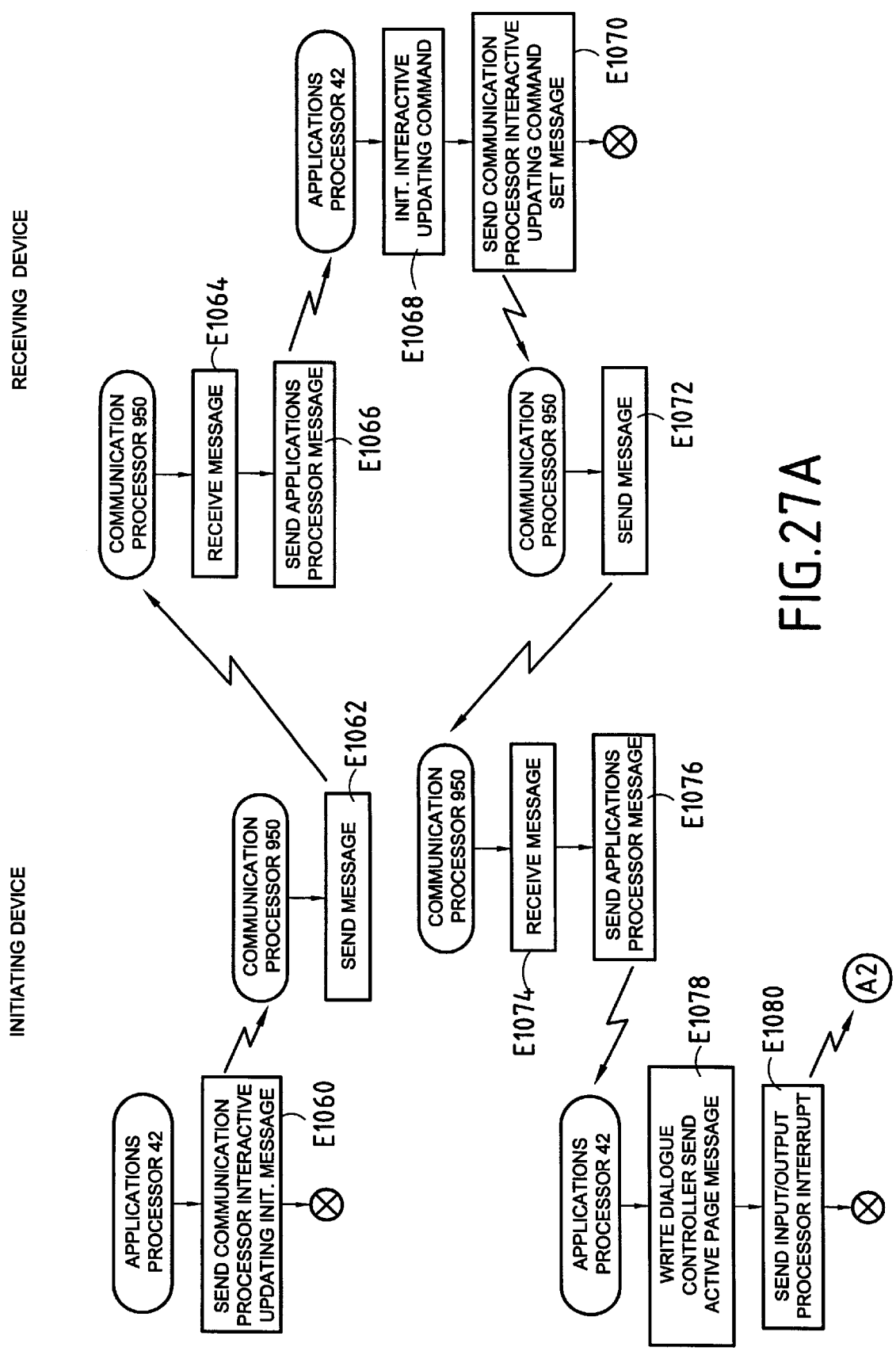
FIGS. 27A, 27B and 27C represent on three sheets the flowchart of a phase of initializing the telewriting device of the second embodiment during interactive updating of a document.

The initialization phase will now be described with reference to FIG. 27A. On initializing the interactive document updating mode, the applications processor 42 of the initiating device sends its communication processor 950 via the dedicated bus 68 a message requesting initialization of the receiving device (E1060). This device sends the message to the communication processor 950 of the receiving device (E1062) which, after receiving it (E1064), sends the message to its applications processor 42 via its dedicated bus 68 (E1066). When the applications processor 42 receives this message, it initializes the interactive updating command (E1068) and then sends its communication processor 950 via the dedicated bus 68 an interactive updating command set message (E1070) intended for the initiating device. The communications processor 950 sends this message to the communications processor 950 of the initiating device (E1072) which, after receiving it (E1074), sends it to its applications processor 42 (E1076). After receiving the command set message, the applications processor 42 of the initiating device writes an active page transfer message to the dialogue controller 134 (E1078) followed by an instruction to interrupt the input/output processor 40 (E1080) so that the initialization procedure can continue with the sending of data constituting the document, in branch A2 of FIG. 27B. The first data is that of the active page. The applications processor 42 then waits for an interactive updating command execution message.

Note that, use of a communication processor 950 during this initialization phase is not functionally linked with the input/output processor 40, in contrast to the situation using a modem 44 as described in connection with the first embodiment.

The process of transfer of one or more pages of data by the initiating device will now be described with reference to FIG. 27B.

Figure 27B:
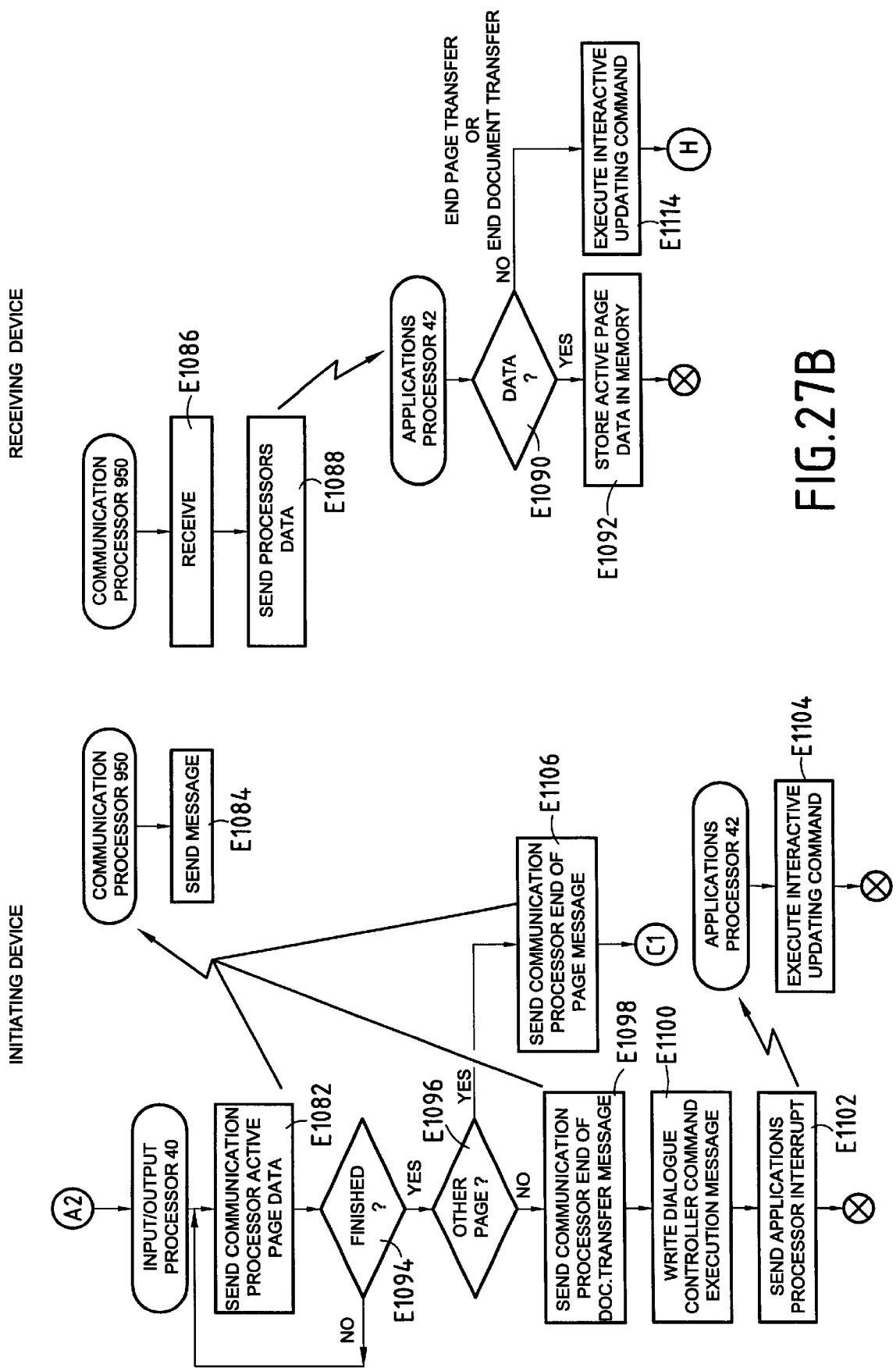

When the message indicating that interactive updating has been set at the receiving device has been sent to the initiating device, in branch A2 of FIG. 27B, the input/output processor 40 of the initiating device begins to send active page data to the communication processor 950 via the dedicated bus 66. The data is first sent to the communication processor 950 of the initiating device (E1082) and from there to the communication processor 950 of the receiving device (E1084), which receives the data (E1086) and sends it to its applications processor 42 (E1088), which stores it in memory, after determining the type of message (E1090), as active page data (E1092).

When the input/output processor 40 of the initiating device detects the end of sending of active page data to the communication processor (E1094) it determines whether another page must be sent or not (E1096).

If the document comprises only one page, i.e. only the active page, the input/output processor 40 of the initiating device sends an end of document transfer message to its communication processor (E1098) which sends it to the communication processor 950 of the receiving device (E1084). The input/output processor 40 of the initiating device then writes a message indicating execution of the interactive document updating command (E1100) in the dialogue controller 134 (FIG. 6), which sends an interrupt to the applications processor 42 (E1102). After receiving the message, the applications processor 42 executes the interactive document updating command (E1104) and continues along branch HI of the FIG. 28B flowchart.

If the document comprises several pages (cf FIG. 27B and step E1096), the input/output processor 40 of the initiating device sends to its communication processor 950 an end of page transfer message (E1106) that will be sent to the receiving device via its communication processor 950 in steps E1084–E1088. This message tells the receiving device that transfer of the active page has ended and that one or more other pages will be transferred, but that it can execute the command for interactive updating of the document on the active page without waiting to receive the other page or pages of the document The input/output processor 40 of the initiating device then (branch C1 of the FIG. 27C flowchart) sends to its applications processor 42 via the bidirectional bus 64 connecting them directly a message indicating execution of the interactive document updating command on the active page, this request being signalled by writing the message in the dialogue controller 134 (E1108) and by sending an instruction to interrupt the applications processor 42 (E1110). After sending the interactive document updating command execution message, the input/output processor 40 will send the subsequent page or pages during the interactive document communication phase, described below, in branch F1 of the FIG. 28A flowchart. After receiving the message, the applications processor executes the interactive document updating command (E1112), see below, and continues along branch H1 of the FIG. 28B flowchart.

After transferring the active page, the applications processor 42 of the receiving device, after determining the end of document transfer or end of page transfer instruction (E1090), will execute the interactive document updating command (E1114) described below in branch 11 of the FIG. 28B flowchart.

Figure 27C:
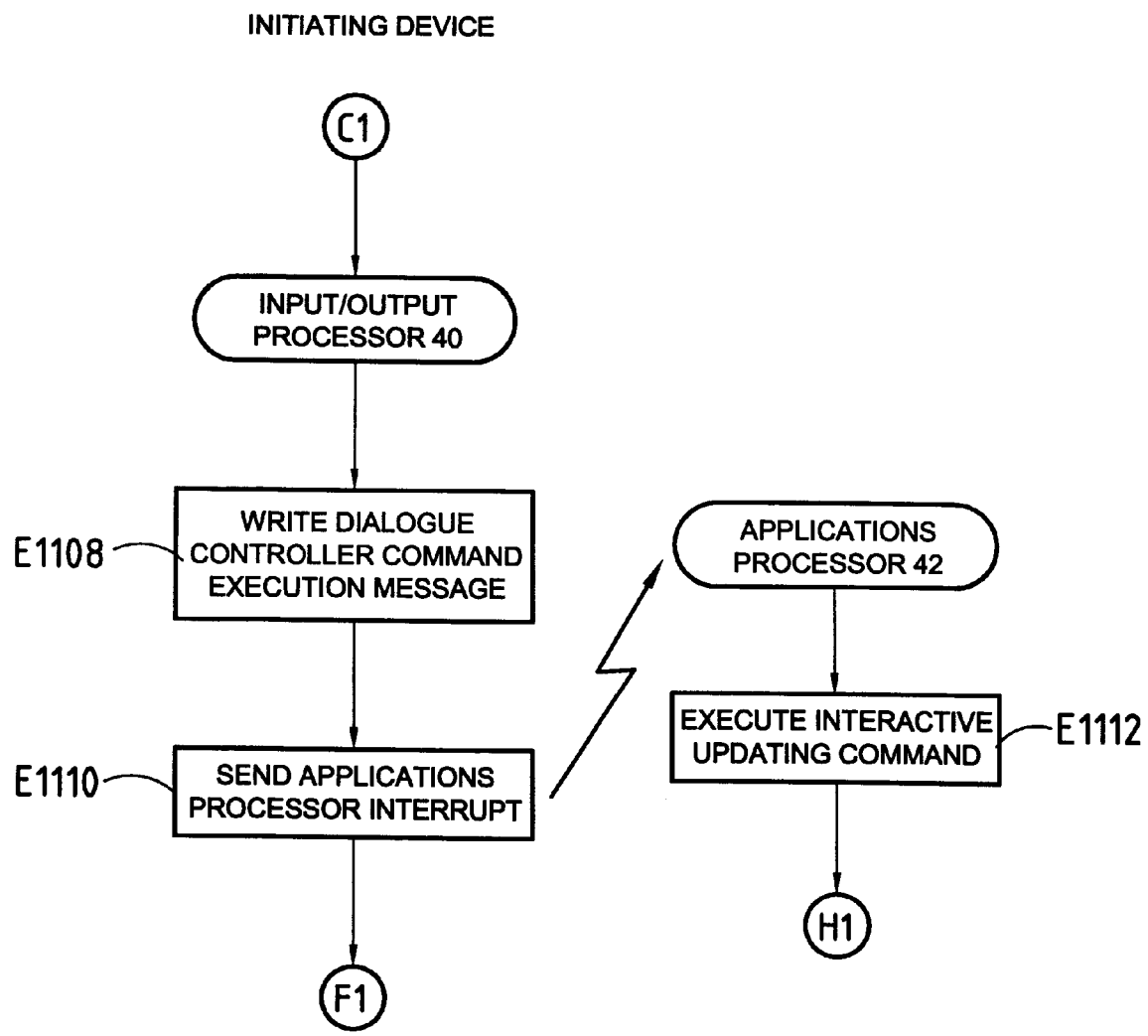

Similarly, during the phases described in the FIGS. 27B and 27C flowcharts there is no functional link with the input/output processor 40 of the receiving device.

The interactive communication phase with sending of remaining pages by the initiating device will now be described.

According to whether, during interactive document updating, the document has more than one page, the remaining page(s) will be sent by the input/output processor 40 of the initiating device to the input/output processor 40 of the receiving device, where they are stored in memory. The remaining page(s) are transferred during the interactive communication phase. The interactive communication phase is the phase during which users can exchange pixel data to be displayed in full duplex mode. The pixel data is processed by the applications processors 42 of each device and sent to their communication processor 950 via the dedicated bus 68.

As indicated above, the input/output processor 40 of the initiating device is responsible for sending the remaining pages to the receiving device. The transfer is effected through the communication processor 950 which is connected by the bus 66 to the input/output processor 40 and by the bus 68 to the applications processor 42. The communication processor 950 of the initiating device will effect the interleaving of the pixel data to be displayed and the remaining page data. As in the case of using a modem 44, so as not to penalize the transfer of pixels entered in writing, the maximum transfer time of a page data block will be equal to the time between acquisition of two pixels. However, it is equally feasible to transfer page data, not between two acquisitions of one pixel, but between two acquisitions of series of pixels, as soon as such acquisition is sufficiently brief not to impede the transfer of page data. The content of the messages sent by the communication processors 950 indicates to which processor they must be routed. The receiving communication processor 950 will analyze the instruction in the message and then send it to the destination processor: either the input/output processor 40 via the bus 66 or the applications processor 42 via the bus 68.

FIG. 28A shows the activity of the input/output processors during the interactive communication phase, transferring remaining pages between the two devices. This phase begins with branch F1 of the FIG. 27C flowchart and extends over into the FIG. 28A flowchart.

The input/output processor 40 of the initiating device loads the next page to be transferred into its random access memory 72 (E1120) and then sends the data blocks of this page to its communication processor 950 (E1122) which sends it to the communication processor 950 of the receiving device (E1124). This device receives it (E1126) and then, after analyzing the instruction contained in the message, sends it to its input/output processor 40 (E1128). The input/output processor 40 receives it and, after analyzing the instruction word (E1130), stores it in memory as and when it is received (E1132).

When the input/output processor 40 of the initiating device detects the end of the page to be sent (E1134), it determines if another page is to be sent (E1136). If another page is to be sent, the input/output processor 40 sends an end of page message to its communication processor 950 (E1138) which sends it to be communication processor 950 of the receiving device in step E1124. It then initializes the transfer of the next page and sends the data to the receiving device in steps E1120–E1132 already described.

After receiving the end of page transfer message, by determining the instruction represented by steps E1130 and E1140, the input/output processor 40 of the receiving device validates the received page and stores it in its fixed storage unit (E1142).

If there are no further pages to transfer (cf E1136), the input/output processor 40 of the initiating device sends an end of document transfer message to the input/output processor 40 of the receiving device via its communication processor 950 (E1144). The input/output processor 40 of the initiating device is then free to carry out other tasks. After receiving the end of document transfer message the input/output processor 40 of the receiving device validates the received page, stores it in its fixed storage unit and then stores the fact that all of the pages received constitute a document (E1146).

This shows that using a communication processor 950 during the interactive communication phase and during the transfer of remaining pages means that the input/output processors 40 of each device do not receive the pixel data to be displayed for sending to the other device, in contrast with the situation using a modem 44 as described in relation to the first embodiment.

FIG. 28B shows the activity of the applications processors 42 of each device during the interactive communication phase. As the applications processor 42 and the input/output processor 40 of each device are entirely independent of each other, the applications processor 42 will send pixels to be displayed directly to its communication processor 950 whether remaining pages are transferred by the input/output processor of the initiating device or not. This figure is identical to FIG. 20, described above. FIG. 28B can be interpreted by referring to the description of FIG. 20, the steps being marked in FIG. 28B with the same numbers "primed". The only differences concern the names of the branches leading into said figure: branch H1 in place of J and branch I1 in place of K. For conciseness this figure will not be described.

The end of interactive communication phase will now be described with reference to the FIG. 29 and 30 flowcharts. Each user of a device can decide at anytime to stop interactive communication by selecting the relevant icon in the status area 28b of the screen 12 using the stylus 26.

When the user of the initiating device terminates interactive communication, they can give the user of the receiving device the right to retain the document being modified on their device or not. This right will be indicated on selecting the icon and sent to the receiving device by the instruction word of the end of the communication message.

When the receiving device user terminates interactive communication, they cannot retain the document being modified on their device. The receiving device will automatically delete said document after the icon indicating the end of communication is selected.

FIG. 29 shows the end of interactive communication at the initiative of the user of the initiating device and FIG. 30 shows the end of interactive communication at the initiative of the user of the receiving device.

Referring to FIG. 29, the applications processor 42 of the initiating device then receives the end of communication command selected by the user (E1150) and sends this end of communication message to its communication processor 950 via the dedicated bus 68 (E1152). It then sends a stop transfer of remaining pages message to its input/output processor 40 by writing this message in the dialogue controller 134 (E1154) and then sends an instruction to interrupt the input/output processor 40 (E1156) so that it can read the message. This instruction tells the input/output processor 40, if it is sending remaining page data, to stop transferring said data to the receiving device. On receiving this message, the input/output processor 40 determines if remaining page data is being transferred (E1158) in which case the input/output processor 40 will stop the process of sending the remaining page data (E1160); otherwise the input/output processor 40 will ignore the message.

After receiving the end of the communication message, the communication processor 950 of the initiating device sends this message to the communication processor 950 of the receiving device (E1162) which, after receiving this message (E1164), sends it to its applications processor 42 (E1166) via the dedicated bus 68. The applications processor 42 responds by sending it an end of communication acknowledgment message intended for the initiating device and an instruction to release the line (E1168). It then sends a document updating message to its input/output processor 40 by writing this message in the dialogue controller 134 (E1170), after which it sends an instruction to interrupt the input/output processor 40 (E1172) so that the processor can read it. This message tells the input/output processor 40 to validate or delete (depending on the instruction word contained in the end of communication message) all of the received pages forming the document. If no page has been received the input/output processor will ignore this message. After sending the instruction to interrupt the input/output processor 40, the applications processor 42 of the receiving device will leave the interactive document modification command (E1174).

After receiving the document update message, the input/output processor 40 either validates or deletes the document from the fixed storage unit (E1176), depending on the instruction word.

After receiving the end of communication and line release acknowledgment message, the communication processor 950 of the receiving device sends the communication acknowledgment message to the communication processor 950 of the initiating device (E1178) and then releases the line (E1180).

When the communication processor 950 of the initiating device receives the end of communication acknowledgment message (E1182), it sends it to its applications processor 42 (E1184) via the dedicated bus 68 and then breaks the connection (E1186), so terminating interactive communication. After receiving the end of the communication-leave request message, the applications processor 42 of the initiating device leaves the interactive document modification command (E1188).

Referring to FIG. 30, the applications processor 42 of the receiving device then receives the end of communication command selected by the user (E119) and sends this end of communication message to its communication processor 950 via the dedicated bus 68 (E1192) after which it sends an erase document message to its input/output processor 40 by writing this message in the dialogue controller 134 (E1194). It then sends an instruction to interrupt the input/output processor 40 (E1196) so that it can read the message, which tells the input/output processor 40 to delete all of the received pages forming the document. If no page has been received the input/output processor will ignore this message. After receiving the erase document message, the input/output processor 40 will delete the document from the fixed storage unit (E1198).

After receiving the end of communication message, the communication processor 950 of the receiving device sends this message to the communication processor 950 of the initiating device (E1199) which, after receiving this message (E1200), sends it to its applications processor 42 (E1202) via the dedicated bus 68. The applications processor 42 responds by sending it an end of the communication-leave message intended for the receiving device and an instruction to release the line (E1204) and then sends a stop transfer of remaining pages message to its input/output processor 40 by writing this message into the dialogue controller 134 (E1206), after which it sends an instruction to interrupt the input/output processor 40 (E1208) so that the processor can read the message.

This instruction tells the input/output processor 40, if the processor is sending remaining page data, to stop transferring said data to the receiving device. On receiving this message the input/output processor 40 determines if remaining page data is being transferred (E1210). if so, the input/output processor 40 will stop the process of sending remaining page data (E1212). Otherwise, the input/output processor 40 will ignore the message. After sending the instruction to interrupt the input/output processor 40, the applications processor 42 of the initiating device will leave the interactive document modification command (E1214).

After receiving the end of communication and line release message, the communication processor 950 of the initiating device sends the end of the communication-leave message to the communication processor 950 of the receiving device (E1216) and then releases the line (E1218).

When the communication processor 950 of the receiving device receives the end of the communication-leave message (E1220), it sends it to its applications processor 42 (E1222) via the dedicated bus 68 and will then break the connection (E1224) to terminate interactive communication. After receiving the end of the communication-leave message, the applications processor 42 of the initiating device leaves the interactive document modification command (E1226).

Note that if a communication processor 950 is used during the end of interactive communication phase when sending remaining page data the input/output processors 40 of each device do not manage the end of communication instructions, in contrast with the situation of using a modem 44 as described in connection with the first embodiment.

Figure 31:
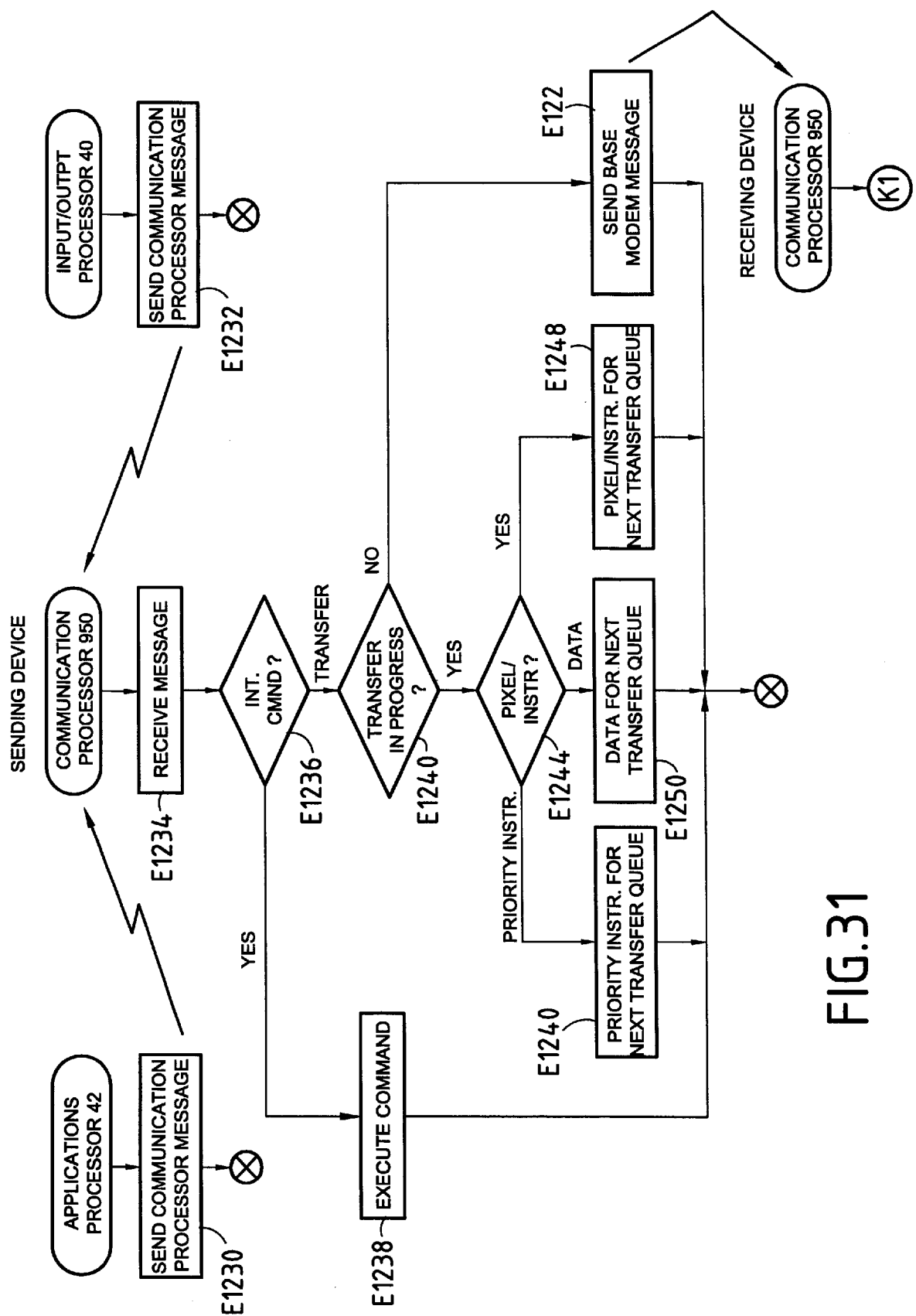
FIG. 31 is a flowchart representing the activity of the communication processor during the phase of interactive communication between each device of the second embodiment.
Figure 32:
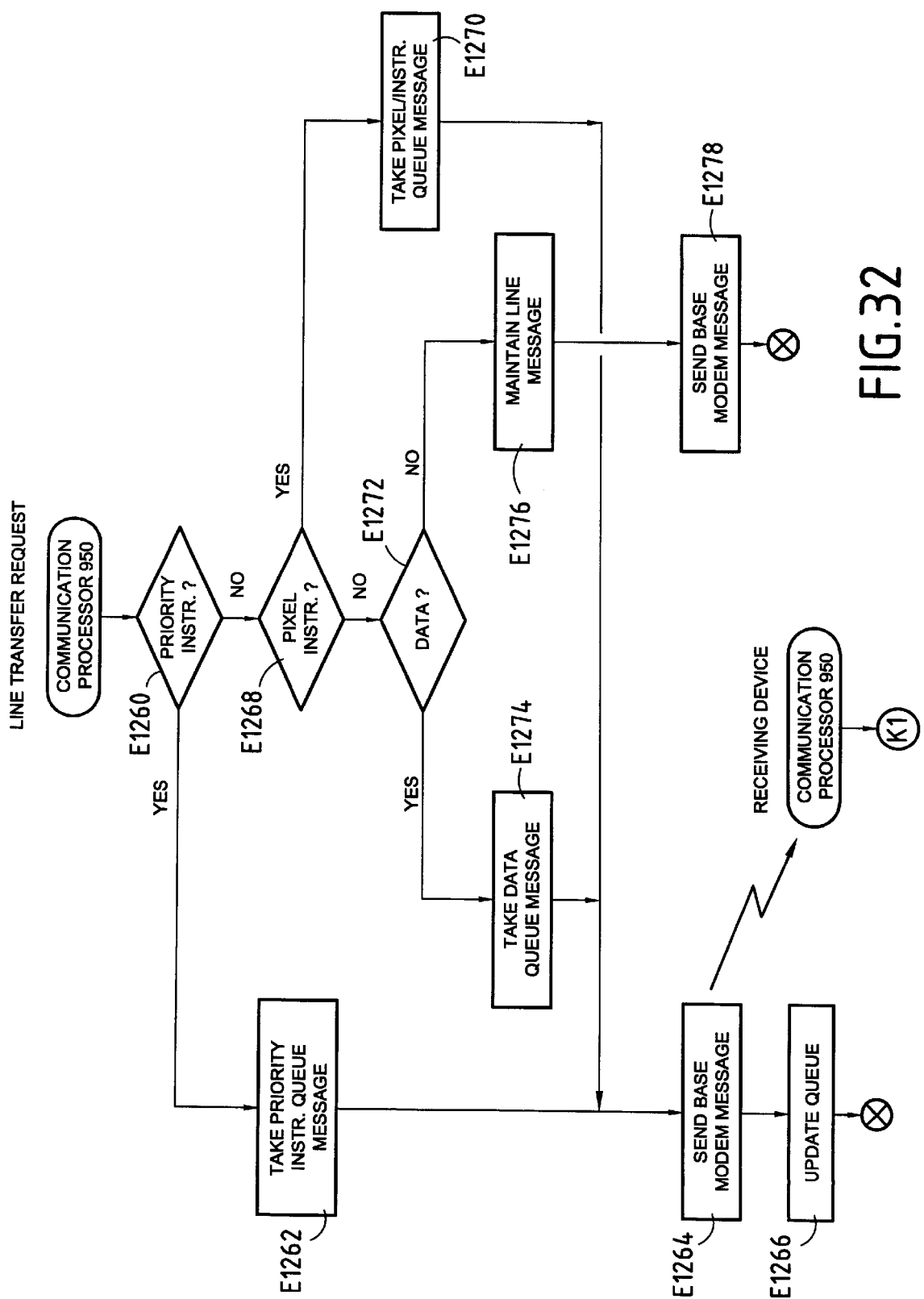
FIG. 32 is a flowchart representing the phase of determination of transfer of messages vis-à-vis the communication processor of the second embodiment when the storage queues are not empty.
Figure 33:
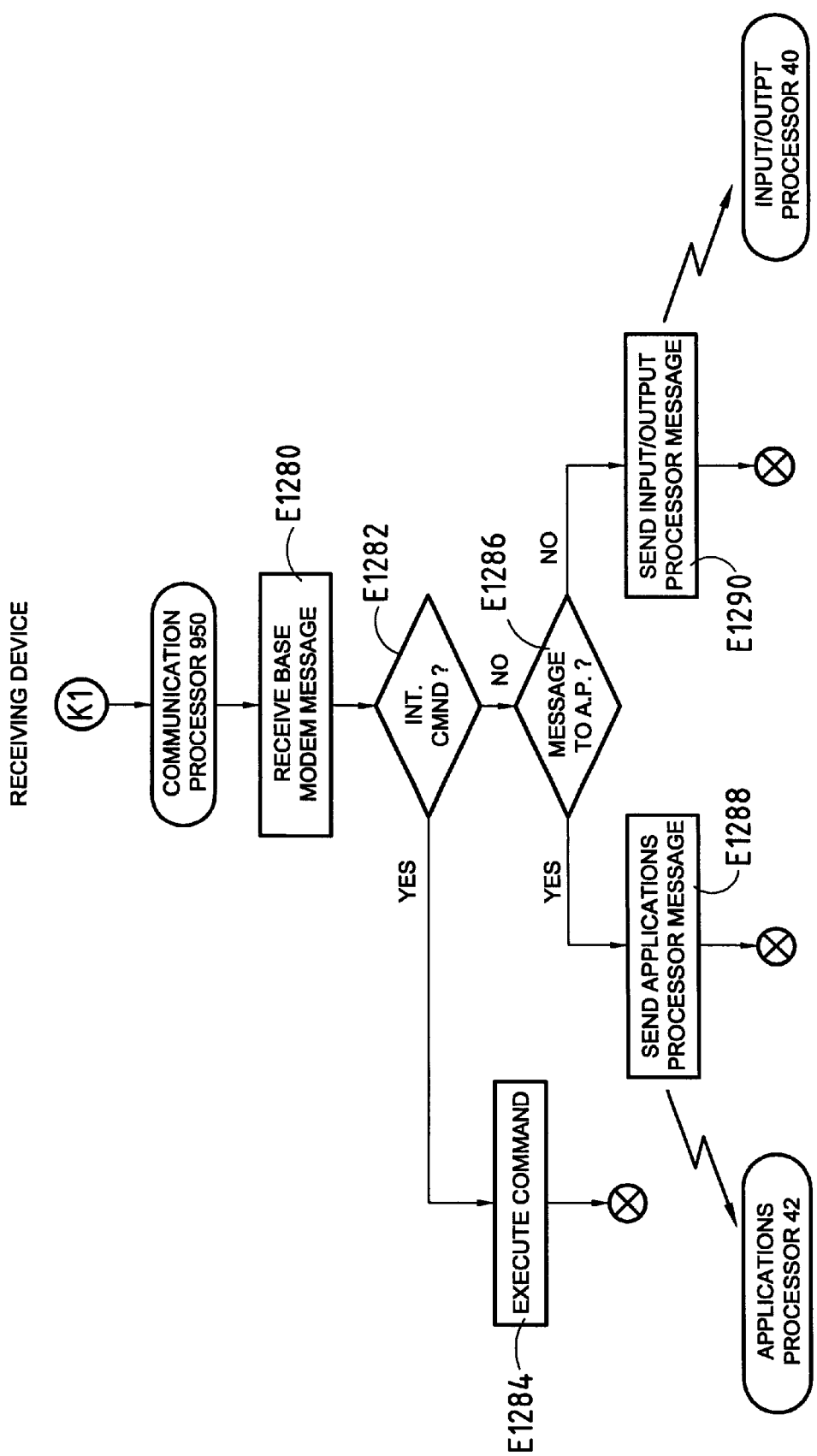
FIG. 33 is a flowchart representing the activity of the communication processor of the second embodiment when it is receiving a message sent by the sending device.

The activity of the communication processor 950 of a device when the device is communicating with another telewriting device, and more particularly during interactive communication, will now be described. FIGS. 31, 32 and 33 explain the various workings of the communication processor 950.

FIG. 31 shows the activity of the communication processor 950 during the interactive communication phase between each device. As indicated above, the communication processor 950 is connected to the input/output processor 40 by the bidirectional dedicated bus 66 and to the applications processor 42 by the bidirectional dedicated bus 68, so enabling full duplex communication between the three processors.

A message sent by the applications processor (E1230) travels on the dedicated bus 68 and a message sent by the input/output processor (E1232) travels on the dedicated bus 66 (cf FIG. 4). When the communication processor 950 receives a message (E1234) it determines if the message is a command that it must execute (internal command) or if the message is a transfer to the communication processor 950 of the receiving device (E1236).

If the message is an internal command it will execute the corresponding command (E1238) and then wait for a new event.

If the message is a transfer it will determine if there is already a transfer in progress (E1240):

If no transfer is in progress the communication processor 950 will initiate transfer to the base modem 150, which will transfer the message to the receiving communication processor 950 via the line 34 (E1242). The communication processor 950 of the receiving device will receive the message along the branch K1, which will be explained below.

If a transfer is in progress the communication processor 950 will store the message in a memory area or queue corresponding to the type of message to transfer. This queue is of the "FIFO" type (First In First Out), i.e. the first message placed in the queue will be the first message taken out of the queue. Depending on the type of message, the communication processor will effect the next transfer and assign a transfer priority if there is more than one queue that is not empty. The type of data contained in the message is indicated by the instruction word of the message. After determining the type of message (E1244), storage of the message is subject to the following conditions:

if the data is of the priority instruction to transfer type, the communication processor 950 will store the message in the queue reserved for priority instructions (E1246);

if the data is pixel data or of the secondary instruction type, the communication processor 950 will store the message in the queue reserved for pixel data/instructions (E1248), and if the data is of some other kind, the message will be stored in the queue reserved for data (E1250).

After storing the message in the corresponding queue the communication processor will again wait for a new event, in particular a request to transfer data from the base modem 150.

The priority accorded to the transfer of messages, according to whether there is a plurality of messages to be transferred "at the same time", enables interleaving of the remaining page data and the pixels to be displayed data and the execution of secondary instructions. To assure that this interleaving is performed correctly without degrading the "real time" quality of the sending of pixels, the communication processor 950 assures that the time to send the data block or blocks between each pixel/secondary instruction is less than the normal time interval between two consecutive acquisition operations on the written input device. This time is communicated to it by the applications processor 42 when the interactive command is initialized.

The transfer priority level is defined as follows:
i—priority instruction(s)
ii—pixel data/secondary instructions
iii—blocks of data FIG. 32 shows the determination of messages to transfer if the storage queues are not empty.

When the base modem 150 requests a transfer of data the communication processor 950 will examine if the queue reserved for priority instructions is empty (E1260) and if the queue is not empty it takes the message (E1262) and sends it to the base modem 150 (E1264) which sends it to the communication processor 950 of the receiving device. The communication processor 950 of the sending device will then update the queue (E1266), i.e. it will remove the sent message from the queue to indicate if a subsequent message is to be sent or if the queue remains empty, after which the communication processor 950 will wait for another event.

If the queue reserved for priority instructions is empty, the communication processor 950 will examine the queue reserved for pixels to be displayed or for secondary instructions to see if it is empty (E1268) and if the queue is not empty it takes the message (E1270) and then sends it to the base modem 150 which sends it to the communication processor 950 of the receiving device. The communication processor 950 of the sending device will then update the file, as explained above (E1266), after which the communication processor 950 will wait for another event.

If the queue reserved for pixels to be displayed or for secondary instructions is empty, the communication processor 950 will examine the queue reserved for data to see if it is empty (E1272) and if the queue is not empty it takes the message (E1274) and then sends it to the base modem 150 which sends it to the communication processor 950 of the receiving device. The communication processor 950 of the sending device will then update the file, as explained above (E1266), after which the communication processor 950 will wait for another event.

Finally, if the queue reserved for data is empty, the communication processor 950 will send the base modem

150 an instruction telling it to hold the line (E1276) the effect of which is to maintain communication between the two devices without sending data (E1278). The communication processor 950 will now wait for another event.

FIG. 33 shows the activity of the communication processor 950 when it is receiving a message sent by the sending device. This phase begins with branch K1 of FIGS. 31 and 32 and goes on to FIG. 33.

When the base modem 150 of the communication processor 950 receives a message (E1280), the communication processor 950 examines the instruction word of the message (E1282) and if the message is a command that it must execute it will execute it (E1284) and then wait for a new event.

If the message received is not an execution request, the communication processor 950 will examine the instruction in the message to determine to which processor it must transfer the message (E1286): either to the applications processor 42 via the bus 68 (E1288) or to the input/output processor 40 via the bus 66 (E1290). After sending the message the communication processor 950 will wait for a new event.

The various possible machine interfaces offered by the telewriting device of the present invention by virtue of the architecture and the data exchange protocol previously explained will now be described.

Selecting a Command

A command is selected by pointing the stylus 26 at a corresponding pictogram in the command area 28a (FIG. 2). Depending on the type of command selected, additional information can be displayed in the writing area, even if it is not empty. This additional information is superimposed on the content of the writing area. When the commands have been processed the content of the writing area is restored.

Input in Non-interactive Mode

Input in non-interactive mode is used for drafting or modifying a document or consulting an existing document for modification with a view to its archive storage or printing after input is completed. The input then consists in action with the stylus 26 in the writing area, the effect of which is to display on the screen the position pointed to by the stylus.

When the writing area is full or when the user wants to change the page, they can select another page by pointing to the corresponding pictogram in the command area. The user can call up a page at any time, before or after the current page, this new page becoming the current or active page immediately.

Telewriting Input in Interactive Mode

Telewriting input in interactive mode is used for drafting or modifying a document by two or more users connected to the telephone network. Information entered is sent over the telephone line to the other party in real time. Users can enter information simultaneously and send it to the other user(s) on the page displayed in the writing area (current page).

In this mode each user has a particular document management status: either master or slave.

The master user is the only user who can determine the right to archive storage and manipulation of a document communicated by the slave user.

The archival storage right authorizes the slave user to save the document.

Manipulation of the document consists in changing the page if the document has more than one page.

By default, the calling user is deemed to be the master user and the called user is deemed to be the slave user. A user can change status during the communication by means of a command subject to confirmation by the other user.

When a user transfers a document they become the master user and the other party becomes the slave user. In this case there can therefore be an automatic change of status. This change of status is effected without confirmation. As soon as input in interactive mode is completed, each user resumes their original status.

The document is entered in the same way as in the case of a transfer in non-interactive mode.

This mode is activated only after calling the other party.

Telephone Function

The telewriting device supports the telephone function through its integral hands-free handset 14 or the confidential handset 24 via an external connection. The telephone function is active either independently of or simultaneously with interactive input between two or more telewriting devices. In this case it is possible to communicate with another party in speech and in writing at the same time.

Voicemail/Recorder Function

The telewriting device has a voicemail/recorder function enabling users to indicate that they are not present to take calls and offering the caller the facility to leave a voicemail message. If the caller is also using a telewriting device, they can send a document. The document will then be stored in an internal memory of the device (for example the random access memory 72 of the input/output processor or the fixed medium storage unit 48). The presence of a document received in this mode is signalled by an LED controlled by the LED controller 82. If the amount of memory needed to store the document received exceeds the available memory, the device advises the caller that it is not able to store the entire document.

Facsimile Link

The telewriting device can send documents by facsimile. The user can choose to enter the document to be sent in the writing area of the screen 12 and then the number of the destination facsimile machine or to enter the number of the facsimile machine and then designate the document to send. The telewriting device can receive a document by facsimile. The document will be stored on the fixed storage unit 48 and the presence of the document will be signalled by an LED controlled by the LED controller 82.

Data Link

The telewriting device can send and receive data in accordance with the standards supported by the modem 44 or the communication processor 950 to other peripheral devices supporting the same standards, for example the AVIS V.34 recommendation.

User Command

There are primary and secondary commands.

Primary commands enable the telewriting device to initiate the execution of a main task. The telewriting device is in waiting mode if no primary demand has been activated.

Secondary commands are available when the telewriting device is executing a primary command. The pictograms of these commands are displayed in the command area 28a instead of the pictograms of the primary commands.

When a primary command is selected, the command area is cleared and the pictogram of the primary command is displayed at the lefthand end of the area to remind the user of the command being processed. The remainder of the area is used to display messages. Some primary commands have secondary commands; the pictograms of these commands are displayed in the command area together with the pictogram used to exit the primary command, if necessary. In this case, the exit pictogram is always displayed at the lefthand end of the command area 28a.

The pictogram at the lefthand end of the command area after a primary command pictogram has been selected is called the head pictogram.

The selection areas are always framed. Selection is effected by pointing anywhere inside the frame. When selected, the inside of the frame is displayed in reverse video.

Selection inside a table is effected by pointing anywhere in the line of the table, whereupon the line appears in reverse video. A line can be deselected by pointing to it again, whereupon the line reverts to normal video.

The present invention is in no way limited by the embodiment described with reference to the figures.

Note in particular that the number of processors used in the telewriting device can be greater than two depending on the necessities of task sharing. The number and the type of units managed by the input/output processor or the man-machine interfaces managed by the applications processor can vary considerably according to the embodiment whilst remaining within the scope of the present invention.

The telewriting device of the invention can also integrate other communication functions, in particular to serve as an active terminal for receiving and sending electronic mail (e-mail) or to provide access to the Internet using appropriate software well-known to the skilled person. The device can also be adapted to emulate a "Minitel" terminal.

Likewise the invention is in no way limited by the structures and the protocols for exchanging messages and commands described in the example, which are open to many variants that will be obvious to the skilled person.

What is claimed is:

1. A telewriting device enabling exchange of visual and voice information in real time with another such device communicating therewith via an external data communication line, the device comprising:
    means for exchanging voice data,
    display means having a display surface,
    means for receiving manuscript traces for displaying manuscript input on the display surface in real time,
    means for processing manuscript trace data and other data to be exchanged, and
    interface means for exchanging the manuscript trace data and said other data over the external data communication line,
    wherein the data processing means comprise:
        a first control unit managing said other data, said first control unit being connected to the interface means by a first link specific to the first control unit for exchanging said other data over the external data communication line, and
        a second control unit able to operate in parallel with the first control unit, for controlling the manuscript trace receiving means, said second control unit being connected to the interface means by a second link specific to the second control unit for exchanging manuscript trace data over the external data communication line.

2. A telewriting device according to claim 1, further comprising means for determining priority which operate when said other data constitutes a document to be displayed on another such device communicating with it and occupying more than one display page on the screen, to assure in increasing priority order: i) sending some of said other data that constitutes a display page on the screen, ii) exchange of telewriting data, and iii) sending the remainder of said other data,
    to enable superimposition of manuscript trace data on a document page displayed as soon as it is received.

3. A telewriting device according to claim 1, wherein the first and second links exchange data via the interface means in a mode of shared access to the external data communication line using a predetermined protocol.

4. A telewriting device according to claim 1, comprising means for interleaving manuscript trace data and said other data to assure real time sending of manuscript trace data over the external data communication line.

5. A telewriting device according to claim 4, wherein said other data is in the form of successive blocks of data and wherein the interleaving is effected by inserting manuscript trace data into gaps between successive blocks of said other data, the manuscript trace data comprising a single pixel, a group of pixels or a command relating to the written input function.

6. A telewriting device according to claim 5, wherein, when there is manuscript trace data to be sent to the external data communication line during sending of said other data to said line, interleaving is started at the first gap between two successive blocks of other data following appearance of said manuscript trace data.

7. A telewriting device according to claim 5, wherein said blocks constituting said other data occupy a time period equal to or less than the gap between consecutive manuscript trace data.

8. A telewriting device according to claim 1, wherein the second control unit exchanges and processes telewriting data from another device via the interface means and the second dedicated link concomitantly with the sending of data by the first control unit via the interface means and the first dedicated link.

9. A telewriting device according to claim 3, wherein the interface means send and receive interleaved or non-interleaved data in full duplex mode on the external data communication line.

10. A telewriting device according to claim 3, wherein the data is interleaved in the first control unit, the manuscript trace data and said other data being sent in interleaved form over the first dedicated link to the interface means for sending over the external data communication line.

11. A telewriting device according to claim 1, wherein the first control unit also controls the interface means and access to the latter via the second link.

12. A telewriting device according to claim 1, wherein the first control unit also controls telephone microphone and earpiece means of the interface means via links independent of said first link.

13. A telewriting device according to claim 3, wherein the data is interleaved in the interface means, said other data and the manuscript trace data being sent to the interface means respectively over the first link and the second link.

14. A telewriting device according to claim 1, wherein, in the case of concomitant other data and manuscript trace data for sending over the external data communication line, access of manuscript trace data to the interface means via the second link takes priority in order to assure its real time communication.

15. A telewriting device according to claim 1, further comprising a bidirectional link between the first and second control units.

16. A telewriting device according to claim 15, further comprising dialogue control means controlling dialogue between the first and second control units on the bidirectional link, said means comprising:
    a storage area dedicated to each control unit for data exchanged, each storage unit being read only by one control unit and written only by the other control unit, means being provided to indicate to a control unit to which data is sent that data is present in its storage area that was written by the sending control unit, and means for indicating to the sending control unit the reading of data in the storage area of the destination control unit.

17. A telewriting device according to claim 16, wherein the dialogue control means further comprise means for prohibiting writing of data in a storage area if the latter already contains data that has not been read.

18. A telewriting device according to claim 1, wherein the first control unit controls input and output of said other data on at least one of the following peripheral devices:

removable medium data storage means, fixed medium data storage means, a printer, and a serial link.

19. A telewriting device according to claim 1, wherein the second control unit additionally manages at least one of the following components:

a document scanner, a device for reading and/or writing data on a memory card such as a microchip card, a fingerprint reader, and a keyboard.

20. A telewriting device according to claim 1, wherein the interface means exchange voice data via telephone microphone and earpiece means via links independent of the first and second control units.

21. A telewriting device according to claim 1, wherein the interface means comprise means for digitizing voice data in accordance with a predefined protocol.

22. A telewriting device according to claim 1, wherein the second control unit controls the display means.

23. A method of controlling a telewriting device enabling exchange of visual and voice information in real time with another such device communicating therewith via an external data communication line, comprising:

(1) within each telewriting device:

exchanging voice data, displaying written manuscript trace data on a display surface in real time, processing manuscript trace data and other data to be exchanged, and managing and exchanging said manuscript trace data and said other data on the external data communication line; and (2) distributing tasks among respective data processors within the telewriting devices such that the management and exchange of said manuscript trace data and said other data are performed in parallel.

24. A method according to claim 23, wherein, when said other data constitutes a document to be displayed on another such device and occupies more than one display page on the screen, the following are effected in increasing priority order i) sending some of said other data that constitutes a display page on the screen, ii) exchange of telewriting data, and iii) sending the remainder of said other data, to enable superimposition of manuscript trace data on a document page displayed as soon as it is received.

25. A method according to claim 23 wherein, when said other data and the manuscript trace data must be sent concomitantly, they are sent in a mode of shared access to the external data communication line.

26. A method according to claim 23 wherein, when said other data and the manuscript trace data must be sent simultaneously, they are sent by interleaving it to enable real time sending of the manuscript trace data over the external data communication line.

27. A method according to claim 26, wherein said other data is in the form of successive blocks of data and wherein the interleaving is effected by inserting manuscript trace data into gaps between blocks of said other data, the manuscript trace data comprising a single pixel, a group of pixels or a command relating to the written input function.

* * * * *

UNITED STATES PATENT AND TRADEMARK OFFICE
CERTIFICATE OF CORRECTION

PATENT NO.    : 6,408,058 B1
DATED         : June 18, 2002
INVENTOR(S)   : Arnaud Lanet It is certified that error appears in the above-identified patent and that said Letters Patent is hereby corrected as shown below:

Column 5,
Line 45, "as means." should read -- means. --;

Column 15,
Line 32, delete "oat";
Line 33, "if" should read -- If --;
Line 64, "has-not" should read -- has not --;

Column 17,
Line 29, "verifyg" should read -- verifying --;

Column 20,
Line 43, "if so," should read -- If so, --;

Column 24,
Line 4, "flowchart The" should read -- flowchart. The --;

Column 28,
Line 60, "(5840)" should read -- (E840) --;

Column 31,
Line 57, "the," should read -- the --;

Column 32,
Line 41, delete "Fits";

Column 35,
Line 17, "HI" should read -- H1 --; and

UNITED STATES PATENT AND TRADEMARK OFFICE
CERTIFICATE OF CORRECTION

PATENT NO. : 6,408,058 B1
DATED : June 18, 2002
INVENTOR(S) : Arnaud Lanet

It is certified that error appears in the above-identified patent and that said Letters Patent is hereby corrected as shown below:

Column 38,
Line 63, "if" should read -- If --.

Signed and Sealed this

Twenty-third Day of September, 2003

JAMES E. ROGAN
*Director of the United States Patent and Trademark Office*